US010789324B2

(12) United States Patent
Longo et al.

(10) Patent No.: US 10,789,324 B2
(45) **Date of Patent: *Sep. 29, 2020**

(54) SYSTEM AND METHOD FOR CONTROLLING ELECTRONIC COMMUNICATIONS

(71) Applicant: Veeva Systems Inc., Pleasanton, CA (US)

(72) Inventors: Brian C. Longo, Danville, CA (US); Abhay Pimprikar, Campbell, CA (US); Drew Garty, Oregon, WI (US); Timothy S. Murphy, Berkeley, CA (US); Ling Lam, Fremont, CA (US); Dennis Alan Kochanski, Long Beach, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/172,596

(22) Filed: Oct. 26, 2018

(65) Prior Publication Data

US 2019/0171771 A1 Jun. 6, 2019

Related U.S. Application Data

(63) Continuation of application No. 15/881,516, filed on Jan. 26, 2018, now Pat. No. 10,169,480, which is a (Continued)

(51) Int. Cl.

*G06F 15/16* (2006.01)
*H04L 12/18* (2006.01)
(Continued)

(52) U.S. Cl.

CPC .......... *G06F 16/957* (2019.01); *G06F 16/951* (2019.01); *G06Q 10/107* (2013.01); (Continued)

(58) Field of Classification Search

USPC .......................................................... 709/206
See application file for complete search history.

(56) References Cited

U.S. PATENT DOCUMENTS

| | | | | |
|---|---|---|---|---|
| 5,870,149 | A | 2/1999 | Comroe et al. | |
| 6,088,451 | A * | 7/2000 | He | H04L 63/20 380/255 |

(Continued)

FOREIGN PATENT DOCUMENTS

| | | | |
|---|---|---|---|
| CN | 101501612 | A | 8/2009 |
| EP | 1768056 | A1 | 3/2007 |

(Continued)

OTHER PUBLICATIONS

U.S. Appl. No. 60/393,176, filed Jul. 1, 2002, 41 pages.

(Continued)

*Primary Examiner* — Jude Jean Gilles
(74) *Attorney, Agent, or Firm* — Baker & McKenzie LLP

(57) ABSTRACT

The approved email generation system described is capable of producing email communications between user and customer by using approved email templates and content that have been aligned with customer information regarding access to such content. Once the approved email has been generated, the content may be verified again for accuracy and validity before being delivered to the customer. When the customer accesses delivered content, the approved email generation system again verifies the content and allows the customer access to only the most current version of the content available. The system provides for control of the content of electronic communications to customers.

19 Claims, 43 Drawing Sheets

Related U.S. Application Data continuation of application No. 15/847,637, filed on Dec. 19, 2017, now Pat. No. 10,140,382, which is a continuation-in-part of application No. 14/611,012, filed on Jan. 30, 2015, which is a continuation-in-part of application No. 14/271,134, filed on May 6, 2014, now Pat. No. 9,055,023, said application No. 15/847,637 is a continuation-in-part of application No. 15/629,587, filed on Jun. 21, 2017, now abandoned, and a continuation-in-part of application No. 14/819,371, filed on Aug. 5, 2015, which is a continuation-in-part of application No. 14/702,307, filed on May 1, 2015, now Pat. No. 9,773,037.

(60) Provisional application No. 61/828,034, filed on May 28, 2013, provisional application No. 61/820,029, filed on May 6, 2013, provisional application No. 62/407,399, filed on Oct. 12, 2016.

(51) Int. Cl.

| | |
|---|---|
| ***H04L 12/58*** | (2006.01) |
| ***G06F 16/957*** | (2019.01) |
| ***H04L 29/08*** | (2006.01) |
| ***G06F 16/951*** | (2019.01) |
| ***G06Q 10/10*** | (2012.01) |
| ***G06Q 30/00*** | (2012.01) |

(52) U.S. Cl.
CPC ......... *G06Q 30/01* (2013.01); *H04L 12/1818* (2013.01); *H04L 51/063* (2013.01); *H04L 67/142* (2013.01); *H04L 12/1827* (2013.01); *H04L 51/18* (2013.01)

(56) References Cited

U.S. PATENT DOCUMENTS 6,167,435 A 12/2000 Druckenmiller et al.
6,295,058 B1 9/2001 Hsu et al.
6,360,221 B1 3/2002 Gough et al.
6,438,584 B1 8/2002 Powers
6,449,634 B1 9/2002 Capiel
6,463,417 B1 10/2002 Schoenberg
6,650,890 B1 11/2003 Irlam et al.
6,735,623 B1 5/2004 Prust
6,775,689 B1 8/2004 Raghunandan
6,789,108 B1 9/2004 McMillan
6,978,417 B1 12/2005 Kohn et al.
7,035,281 B1 4/2006 Spearman et al.
7,065,555 B2 6/2006 Foulger et al.
7,124,305 B2 10/2006 Margolus et al.
7,149,964 B1 12/2006 Cottrille et al.
7,155,436 B2 12/2006 Hegde et al.
7,251,500 B2 7/2007 Nakagawa et al.
7,333,956 B2 2/2008 Malcolm
7,363,384 B2 4/2008 Chatani et al.
7,409,424 B2 8/2008 Parker
7,412,489 B2 8/2008 Nowacki et al.
7,464,162 B2 * 12/2008 Chan .................... G06F 21/604 709/225
7,496,281 B2 2/2009 Ishida
7,523,167 B2 4/2009 Thomas et al.
7,567,207 B2 7/2009 Angus
7,584,251 B2 9/2009 Brown et al.
7,606,799 B2 10/2009 Kalinichenko et al.
7,613,620 B2 11/2009 Salwan
7,634,556 B2 12/2009 Huynh et al.
7,647,320 B2 1/2010 Mok et al.
7,698,393 B2 4/2010 Milstein et al.
7,707,317 B2 4/2010 Huynh et al.
7,730,142 B2 6/2010 LeVasseur et al.
7,730,165 B2 6/2010 Shapiro
7,765,309 B2 7/2010 Spearman et al.
7,836,134 B2 11/2010 Pantalone
7,853,564 B2 12/2010 Mierau et al.
7,853,786 B1 12/2010 Fultz et al.
7,865,394 B1 1/2011 Calloway et al.
7,870,204 B2 1/2011 LeVasseur et al.
7,904,922 B1 3/2011 Haberman et al.
7,966,374 B2 6/2011 Huynh et al.
8,055,221 B2 11/2011 Lee et al.
8,073,863 B2 * 12/2011 Rachmiel .............. G06F 21/604 707/769
8,171,077 B2 5/2012 Huynh et al.
8,239,773 B1 8/2012 Billman
8,244,809 B2 8/2012 Krause et al.
8,296,378 B2 10/2012 Huynh et al.
8,307,392 B2 11/2012 Ahanger et al.
8,316,392 B2 11/2012 Ahanger et al.
8,320,939 B1 11/2012 Vincent
8,348,762 B2 1/2013 Willis
8,542,117 B1 * 9/2013 Miasnik .................. H04W 4/90 340/540
8,577,995 B2 11/2013 Suryanarayana
8,812,636 B2 8/2014 Song et al.
9,055,023 B2 6/2015 Murphy et al.
9,171,344 B2 10/2015 Yu et al.
2001/0031454 A1 10/2001 Mintz
2001/0052019 A1 12/2001 Walters et al.
2001/0054059 A1 12/2001 Marks et al.
2002/0019849 A1 2/2002 Tuvey et al.
2002/0059632 A1 5/2002 Link et al.
2002/0092019 A1 7/2002 Marcus
2002/0133393 A1 9/2002 Tatsumi et al.
2002/0161766 A1 10/2002 Lawson et al.
2002/0169670 A1 11/2002 Barsade et al.
2003/0140044 A1 7/2003 Mok et al.
2004/0075619 A1 4/2004 Hansen
2004/0093429 A1 5/2004 Burton et al.
2005/0204379 A1 9/2005 Yamamori
2006/0010199 A1 * 1/2006 Brailean ........... H04L 29/06027 709/204
2006/0084410 A1 4/2006 Sutaria et al.
2006/0222328 A1 10/2006 Akahane
2006/0274153 A1 * 12/2006 Levien ............... H04N 1/00132 348/207.1
2007/0073699 A1 3/2007 Reed
2007/0192140 A1 * 8/2007 Gropper ................ G06Q 50/24 705/3
2007/0222865 A1 * 9/2007 Levien ............... H04N 21/4398 348/222.1
2008/0005113 A1 1/2008 Li
2008/0043108 A1 * 2/2008 Jung ...................... H04N 5/772 348/207.1
2008/0071817 A1 3/2008 Gaurav et al.
2008/0112405 A1 * 5/2008 Cholas .................. H04L 63/062 370/389
2008/0162229 A1 7/2008 Moore
2008/0189777 A1 * 8/2008 Deagon ................... G06F 21/41 726/8
2008/0201731 A1 8/2008 Howcroft
2008/0243724 A1 10/2008 Voorhees
2008/0256128 A1 10/2008 Pierce et al.
2008/0276184 A1 11/2008 Buffet et al.
2008/0300961 A1 12/2008 Cawston et al.
2008/0320568 A1 12/2008 Hawkins et al.
2009/0119149 A1 5/2009 Leonard et al.
2009/0132803 A1 5/2009 Leonard et al.
2009/0217352 A1 8/2009 Shen et al.
2009/0240521 A1 9/2009 Simons et al.
2009/0254449 A1 10/2009 Kuno
2009/0299857 A1 12/2009 Brubaker
2010/0057466 A1 3/2010 Garg et al.
2010/0114614 A1 5/2010 Sharpe
2010/0299335 A1 11/2010 Gopalakrishnan et al.
2010/0304714 A1 12/2010 Chao et al.
2011/0145206 A1 * 6/2011 Kahn ................. G06F 16/2308 707/690
2011/0193739 A1 8/2011 Strauch et al.
2011/0202854 A1 8/2011 Chan et al.
2011/0213658 A1 9/2011 Joa et al.

(56) References Cited

U.S. PATENT DOCUMENTS

| | | | | |
|---|---|---|---|---|
| 2012/0069131 | A1* | 3/2012 | Abelow | G06Q 10/067 348/14.01 |
| 2013/0036138 | A1 | 2/2013 | Bellows et al. | |
| 2013/0091205 | A1 | 4/2013 | Kotler et al. | |
| 2013/0138487 | A1 | 5/2013 | Crasmaru et al. | |
| 2013/0232550 | A1 | 9/2013 | Kihara et al. | |
| 2013/0290863 | A1 | 10/2013 | Chen et al. | |
| 2013/0294322 | A1 | 11/2013 | Yun et al. | |
| 2013/0328661 | A1* | 12/2013 | Phillips | G06K 9/00771 340/5.7 |
| 2014/0082508 | A1 | 3/2014 | Rajashekar et al. | |
| 2014/0208388 | A1* | 7/2014 | Wong | H04L 63/08 726/4 |
| 2014/0222461 | A1 | 8/2014 | Tolcher et al. | |
| 2015/0119023 | A1 | 4/2015 | Wang et al. | |
| 2015/0150098 | A1 | 5/2015 | Murphy et al. | |
| 2015/0156279 | A1 | 6/2015 | Vaswani et al. | |
| 2015/0156280 | A1 | 6/2015 | Vaswani et al. | |
| 2016/0034550 | A1 | 2/2016 | Ostler et al. | |

FOREIGN PATENT DOCUMENTS

| | | | |
|---|---|---|---|
| JP | 2004-513460 | A | 4/2004 |
| JP | 2010-211830 | A | 9/2010 |
| JP | 4980636 | B2 | 7/2012 |
| KR | 10-2008-0111175 | A | 12/2008 |
| KR | 10-2012-0076490 | A | 7/2012 |
| TW | 201215109 | | 4/2012 |
| WO | 00/30009 | A2 | 5/2000 |
| WO | 00/65762 | A2 | 11/2000 |
| WO | 01/93509 | A1 | 12/2001 |
| WO | 2011068957 | A2 | 6/2011 |
| WO | 2011163019 | A1 | 12/2011 |
| WO | 2017049309 | A1 | 3/2017 |

OTHER PUBLICATIONS

U.S. Appl. No. 60/633,832, filed Dec. 6, 2004, 25 pages.
International Search Report and Written Opinion, PCT/US2014/036990, dated Sep. 24, 2014.
U.S. Appl. No. 60/261,712, filed Jan. 12, 2001 entitled Method and System for Creating Presentation Packages.
U.S. Appl. No. 60/326,776, filed Oct. 3, 2001 entitled Methods and Apparatus for a Dynamic Messaging Engine.
International search report and written opinion of the international searching authority for co-pending PCT application No. PCT/US2011/040407 dated Jul. 10, 2011.
U.S. Appl. No. 61/820,029.
U.S. Appl. No. 61/828,034.
U.S. Appl. No. 62/407,399.
U.S. Appl. No. 14/558,432.
International Preliminary Report on Patentability, PCT/US2014/036990, dated Nov. 10, 2015, 8 pages.
European Patent Register Patent Application Information File Wrapper for EP 14794944, downloaded from https://register.epo.org dated Dec. 21, 2017.
Report Concerning Accelerated Examination dated May 9, 2016 in connection with English translation relating to JP 2016513020.
Decision to grant with English translation relating to JP 2016513020, dated May 9, 2016.
*Veeva Systems Inc.* v. *Prolifiq Software Inc.*, Case No. IPR2014-01253, U.S. Pat. No. 7,634,556 filed Aug. 6, 2014.
U.S. Appl. No. 14/611,012.
U.S. Appl. No. 15/420,999.
U.S. Appl. No. 14/271,134.
*Veeva Systems Inc.* v. *Prolifiq Software Inc.*, Case No. IPR2014-01467, U.S. Pat. No. 8,296,378 filed Sep. 9, 2014.
*Veeva Systems Inc.* v. *Prolifiq Software Inc.*, Case No. IPR2014-01472, U.S. Pat. No. 7,707,317 filed Sep. 10, 2014.
*Veeva Systems Inc.* v. *Prolifiq Software Inc.*, Case No. IPR2014-01473, U.S. Pat. No. 7,966,374 filed Sep. 10, 2014.
*Veeva Systems Inc.* v. *Prolifiq Software Inc.*, Case No. IPR2014-01474, U.S. Pat. No. 8,171,077 filed Sep. 10, 2014.
U.S. Appl. No. 15/629,587.
"Extensible Markup Language (XML) 1.0 (Fifth Edition)", W3C Recommendation, Nov. 26, 2008, 56 pages, URL: http://www.w3.org/TR/2008/REC-xml-20081126/.
Berghel, H., "Email—The Good, The Bad, and The Ugly", Digital Village, Communications of the ACM, Apr. 1997/vol. 40, No. 4, 5 pages.
Peter, I., "The history of email", Net History, (c) The Internet History Project 2004, 3 pages, URL: http://www.nethistory.info/History%20of%20the%20Internet/email.html.
AOL, Wikipedia, 16 pages, URL: http://en.wikipedia.org/wiki/AOL.
Outlook.com, Wikipedia, 13 pages, URL: http://en.wikipedia.org/wiki/Outlook.com.
U.S. Appl. No. 14/613,293.
U.S. Appl. No. 15/414,484.
U.S. Appl. No. 14/699,553.
Yahoo! Mail, Wikipedia, 15 pages, URL: http://en.wikipedia.org/wiki/Yahoo!.
Northwind Sample Database, SQL Server 2000, (c) 2014 Microsoft, 1 page.
Davis, J., "Step-by-Step: Mail merge is easy with Word 2002's new templates", Jul. 1, 2003, TechRepublic, 5 pages, URL: http://www.techrepublic.com/article/step-by-step-mail-merge-is-easy-with-word-2002s-new-templates/.
Mail merge, Wikipedia, 2 pages, URL: http://en.wikipedia.org/wiki/Mail_merge.
"How to do a "Mail Merge" from a Calc spreadsheet.", provided by the OpenOffice.org Documentation Project, Apache OpenOffice, 7 pages, URL: http://www.openoffice.org/documentation/HOW_TO/word_processing/writer2_EN.html.
"Word mail merge: A walk through the process", Office, Microsoft.com, 2 pages, URL: http://office.microsoft.com/en-us/word-help/word-mail-merge-a-walk-through-the-process-HA001034920.aspx.
Cox, B., "GuestTrack Launches Personalized E-Mail Product", ClickZ, Marketing News & Expert Advice, Feb. 5, 1999, 3 pages, URL: http://www.clickz.com/clickz/news/1702751/guesttrack-launches-personalized-email-product.
Klensin, J. (Editor), "Simple Mail Transfer Protocol", AT&T Laboratories, Apr. 2001, Network Working Group, Category: Standards Track, Copyright (c) The Internet Society (2001), 79 pages.
O'Connor, A., "Personalization Comes Full Circle, Part 1", ClickZ, Marketing News & Expert Advice, Oct. 25, 2001, 4 pages, URL: http://www.clickz.com/clickz/column/2138577/personalization-comes-full-circle-part.
O'Connor, A., "Personalization Comes Full Circle, Part 2", ClickZ, Marketing News & Expert Advice, Nov. 1, 2001, 4 pages, URL: http://www.clickz.com/clickz/column/2138629/personalization-comes-full-circle-part.
Pastore, M., "Let the E-Mail Marketing Onslaught Begin", ClickZ, Marketing News & Expert Advice, Mar. 8, 2000, 3 pages, URL: http://www.clickz.com/clickz/column/1695454/let-the-email-marketing-onslaught-begin.
Kania, D., "Personal and Relevant: Targeting With Email", ClickZ, Marketing News & Expert Advice, Feb. 23, 1999, 4 pages, URL: http://www.clickz.com/clickz/column/1717174/personal-relevant-targeting-with-email.
Diamond, T., "Marketing: Up Close and Personal", ClickZ, Marketing News & Expert Advice, Sep. 28, 2000, 3 pages, URL: http://www.clickz.com/clickz/column/1718014/marketing-up-close-personal.
"Evolution of Email Marketing—The history of one of the most used forms of communication!", Optyn, 3 pages, URL: https://www.optyn.com/resources/email-marketing/evolution-of-email-marketing.
Email marketing, Wikipedia, 5 pages, URL: http://en.wikipedia.org/wiki/Email_marketing.
"How to create an E-mail Message template or an E-mail Message form in Outlook", Microsoft, Article ID: 258256—Last Review: Sep. 20, 2011—Revision: 6.0, 2 pages.

(56) References Cited

OTHER PUBLICATIONS

Global Dossier Patent Application Information File Wrapper for CN 201480038821 downloaded from https://globaldossier.uspto.gov on Dec. 21, 2017.
Third Office Action dated Dec. 25, 2017 in connection with Chinese Application No. 201480038821.2, 10 pages.
Fourth Office Action dated Jul. 25, 2018 in connection with Chinese Application No. 201480038821.2, 10 pages.
EP 14794944, downloaded from https://register.epo.org dated Dec. 21, 2017.
Global Dossier Patent Application for CN 201480038821 downloaded from https://globaldossier.uspto.gov on Dec. 21, 2017.
Third Office Action dated Dec. 25, 2017 in connection with Chinese Application No. 2014800328821.2, 10 pages.
International Search Report and Written Opinion of International Searching Authority dated Apr. 3, 2019 in connection with International Application No. PCT/US2018/066283, 10 page.
Extended European Search Report dated Dec. 15, 2016 in connection with European Application No. 14794944.0, 7 pages.
Summons to Attend Oral Proceedings dated Feb. 11, 2019 in connection with European Application No. 14794944.0, 10 pages.
European Patent Office Brief Communication dated Jun. 21, 2019 in connection with European Application No. 14794944.0, 9 pages.
M. Schlosser, "IBM Application Framework for e-business: Security", Internet Citation, Nov. 1999, retrieved from URL:ftp://www6.software.ibm.com/software/developer/library/security.pdf [retrieved on Sep. 12, 1999], 8 pages.
U.S. Appl. No. 15/881,516.
U.S. Appl. No. 15/847,637.
U.S. Appl. No. 14/819,371.
U.S. Appl. No. 14/702,307.
Written Submission in Response to Oral Proceedings dated May 23, 2019 in connection with European Application No. 14794944.0, 22 pages.
Decision to Refuse dated Oct. 9, 2019 in connection with European Application No. 14794944.0, 14 pages.

* cited by examiner

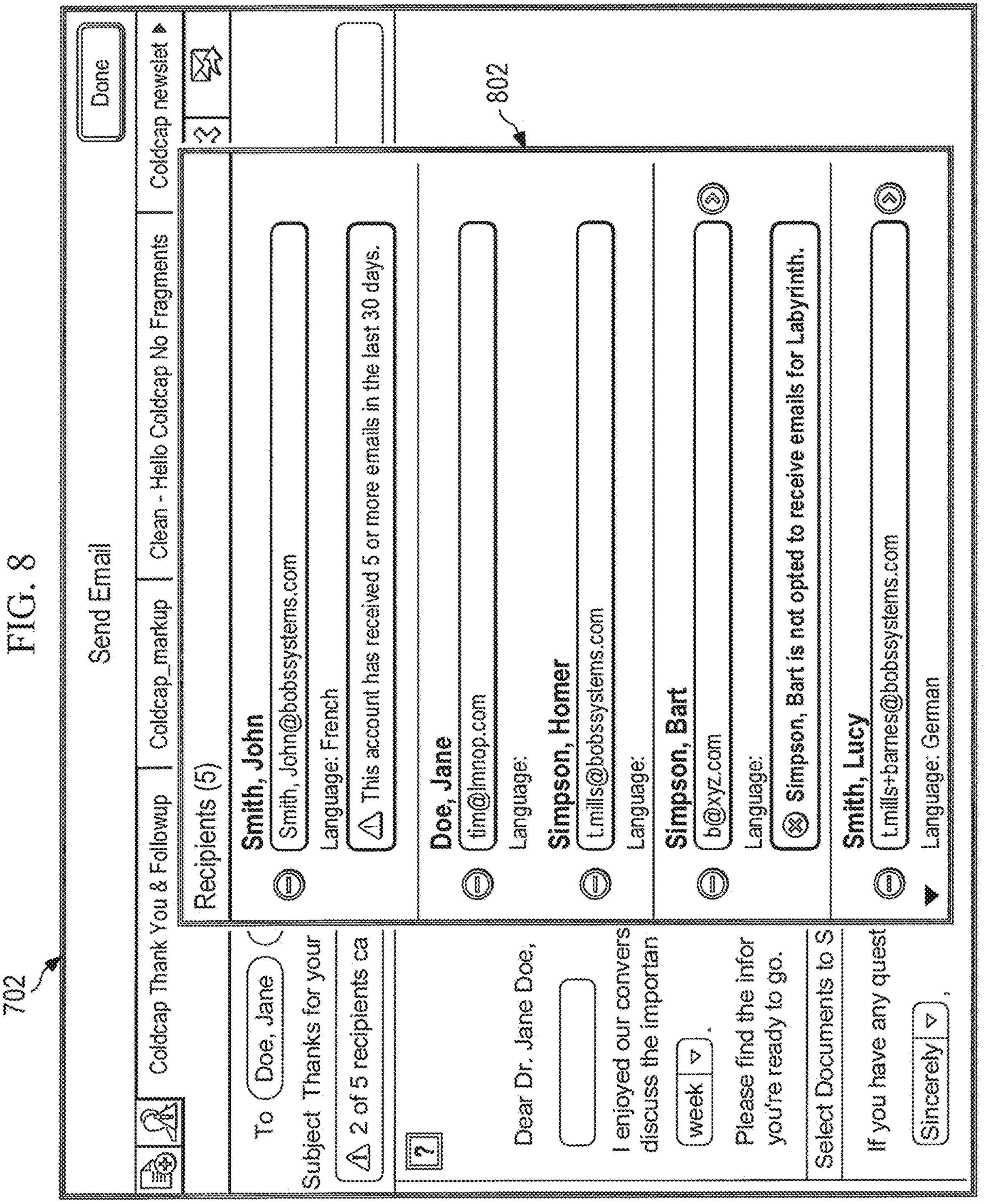

FIG. 8

Send Email

Coldcap Thank You & Followup | Coldcap_markup | Clean - Hello Coldcap No Fragments | Coldcap newslet ▸

To ( Doe, Jane )
Subject: Thanks for your
⚠ 2 of 5 recipients ca

Recipients (5)

Smith, John
Smith, John@bobssystems.com
Language: French
⚠ This account has received 5 or more emails in the last 30 days.

Doe, Jane
tim@lmnop.com
Language:

Simpson, Homer
t.mills@bobssystems.com
Language:

Simpson, Bart
b@xyz.com
Language: ⊗ Simpson, Bart is not opted to receive emails for Labyrinth.

Smith, Lucy
t.mills+barnes@bobssystems.com
Language: German

Dear Dr. Jane Doe,

I enjoyed our convers
discuss the importan week ▾ .
Please find the infor
you're ready to go.
Select Documents to S
If you have any quest Sincerely ▾ , Done 702
802

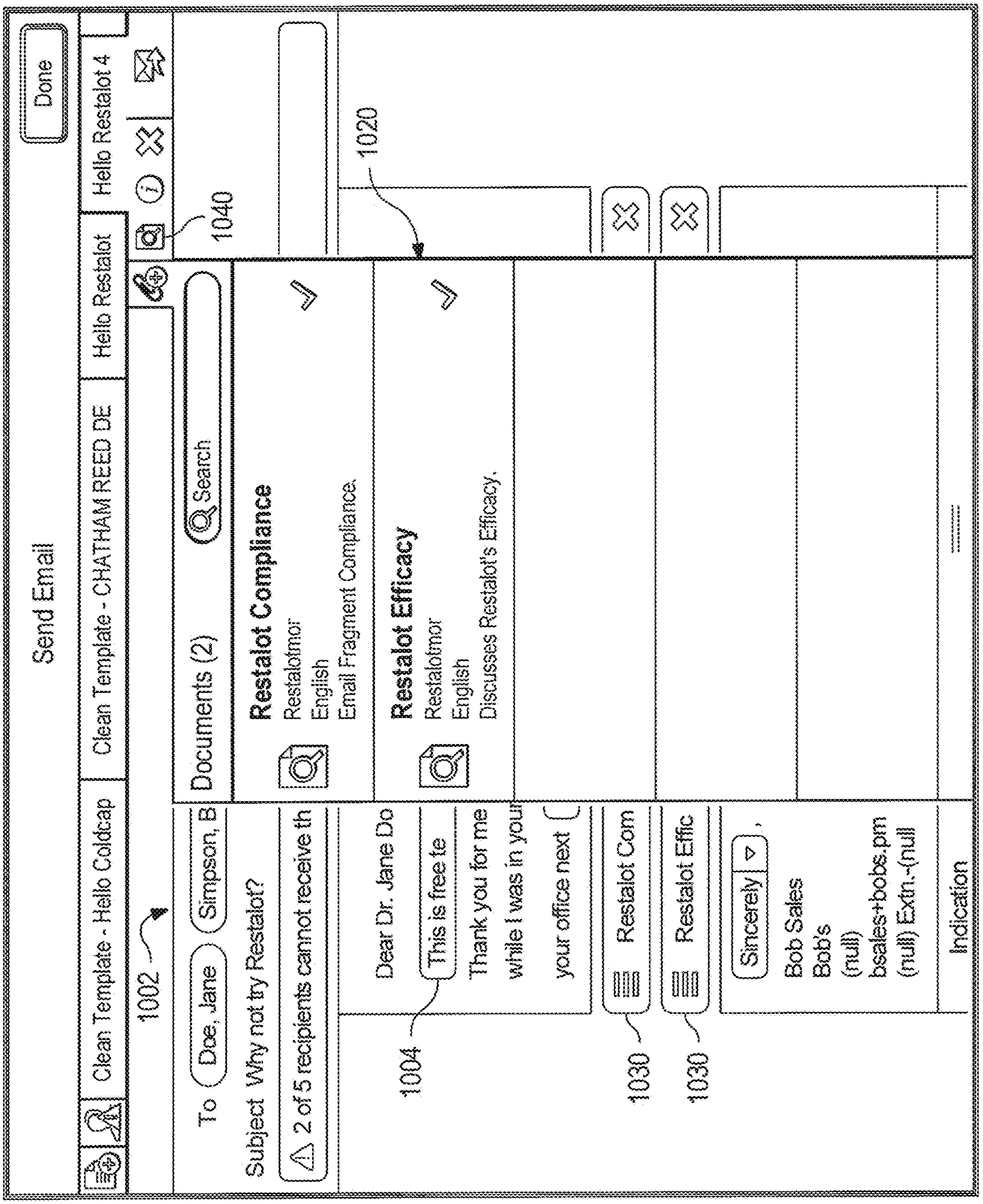

FIG. 10b

[Send Email interface showing tabs: Clean Template - Hello Coldcap | Clean Template - CHATHAM REED DE | Hello Restalot | Hello Restalot 4]

To: Doe, Jane   Simpson, B — 1002

Subject: Why not try Restalot?

⚠ 2 of 5 recipients cannot receive th

Documents (2)   🔍 Search — 1040

Restalot Compliance
Restalotmor
English
Email Fragment Compliance.

Restalot Efficacy
Restalotmor
English
Discusses Restalot's Efficacy.

Dear Dr. Jane Do
This is free te — 1004
Thank you for me
while I was in your
your office next Restalot Com — 1030
Restalot Effic — 1030

Sincerely ▽ ,
Bob Sales
Bob's
(null)
bsales+bobs.pm
(null) Extn.-(null

Indication

1020

Done

To: Smith, John
From: Howard, Mark
Subject: ColdCap

ColdCap

Dear Dr. Smith,

Thank you for your interest in becoming a part of Coldcap Speaker Bureau. A Coldcap product specialist will follow up with you in regards to the requirements of becoming an approved speaker and answer any additional Coldcap questions you may have.

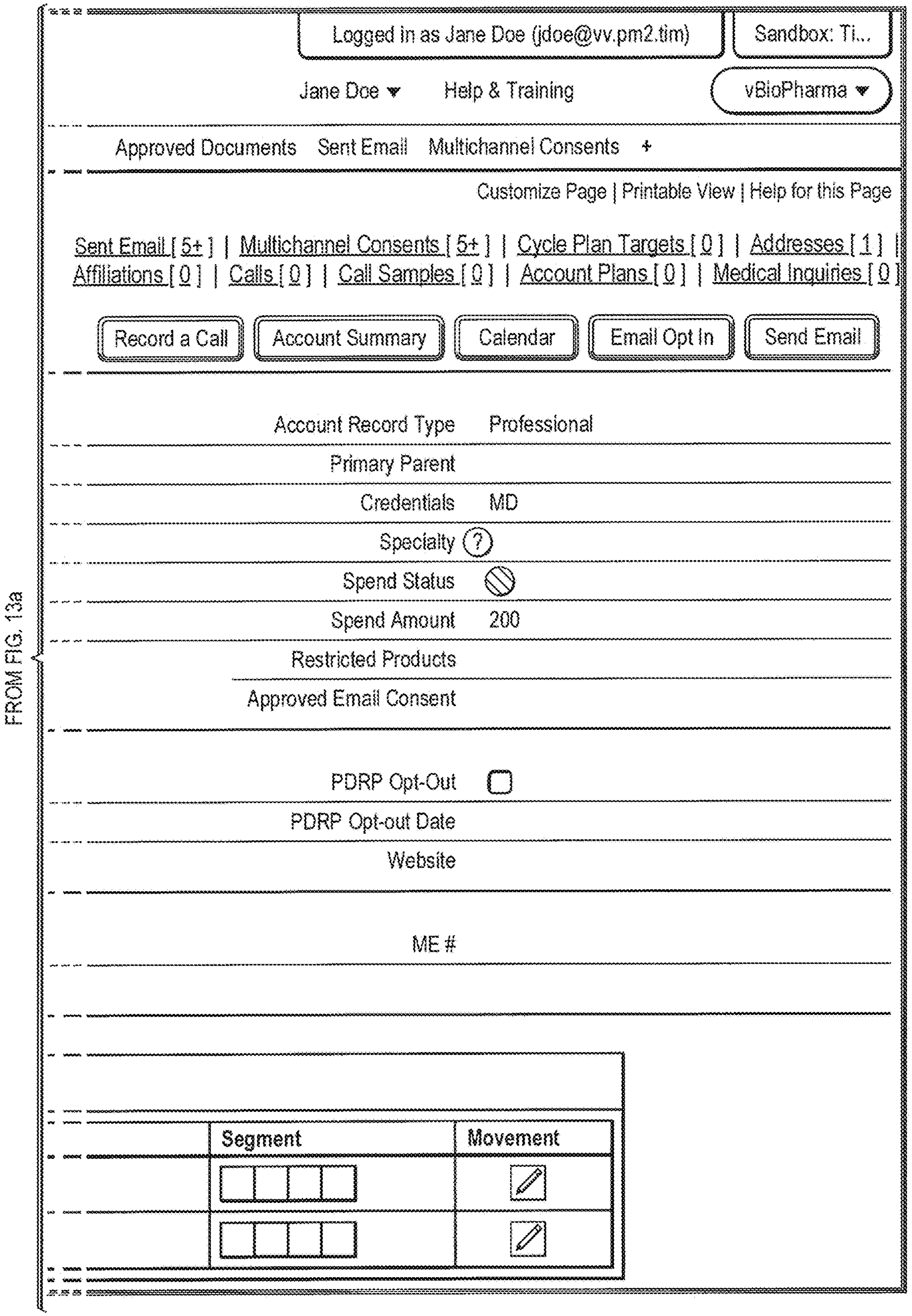

| | |
|---|---|
| Logged in as Jane Doe (jdoe@vv.pm2.tim) | Sandbox: Ti... |

Jane Doe ▼   Help & Training   vBioPharma ▼

Approved Documents   Sent Email   Multichannel Consents   +

Customize Page | Printable View | Help for this Page

Sent Email [ 5+ ] | Multichannel Consents [ 5+ ] | Cycle Plan Targets [ 0 ] | Addresses [ 1 ]
Affiliations [ 0 ] | Calls [ 0 ] | Call Samples [ 0 ] | Account Plans [ 0 ] | Medical Inquiries [ 0 ]

[ Record a Call ]   [ Account Summary ]   [ Calendar ]   [ Email Opt In ]   [ Send Email ]

| | |
|---|---|
| Account Record Type | Professional |
| Primary Parent | |
| Credentials | MD |
| Specialty ⓘ | |
| Spend Status | ⊘ |
| Spend Amount | 200 |
| Restricted Products | |
| Approved Email Consent | |
| PDRP Opt-Out | ☐ |
| PDRP Opt-out Date | |
| Website | |
| ME # | |

| Segment | Movement |
|---|---|
| ☐☐☐ | ✎ |
| ☐☐☐ | ✎ |

FROM FIG. 13a

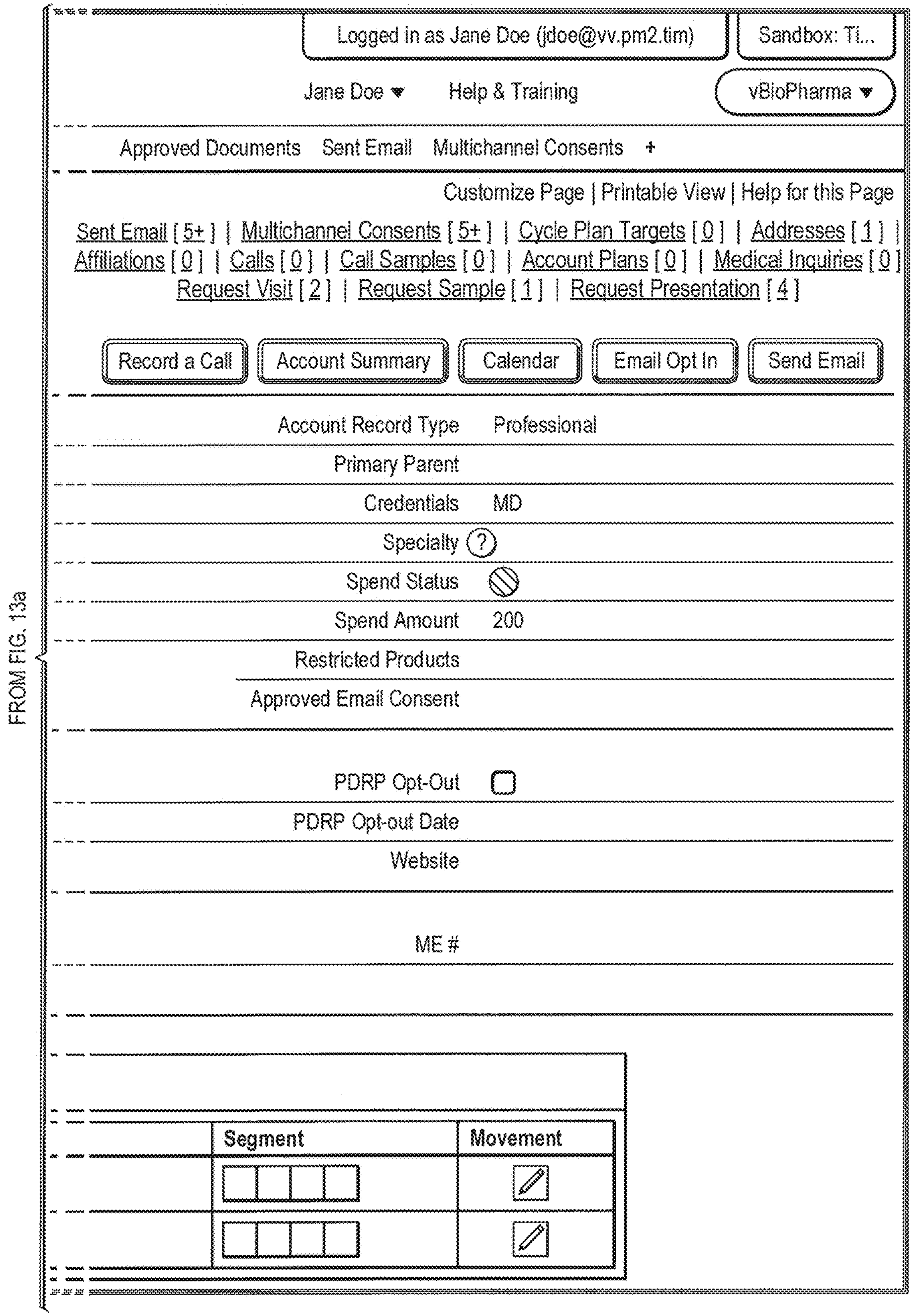

FIG. 13c

```
Logged in as Jane Doe (jdoe@vv.pm2.tim)    Sandbox: Ti...

        Jane Doe ▼    Help & Training            vBioPharma ▼

Approved Documents   Sent Email   Multichannel Consents   +

                          Customize Page | Printable View | Help for this Page
Sent Email [ 5+ ] | Multichannel Consents [ 5+ ] | Cycle Plan Targets [ 0 ] | Addresses [ 1 ] |
Affiliations [ 0 ] | Calls [ 0 ] | Call Samples [ 0 ] | Account Plans [ 0 ] | Medical Inquiries [ 0 ]
Request Visit [ 2 ] | Request Sample [ 1 ] | Request Presentation [ 4 ]

[ Record a Call ] [ Account Summary ] [ Calendar ] [ Email Opt In ] [ Send Email ]

        Account Record Type    Professional
        Primary Parent
        Credentials            MD
        Specialty  (?)
        Spend Status   ⊘
        Spend Amount   200
        Restricted Products
        Approved Email Consent

        PDRP Opt-Out   ☐
        PDRP Opt-out Date
        Website

        ME #

                    Segment           Movement
                    ☐☐☐☐              ✎
                    ☐☐☐☐              ✎
```

FROM FIG. 13a

600

Casebooks    Reports

Tasks    2202

| Subject ID | Task |
|---|---|
| 100-0005 | Randomization |
| 100-0019 | Inclusion Criteria |
| 100-0016 | Exclusion Criteria |
| 100-0013 | Vitals |

601

| Study | Subjects | Study Status |
|---|---|---|
| D00768 | 7 | Active |
| V0092 | 15 | Active |

640

Casebooks   Reports

Study         Study Site        Subject        Event

Subject: 100-0022  Initials: BBB  Gender: --  DOB: 9/5/1965  Race: Hispanic Latino

| Event | Date | Overdue Forms | Open Queries |
|---|---|---|---|
| Screening Visit | 20xx-09-05 | 0 | 0 |
| Exclusion Criteria | | | |
| Inclusion Criteria | | | |
| Randomization | | | |
| Baseline Visit | 20xx-11-03 | 0 | 0 |
| Vitals | | | |
| Hematology | | | |
| Dosing | | | |
| Visit 1 | | | |
| Visit 2 | | | |

660

Casebooks    Reports

Study    Study Site    Subject    Event    Form

Subject: 100-0022    Initials: BBB    Gender: --    DOB: 9/5/1965    Race: Hispanic Latino Vitals    Hematology
Vitals    Dosing Body Temperature Height Weight Systolic blood pressure Diastolic blood pressure

SYSTEM AND METHOD FOR CONTROLLING ELECTRONIC COMMUNICATIONS

CROSS-REFERENCE TO RELATED APPLICATIONS

This application is a continuation of U.S. application Ser. No. 15/881,516, filed on Jan. 26, 2018, issued as U.S. Pat. No. 10,169,480 on Jan. 1, 2019, which is a continuation of U.S. application Ser. No. 15/847,637, filed on Dec. 19, 2017, issued as U.S. Pat. No. 10,140,382 on Nov. 27, 2018, all of which are incorporated herein by reference for all purposes. U.S. application Ser. No. 15/847,637, filed on Dec. 19, 2017, issued as U.S. Pat. No. 10,140,382 on Nov. 27, 2018 is also a continuation-in-part of U.S. application Ser. No. 14/611,012, filed on Jan. 30, 2015, which is a continuation-in-part of U.S. application Ser. No. 14/271,134, filed on May 6, 2014, issued as U.S. Pat. No. 9,055,023 on Jun. 9, 2015, which claims priority to U.S. Provisional Patent Application Nos. 61/820,029, filed May 6, 2013, and 61/828,034, filed May 28, 2013, all of which are incorporated herein by reference for all purposes. U.S. application Ser. No. 15/847,637, filed on Dec. 19, 2017, issued as U.S. Pat. No. 10,140,382 on Nov. 27, 2018, is also a continuation-in-part of U.S. application Ser. No. 15/629,587, filed on Jun. 21, 2017, which claims priority to U.S. Provisional Patent Application No. 62/407,399, filed on Oct. 12, 2016, all of which are incorporated herein for all purposes. U.S. application Ser. No. 15/847,637, filed on Dec. 19, 2017, issued as U.S. Pat. No. 10,140,382 on Nov. 27, 2018, is also a continuation-in-part of U.S. application Ser. No. 14/819,371, filed on Aug. 5, 2015, issued as U.S. Pat. No. 10,467,629 on Nov. 5, 2019, which is a continuation-in-part of U.S. application Ser. No. 14/702,307, filed on May 1, 2015, issued as U.S. Pat. No. 9,773,037 on Sep. 26, 2017, all of which are incorporated herein for all purposes.

TECHNICAL FIELD

The present application relates generally to systems and methods that provide for sending approved content to electronic communications recipients, including methods and systems for building the approved content and generating the approved messages for electronic communications such as email.

BACKGROUND

In certain fields, the ability to achieve the efficiencies associated with modern electronic communications such as email has been hampered by the risks (regulatory and otherwise) of sending such electronic communications. An example of one field that has been so limited has been the pharmaceutical sales industry, where sales reps typically are restricted from sending email communications to prescribing doctors because of the enormous risks that can flow from unapproved, uncontrolled messages. For example, a careless rep or other personnel might send an email to a subscribing doctor suggesting off-label uses for a drug. This could end up exposing the company employer (e.g., a pharmaceutical company) to regulatory penalties or other legal liabilities.

SUMMARY

Embodiments disclosed in the present document provide a machine-implemented method for generating approved emails. The method comprises: establishing a controlled content repository, the controlled content repository being securely and controllably accessed; establishing an access protocol for the controlled content repository, whereby approved content is stored in the controlled content repository according to the access protocol and whereby the access protocol comprises at least one set of alignment rules for determining if a first piece of approved content within the controlled content repository can be made available to a first customer via an electronic message; storing the approved content within the controlled content repository, the approved content further being accessible according to the established access protocol; aligning the approved content within the controlled content repository with information from an information management system; and providing an approved email generating system which generates an electronic message according to the established access protocol for sending a piece of approved content within the controlled content repository to an approved customer.

BRIEF DESCRIPTION OF THE DRAWINGS

For a more complete understanding of the present application and its advantages, reference is now made to the following description taken in conjunction with the accompanying drawings, in which like reference numbers indicate like features.

FIG. 8 illustrates a screenshot of example pop-up screen detailing the reasons why individual customers may not be approved to receive the content according to some embodiments of the present invention;

FIGS. 10*a-c* illustrates a screenshot of an example approved email template with user-selected hyperlinks to approved content included within the body according to some embodiments of the present invention;

FIG. 11*c* illustrates an example email confirming receipt of the customer's request according to some embodiments of the present invention;

FIG. 13*a-c* illustrate a screenshot of one embodiment of the customer profile information screen wherein users may have access to information regarding approved email communication history with the customer according to some embodiments of the present invention;

Although similar reference numbers may be used to refer to similar elements for convenience, it can be appreciated that each of the various example embodiments may be considered to be distinct variations.

Figure 1:
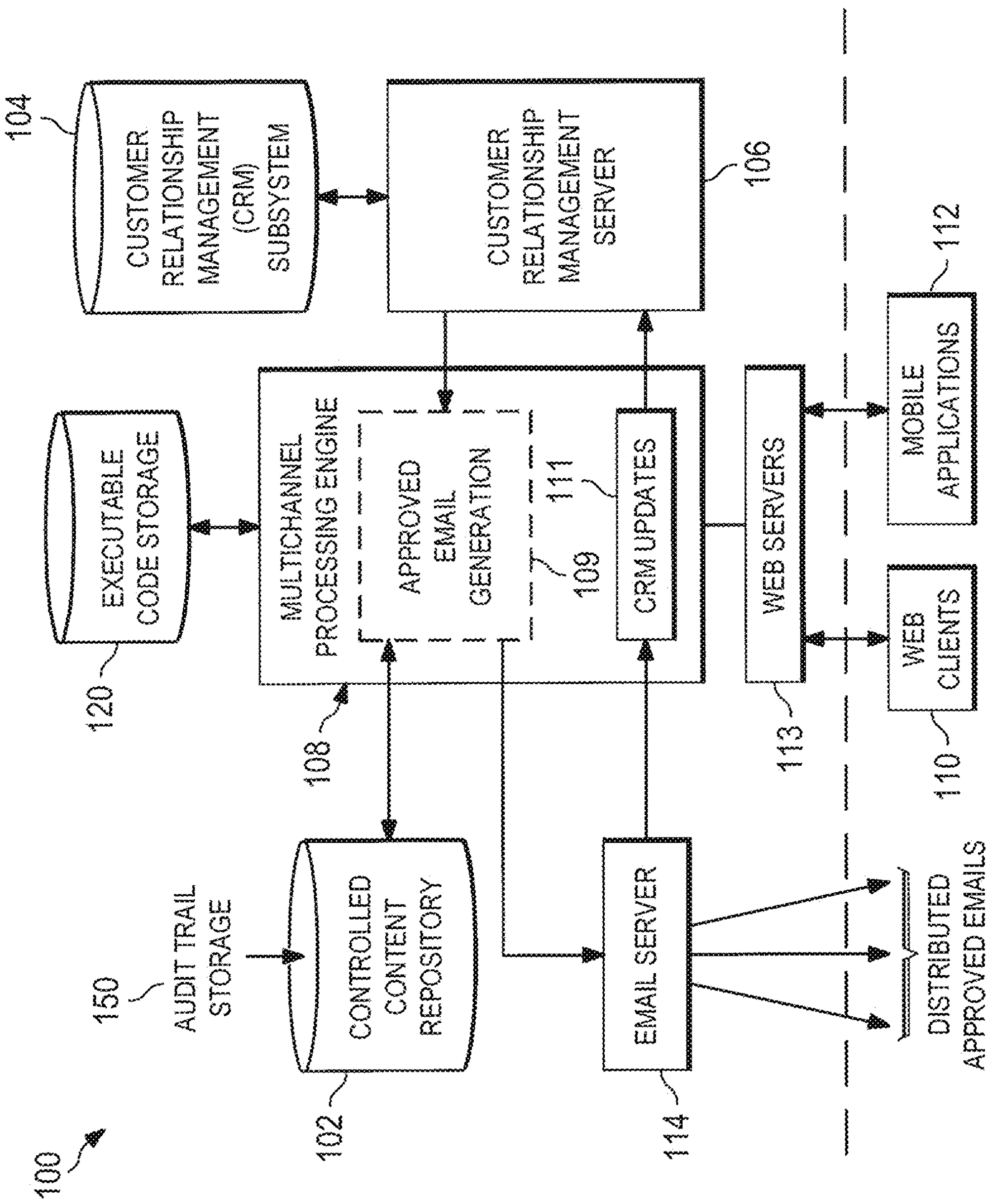
FIG. 1 illustrates an exemplary architecture for managing the building and sending of approved electronic communications according to some embodiments of the present invention.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

Embodiments disclosed in the present application allow for control of email content for communications between system users and email recipients (customers) by providing for a system and method for generating an "approved email" communication. Users may access a list of email templates which have been pre-generated with approved content and then aligned with various customer attributes such as regulatory limitations, customer preferences and demographic information in order to ensure compliant and tailored communication between the user and the customer.

Such controlled email or other electronic communication generation occurs at an interface between a repository of approved content items and templates along with customer relationship management (CRM) information including customer profile information and parameters including customer preferences and regulatory limitations or fields that can be used to facilitate compliance with regulatory limitations. The system is capable of generating warning notices to users when content and customer access do not align and users may choose various actions to address the warning notices such as excluding certain customers from the communication or changing email content. The customer information is from a customer relationship management subsystem.

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments.

After approved emails are constructed by the user, the content contained within the approved email may be once again checked for accuracy and validity by the system before release to the email server. When a customer accesses content within an approved email, the customer is directed to a customer portal through which the content is accessed. The customer may be only allowed access to the most current version of the approved content within the content repository. In this manner, the content received and viewable by the customer has been verified in real-time as being compliant, approved content.

FIG. 1 is a system overview illustrating an embodiment of a controlled email communication system 100. The presently disclosed embodiment comprises a controlled content repository 102, a Customer Relationship Management (CRM) server 106, and a multichannel processing engine 108. The customer relationship management server 106 may provide access to a customer relationship management subsystem 104, and the multichannel processing engine 108 may be coupled to an email server 114. In one embodiment, the customer relationship management subsystem 104 and/or the email server 114 may be operated by a third party. The multichannel processing engine 108 may be accessed by users such as company sales representatives through web clients 110 or through mobile apps 112 (such as iOS, Android, Blackberry, or Windows Mobile systems), communicating with the multichannel processing engine 108 through web servers 113. Although the users may be described in the present application as being company sales representatives, this particular described embodiment is not intended to limit the generality of the claims that may eventually issue in patents stemming from the present disclosure.

The controlled content repository 102 is designed to have a process for developing approved content that is sharable across multiple users, such as shareholders, reviewers, managers, marketing personnel, sales representatives, etc. The content generated in the controlled content repository 102 may be accessed on a regulated basis and used to generate approved electronic communications. This regulated basis may be determined, in part, by the company as a whole and additionally by interaction with data from the customer relationship management subsystem 104, described in further detail below. In one embodiment, approved content, customer profile information, customer preferences, and regulatory limitations and requirements may be stored in a table in the controlled content repository 102. In addition to storage and development of content, the controlled content repository 102 may also store an audit trail, tracking exact content of communications as they were sent by the user, as well as metadata about the communications and information regarding the content accessed by customers.

The customer relationship management subsystem 104 contains all contact information that may be available to users. In addition to storage of contact information, the customer relationship management subsystem 104 may also be capable of storing configurations regarding specific preferences, regulatory limitations and requirements, and other fields that will facilitate the generation of appropriate approved electronic communications, in general or on a by-recipient basis. These preferences and/or requirements include both the preferences of the user (e.g., maintaining account lists) as well as the preferences of the enterprise (e.g., employers of the users), discussed in further detail below. In some examples, the approved content and email templates may be pre-processed and stored in the controlled content repository 102 and provided to the multichannel processing engine 108 during the process for generating an approved email. In other examples, the customer relationship management subsystem 104 may have a content management subsystem and may provide the approved content and the templates.

In this embodiment, the customer relationship management subsystem 104 is capable of communication with multiple sources through the customer relationship management server 106 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date. The customer relationship management subsystem 104 may also be used to determine the type of domain an email communication is delivered through. A customer in Spain may receive an email from "CompanyX.es," whereas a customer in Germany would receive the same email from "CompanyX.ge." This may allow for additional branding options for the company controlling and sending the electronic communications.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data and to use that coordinated data for sending approved electronic communications in accordance with the system described herein.

In an embodiment, the multichannel processing engine 108 is responsible for combining the customer account information from the customer relationship management subsystem 104 with content available from the controlled content repository 102. Within the customer relationship management subsystem 104, customer accounts may be assigned a set of alignment rules which determine specific pieces of content that are available for use from the controlled content repository 102. The multichannel processing engine 108 may apply these rules and supply the user with a list of approved email templates and pieces of content that may then be used to construct an approved email communication. Approved email generation occurs within the multichannel processing engine 108 according to executable code computer instructions stored in executable code storage 120.

The executable code comprises computer readable instructions stored on the computer readable medium (the code storage medium 120). The executable code storage 120 is in communication with the various computing machines in the system 100 such as the customer relationship management server 106 and the multichannel processing engine 108. The same or another executable code storage 120 may be accessed by the previously described components of the controlled content repository 102 for providing separate computer readable code for operating upon by processing machines in that system. In all cases, the code is programmed to perform the functions that are described in the present embodiments and/or additional functions according to system design needs.

Communication between the multichannel processing engine 108 and the customer relationship management subsystem 104 may occur via the customer relationship management server 106, which acts as an interface between the two. The customer relationship management server 106 may act solely as an entry and exit point for the customer relationship management subsystem 104. The user may access the multichannel processing engine 108 through either a Web Client 110 or through the mobile apps 112 (such as iOS, Android, Blackberry, or Windows Mobile systems).

Figure 2:
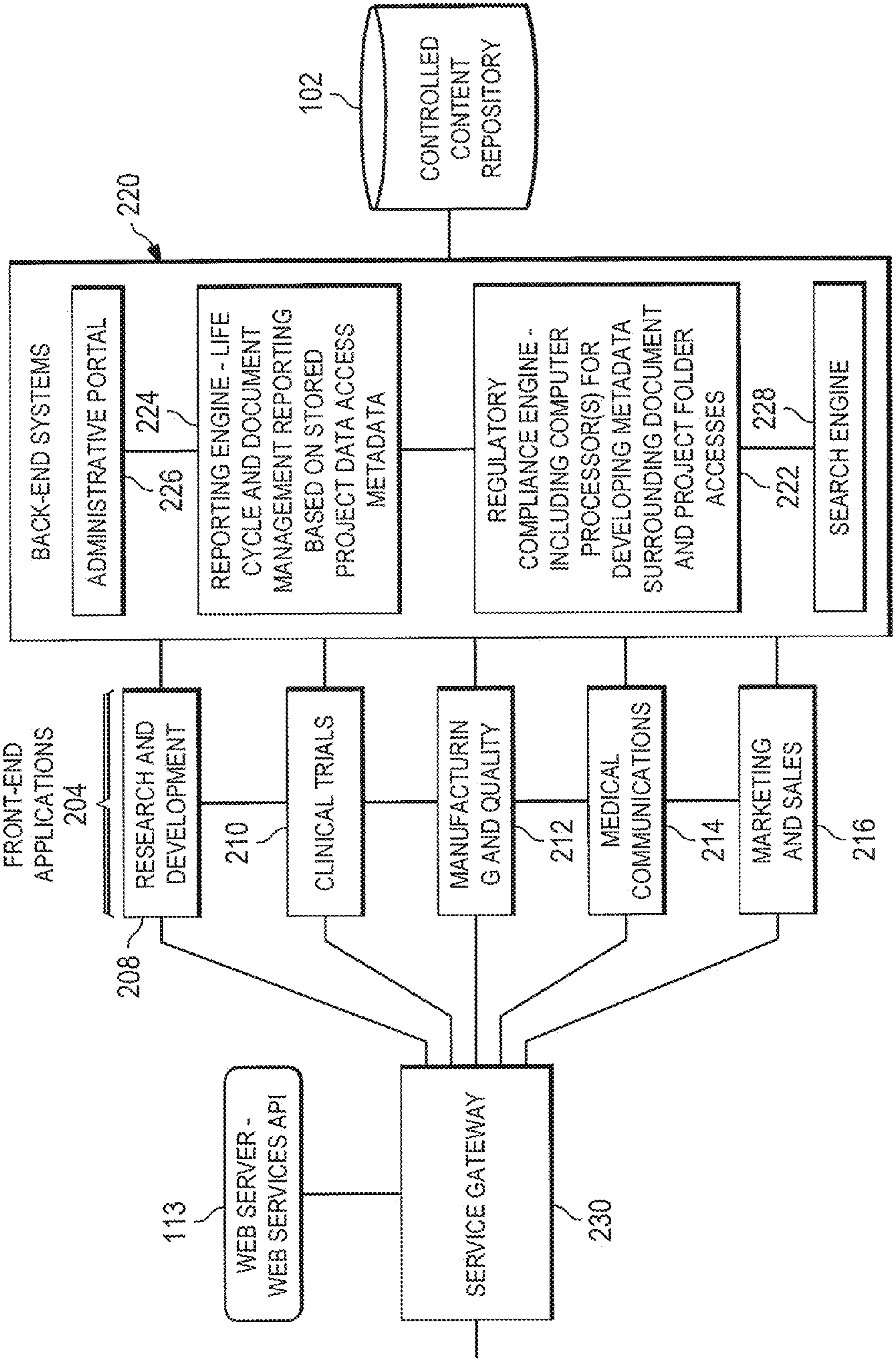
FIG. 2 illustrates an example architecture for the content repository of FIG. 1 in which content is built and organized in a controlled manner that facilitates efficient content generation according to some embodiments of the present invention.

FIG. 2 provides a description of the controlled content repository 102 with additional specific applications and interfaces connected thereto. In an embodiment, this controlled content repository 102 is a cloud-based or distributed network based system for consolidating an enterprise's data, oftentimes integrating multiple content repositories in an enterprise into a single system having coordinated control, measuring, and auditing of data creation, access and distribution.

In an embodiment of the controlled content repository 102 for the life sciences industry, as illustrated in the figure, this repository 102 can include specific data collections for the following areas and/or business process-specific front-end applications 204:

The Research & Development (R&D) front end application 208 provides for an aggregation of materials in support of research and initial trial submissions through building organized and controlled content repositories within the controlled content repository 102. Elements that can be stored, organized, and managed through this front end include submission bills of materials, Drug Information Association (DIA) reference models support, and submission-ready renderings. This front end 208 is designed to provide an interface to the controlled content repository 102 whereby researchers, contract research organizations (CROs), and other collaboration partners can access and/or distribute content through a single controlled document system.

The trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the controlled content repository 102 further provides for efficient passing off of controlled content repository content between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the controlled content repository 102 whereby it can be assured that the related documents are not distributed in contravention of law and company policy.

The communications application 214 (e.g., a medical communications application) provides for communications with facilities (e.g., data generation or processing facilities, medical facilities, etc.), including call center access, integration, and interface functionality. Particular access control features and metadata associated with this application 214 include expiration and periodic review elements, multichannel support, global documents and automatic response package generation through the controlled content repository 102.

The marketing and sales application 216 application provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the controlled content repository 102.

In disclosed embodiments, there are provided a number of back-end system applications 220 that provide for the management of the data, forms, and other communications in the controlled content repository. For example, the back-end systems applications 220 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further include prevalidation functionality to build controlled content in support of installation qualification (IQ) and/or operational qualification (OQ), resulting in significant savings to customers for their system validation costs.

In further disclosed embodiments, the back-end systems 220 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the controlled content repository 102.

In further disclosed embodiments, the back-end systems 220 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 220 may include a search engine 228 whereby the controlled content repository 102 can deliver simple, relevant and secure searching.

In providing this holistic combination of front-end applications 204 and back-end system applications 220, the various applications can further be coordinated and communicated with by the service gateway 230, which in turn can provide for communications with various web servers and/or web services APIs 113. Such web servers and/or web services APIs 113 can include access to the content and metadata layers of some or all of the various applications 204 and systems 220, enabling seamless integration among complementary systems.

In the context of the described embodiments, the particular features and capabilities integrate with the other elements of the controlled email communication system 100 such that particular features are usable within the various user screens. For example, and without limitation to any other possible combination of features, in the below-described description of generating an approved electronic communication, the above-described search portal can be used to search for approved attachments (i.e. content) within the controlled content repository 102 which may be then attached to one of the template emails being prepared for sending to a customer. And the synergy of combining these particular systems is that the generation of the controlled content can be done in a controlled fashion such that the approved content can be sent to customers with greater confidence in the integrity of the data being sent.

Figure 3A:
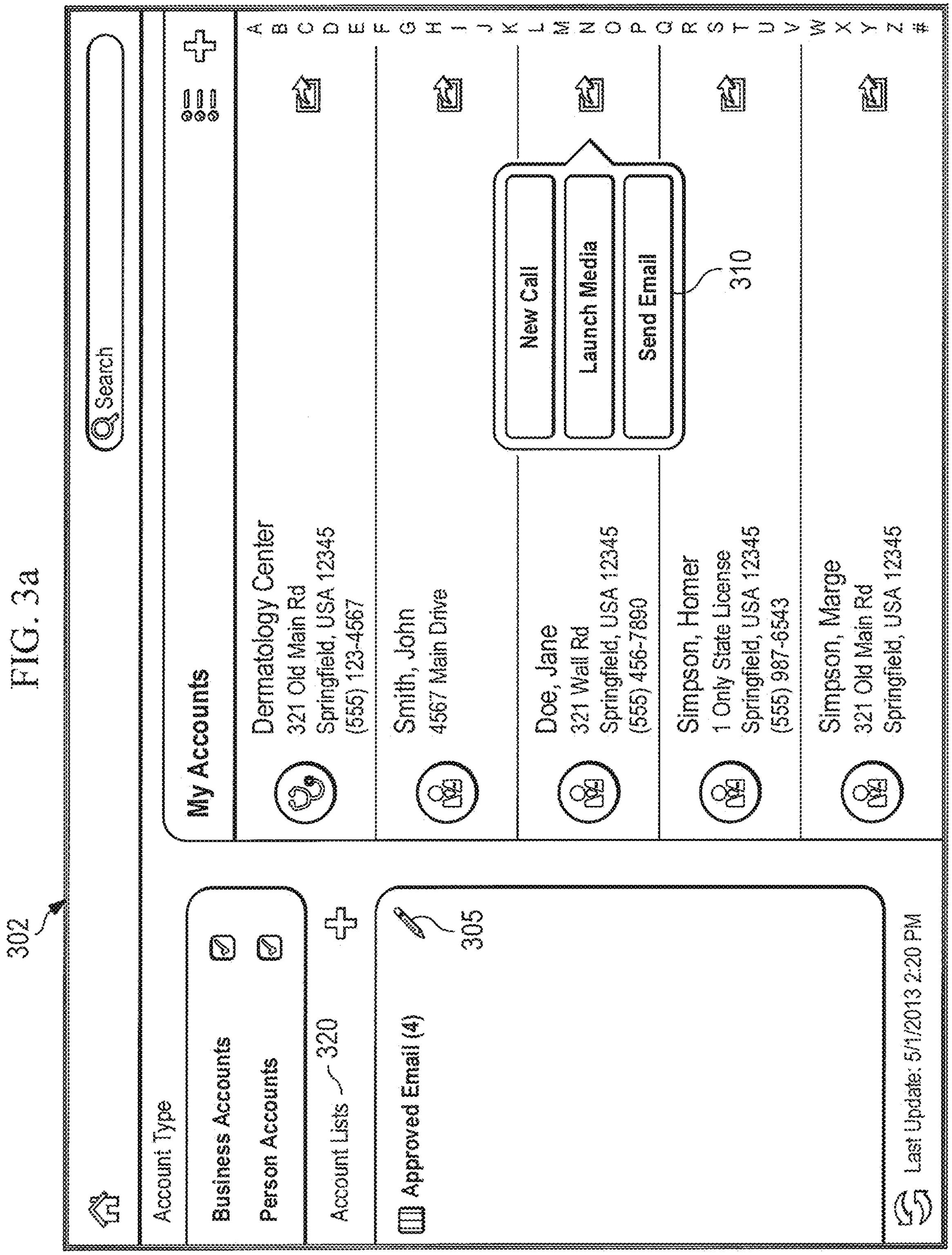
FIG. 3*a* illustrates a screenshot showing one embodiment of the "My Accounts" option where the user may access personalized customer mailing lists according to some embodiments of the present invention.

FIG. 3*a* illustrates an embodiment screenshot 302 of a "My Accounts" interface in a web-based or mobile interface within a web-based system 110 or mobile system 112 (see FIG. 1). From this screen 302, a user may select an individual account from a list of existing physician or other clinical accounts within the customer relationship management subsystem 104. By selecting a specific individual account from the "My Accounts" screen 302, the user can be taken to a screen containing current contact information for the selected account as stored in the customer relationship management subsystem 104. From this screen, users may begin constructing an approved email to the individual customers by selecting a "Compose Email" link on the screen. In this embodiment, there are additional options within the web-based or mobile application 110, 112 for sending an individual customer an approved email. From the "My Accounts" screen 302 shown in FIG. 3*a*, the user may also click on or mouse over the "Action" sheet shown in this embodiment to the right of the contact name to get a pop-up window and select a "Send Email" link 310 in the pop-up window. The user may click on a link 305 to update information of the accounts.

Figure 3B:
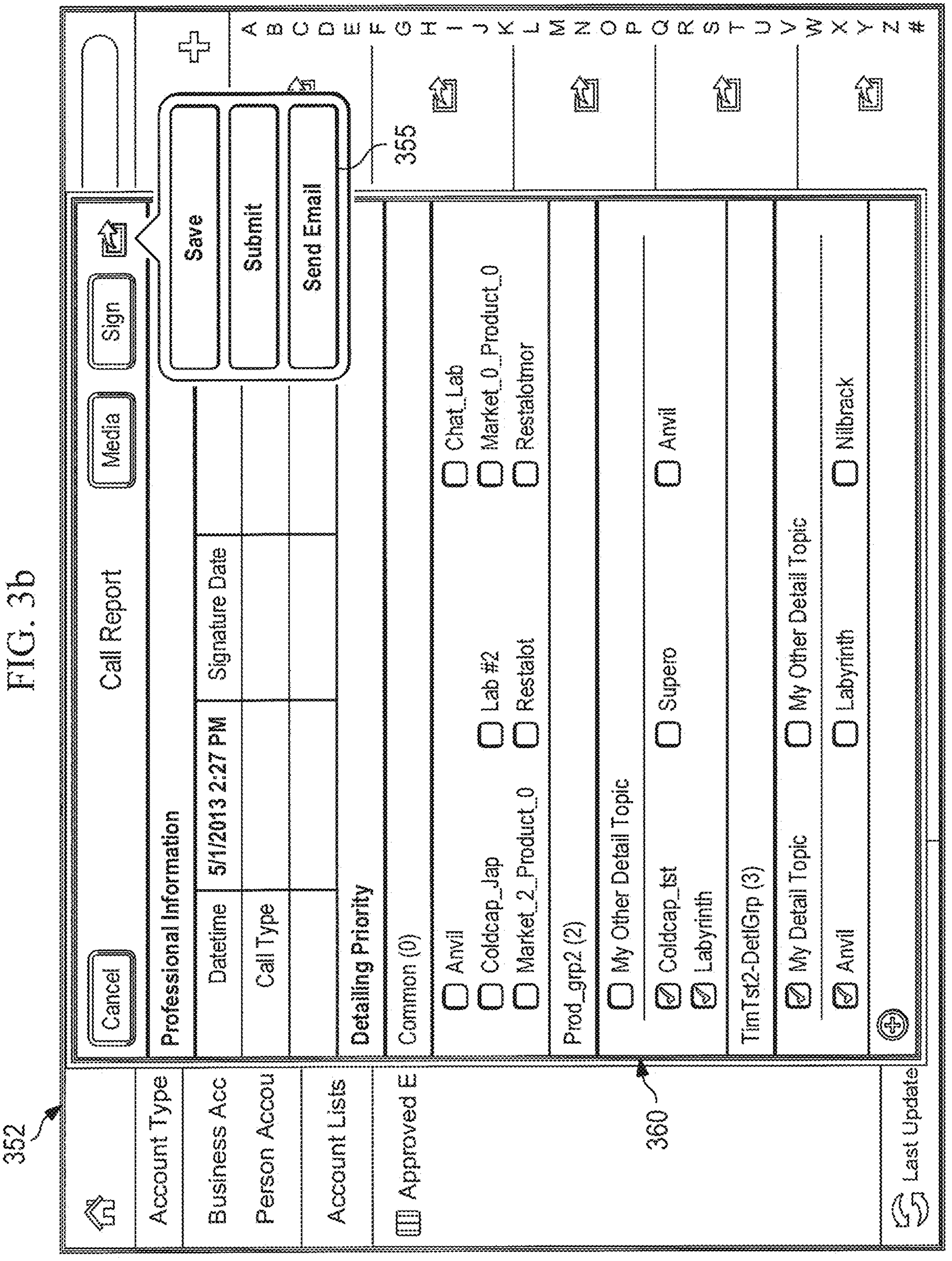
FIG. 3*b* illustrates a screenshot showing an embodiment of starting to build an approved email from a content page according to some embodiments of the present invention.

A user may also begin constructing an email from a content page, e.g., when the user is viewing a document or a video on his screen. FIG. 3*b* illustrates an embodiment screenshot 352 of a "Call Report" interface in a web-based or mobile interface within a web-based system 110 or mobile system 112 (see FIG. 1). While viewing a Call Report 360 on screen 352, a user may decide to send content related to some topics in the Call Report. The user may click on or mouse over the "Action" sheet next to the "Sign" link shown in this embodiment to get a pop-up window and then select a "Send Email" link 355 in the pop-up window. After that, the screenshot 302 may be displayed for the user to build an approved email. Because the described system including the controlled content repository 102 provides for a coherent and controlled access to the approved content for email communications, it can be made quite flexible as to providing consistently formatted and approved content from various applications and/or specific screenshots within applications.

Figure 4:
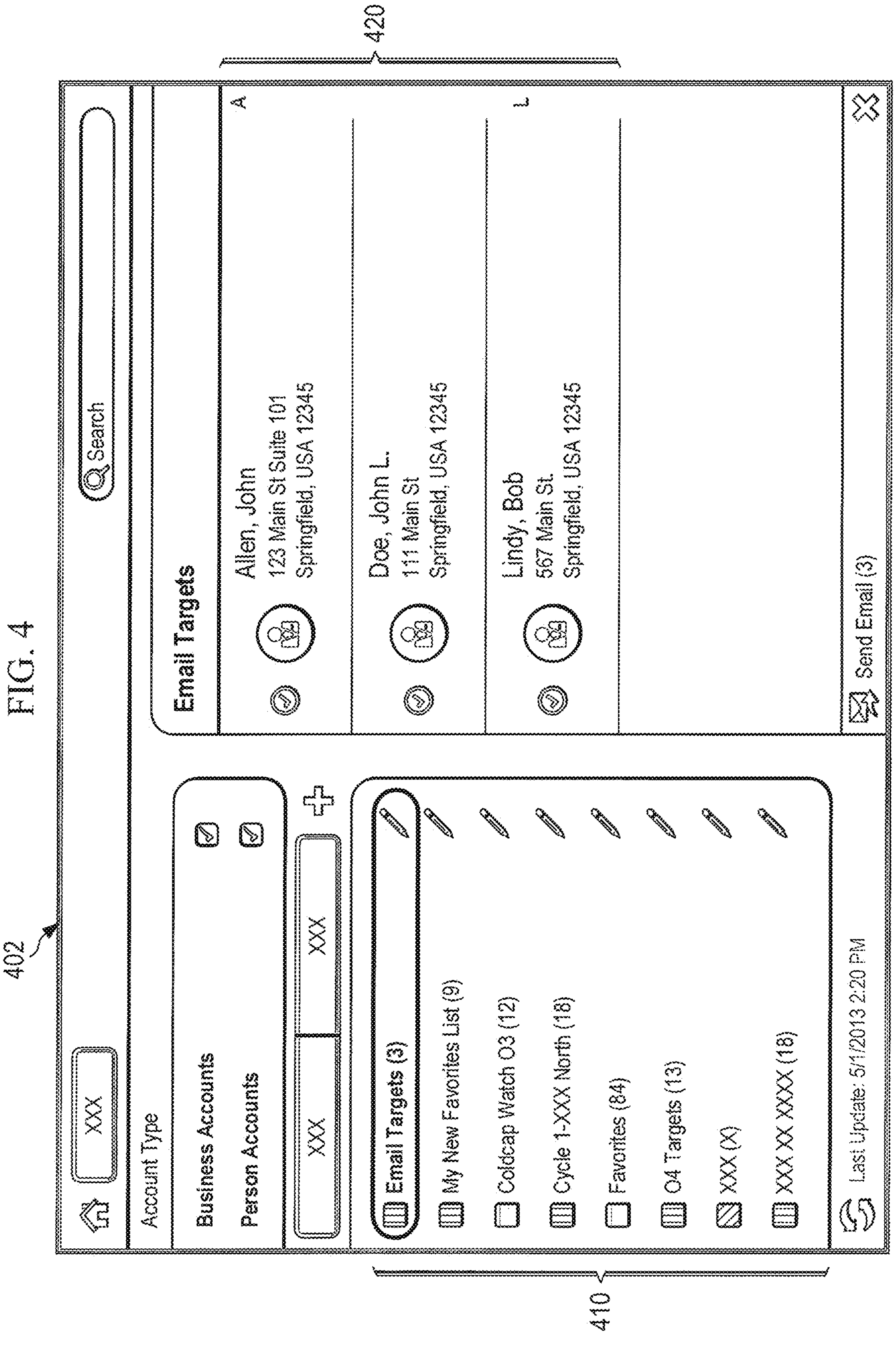
FIG. 4 illustrates a screenshot showing one example of the "Email Targets" option in the mobile application (or web application) from which users may select individuals from the mailing list as recipients of an approved email according to some embodiments of the present invention.

Referring now to FIG. 4, by selecting the "Account Lists" 320 on the left hand side of the screen in FIG. 3*a*, users may access personally or institutionally pre-constructed lists 410 of individual customers as configured in the customer relationship management subsystem 104. From this screen 402, the user may also select a number of individual customer accounts 420 with whom they wish to communicate. Once desired customers have been selected from the list, which could include the selecting of all customers in the list, the user may begin building an approved email to the selected customers through the web-based or mobile client application 110, 112. The email may be constructed within the multichannel processing engine 108 from the accessible content provided by the controlled content repository 102 which has been aligned with the customer information provided by the customer relationship management subsystem 104.

Figure 5:
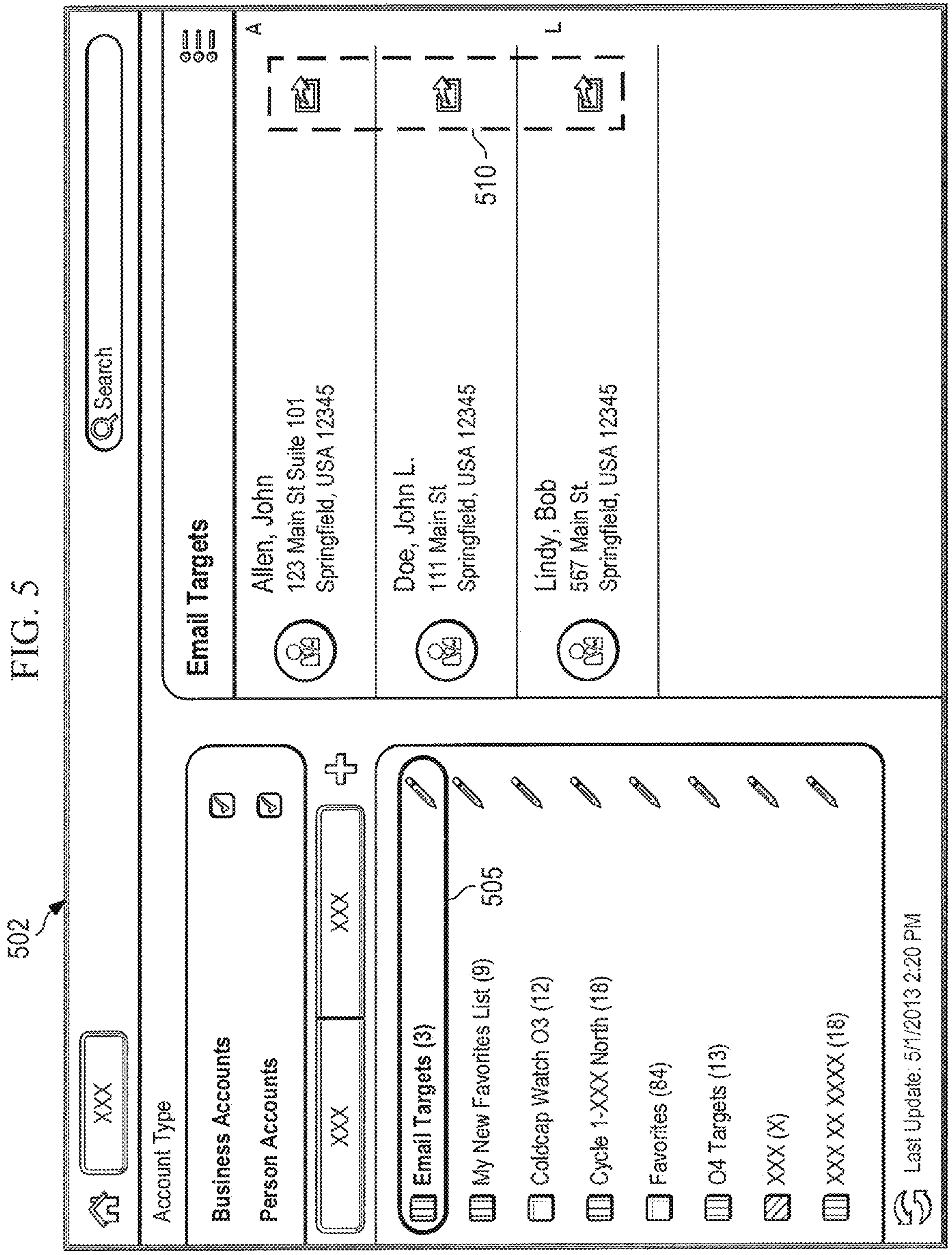
FIG. 5 illustrates a screenshot of an example "Email Targets" screen with individual email targets selected to receive an approved email according to some embodiments of the present invention.

FIG. 5 illustrates an exemplary screenshot 502 in which the user begins constructing the approved email by selecting an "Email Targets" link 505. The link icon may also contain the number of selected customers in parentheses. In this embodiment, the "Send Email" links 510 appear after the customer selection of the "Email Targets" link 505.

Figure 6:
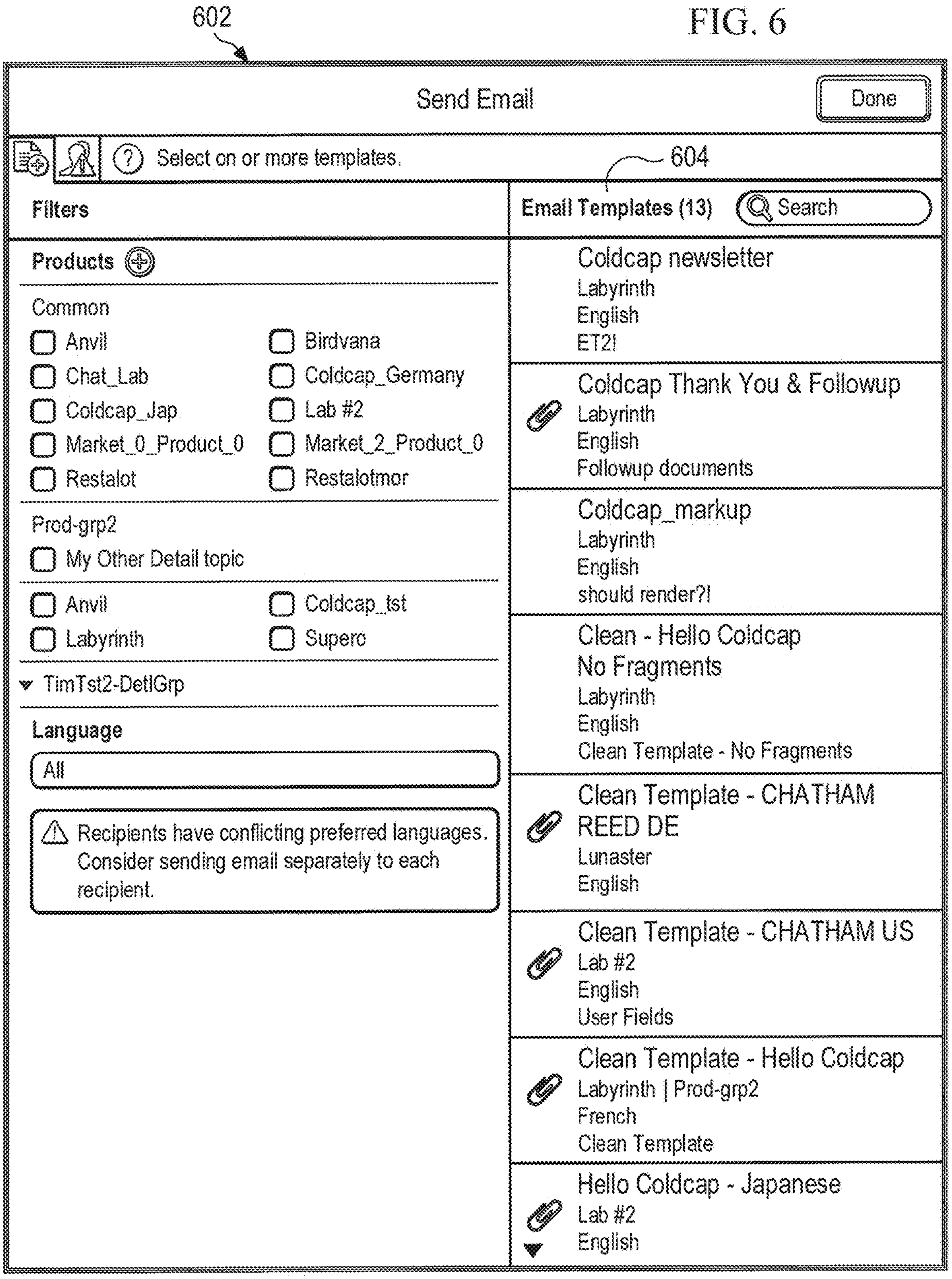
FIG. 6 illustrates a screenshot of one embodiment of an "Email Template" selection screen where the user may choose one or more customer-aligned templates to generate approved emails to selected customers according to some embodiments of the present invention.

Shown in FIG. 6, by selecting the "Send Email" link, the user may access the "Email Generation Wizard." From this screen 602, a user may access pre-approved, controlled email templates 604 that are available and approved for the specific group of customers selected. From this approved list, the user may select multiple templates. After desired templates are selected, individual tabs appear at the top of the screen and within each tab is a separate approved email which may be sent to the selected customers.

Figure 7:
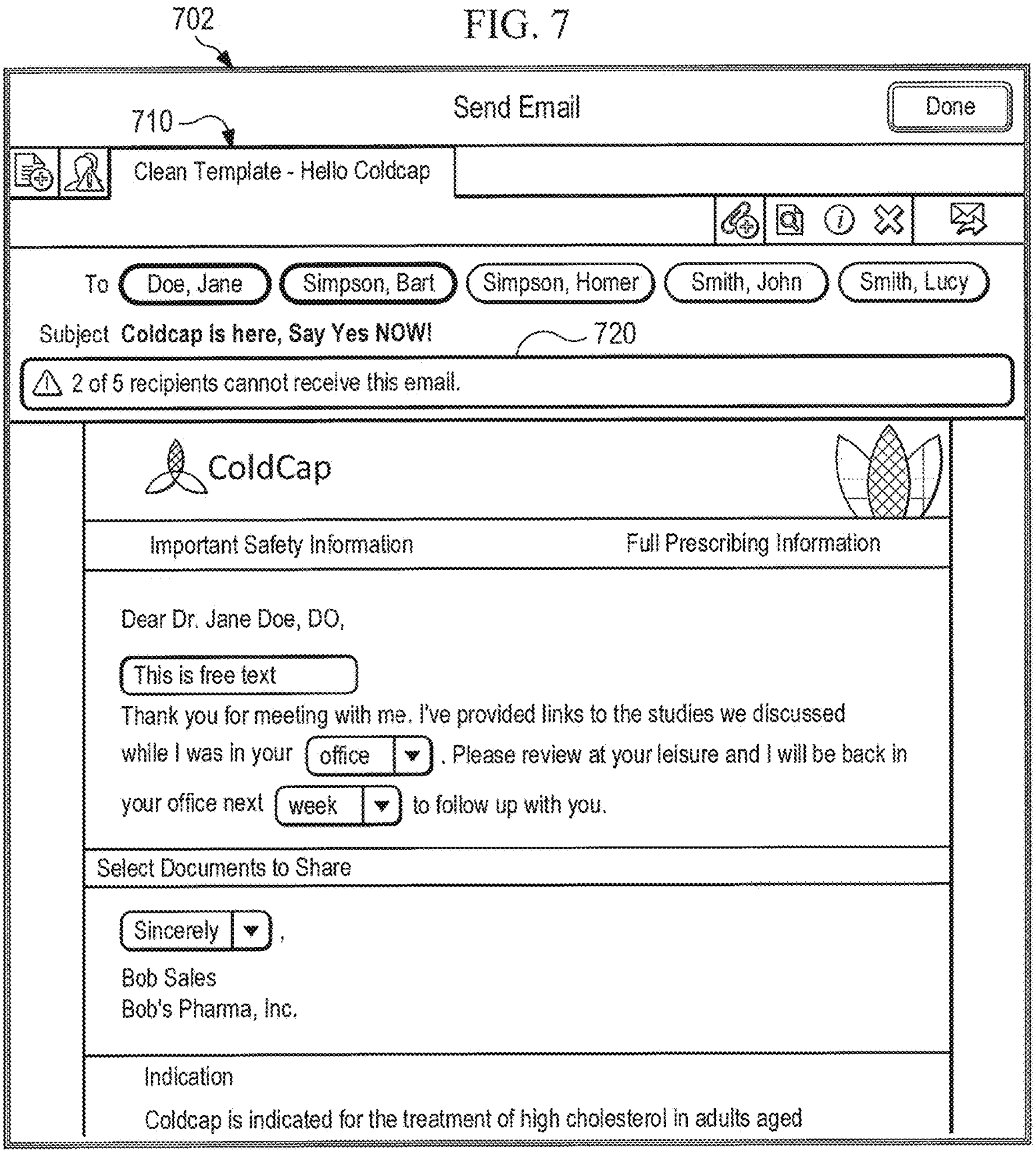
FIG. 7 illustrates a screenshot of an example approved template for email generation with an example warning icon indicating that one or more of the email recipients is unapproved to receive the content within the template or content attached to the template email according to some embodiments of the present invention.

The user may access an individual template, as shown in the screenshot 702 of FIG. 7, by selecting the appropriate tab 710. The template may also display a warning icon 720, shown in the top left of FIG. 7, which indicates that one or more of the selected individuals may be restricted from receiving the chosen template with its current content. This warning is generated from information contained within the customer relationship management subsystem 104. The user may select this icon 720, which generates a pop-up window 802 containing specific warning information for all potential recipients who may be currently restricted from receiving the content, shown in FIG. 8. Recipients may be removed from the email list on this screen by selecting the appropriate icon.

Warnings generated on the pop-up screen 802 illustrated in FIG. 8 may appear for reasons that include, but are not limited to, regulatory limitations, customer preferences, demographic information, a customer "opt-out" option where the customer has requested to not have the content delivered; the absence of a customer "opt-in" option where the customer may not receive the communication without prior approval; or that the most current information contained within the customer account profile no longer allows access to the current content delivered by the controlled content repository 102. Information regarding regulatory limitations, customer preferences, demographic information, the "opt-in" or "opt-out" status of individual customer accounts is stored within the customer relationship management subsystem 104.

Figure 9:
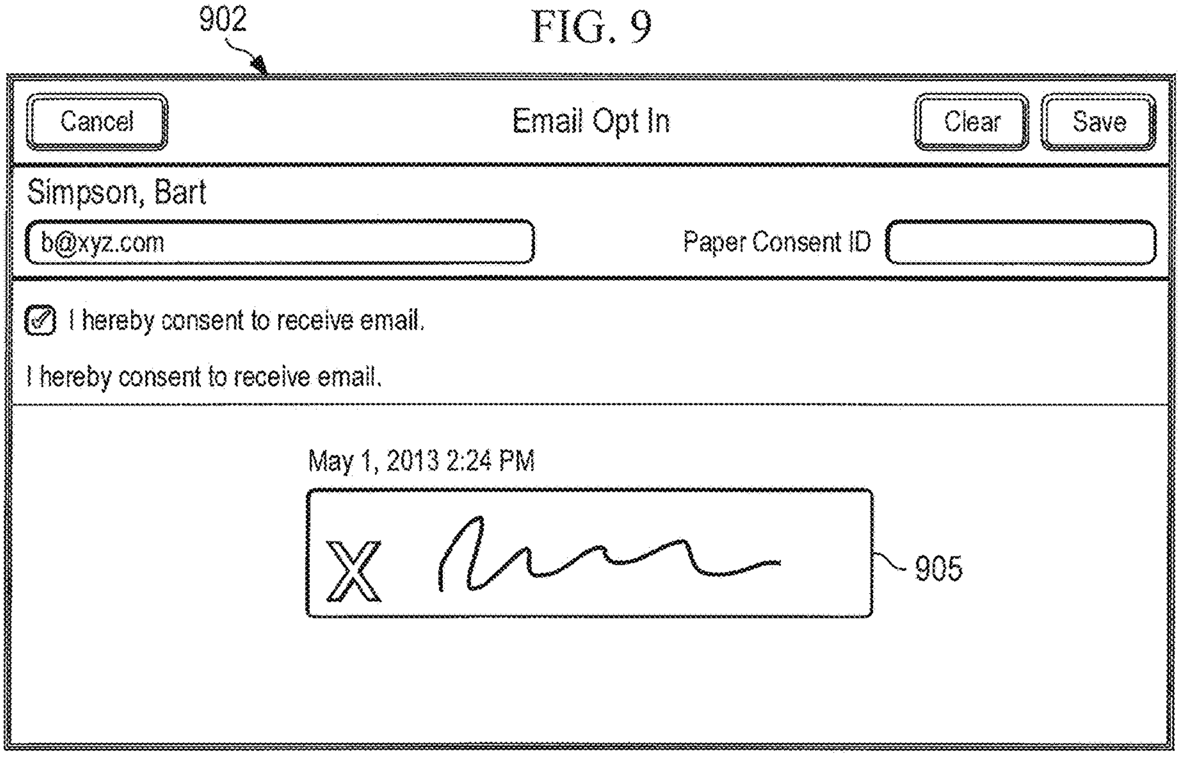
FIG. 9 illustrates a screenshot of one embodiment of the signature capture technology available to users through the mobile application to provide for remote opt-in for electronic communications according to some embodiments of the present invention.

In an embodiment, as shown in FIG. 9, the user may access an "opt-in" request 902 from the recipient of the email through the web-based or mobile client applications 110, 112. In this embodiment, the user may have access to signature capture technology, which allows for instant, remote customer approval along with the appropriate signature 905.

Figure 10A:
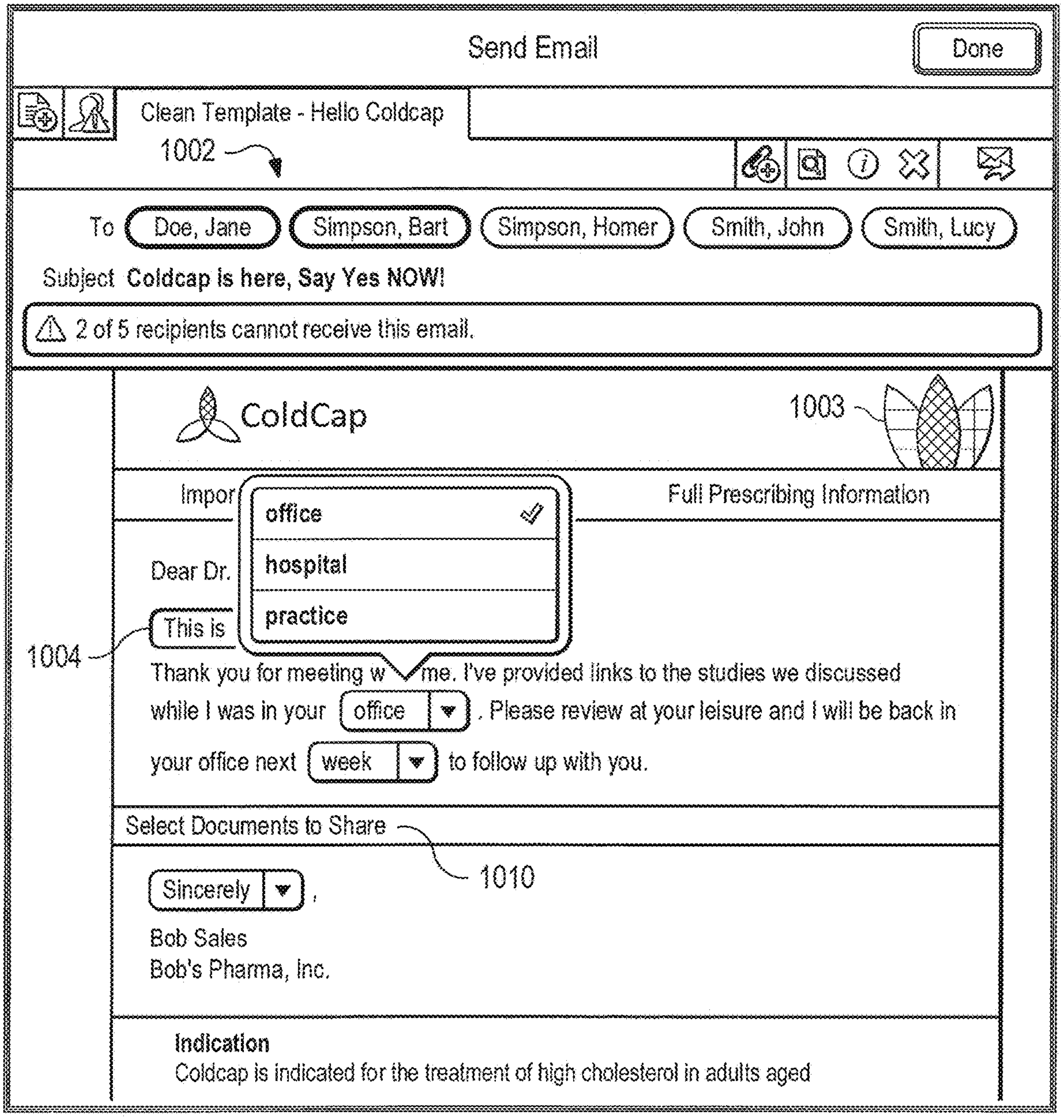

Once all warnings are cleared, or all restricted recipients are removed from the list, the user may once again have access to the approved email template 1002 as illustrated in FIG. 10*a*. Email templates may be either "branded" with imagery 1003 or may be presented in a plain, text-only format, selectable by the user. As illustrated in FIG. 10*a*, the user may have the ability to personalize the email content by free-texting in the text box 1004 supplied within the template. This customizable text box 1004 may also be regulated to ensure compliance by limiting the number of characters that may be typed in the box and by constructing "libraries" of restricted words for each customer that may not be used in the box. The information used to regulate the text box may be accessed from the customer relationship management subsystem 104, and configuration of these regulatory parameters may be designated by both the company, by the specific customer, and/or by specific regulation. Within the approved template, the user may choose from approved content to be included in the body of the email.

The user may select the "Select Documents to Share" icon 1010 within the template, which generates a pop-up screen 1020 (see FIG. 10*b*) containing a list of approved content from within the controlled content repository 102 that has been aligned with the customer information retrieved from the customer relationship management subsystem 104. From the pop-up screen 1020, the user may select multiple content items to be included within the body in the form of one hyperlink per selected content item. As the content items are selected, they are added to the body of the email as individual tiles 1030 as illustrated in the center of FIG. 10*b*. The list of content items may be rearranged by the user by dragging the tiles into the desired order. The user may preview the approved email on the web-based or mobile applications 110, 112 as it will be received by the customer by selecting the "magnifying glass" icon 1040 located within the template screen. The user may then return to the edit function by selecting an "editing" icon or clicking outside the document selection pop-up screen 1020.

Figure 10C:
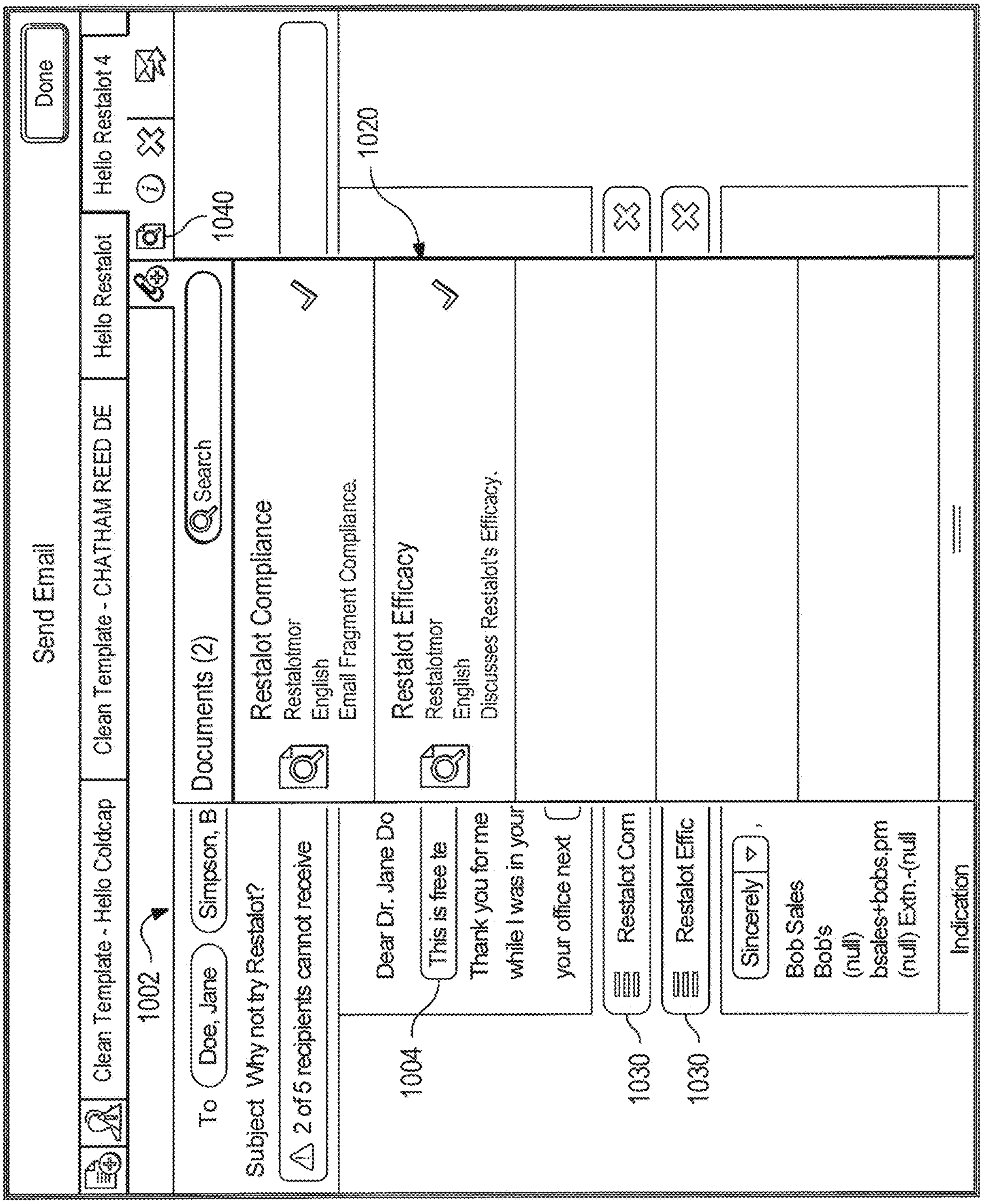

From this continued editing screen 1050 of FIG. 10*c*, the user may also select a customized valediction from a drop-down menu located within the template 1050. The overall approved content authoring system described herein includes selection capabilities that are highly flexible, highly configurable, and may be applicable to any place within the approved email template. The user may then send the email to selected recipients using the "Send" icon 1060 illustrated in FIG. 10*c*.

Figure 10D:
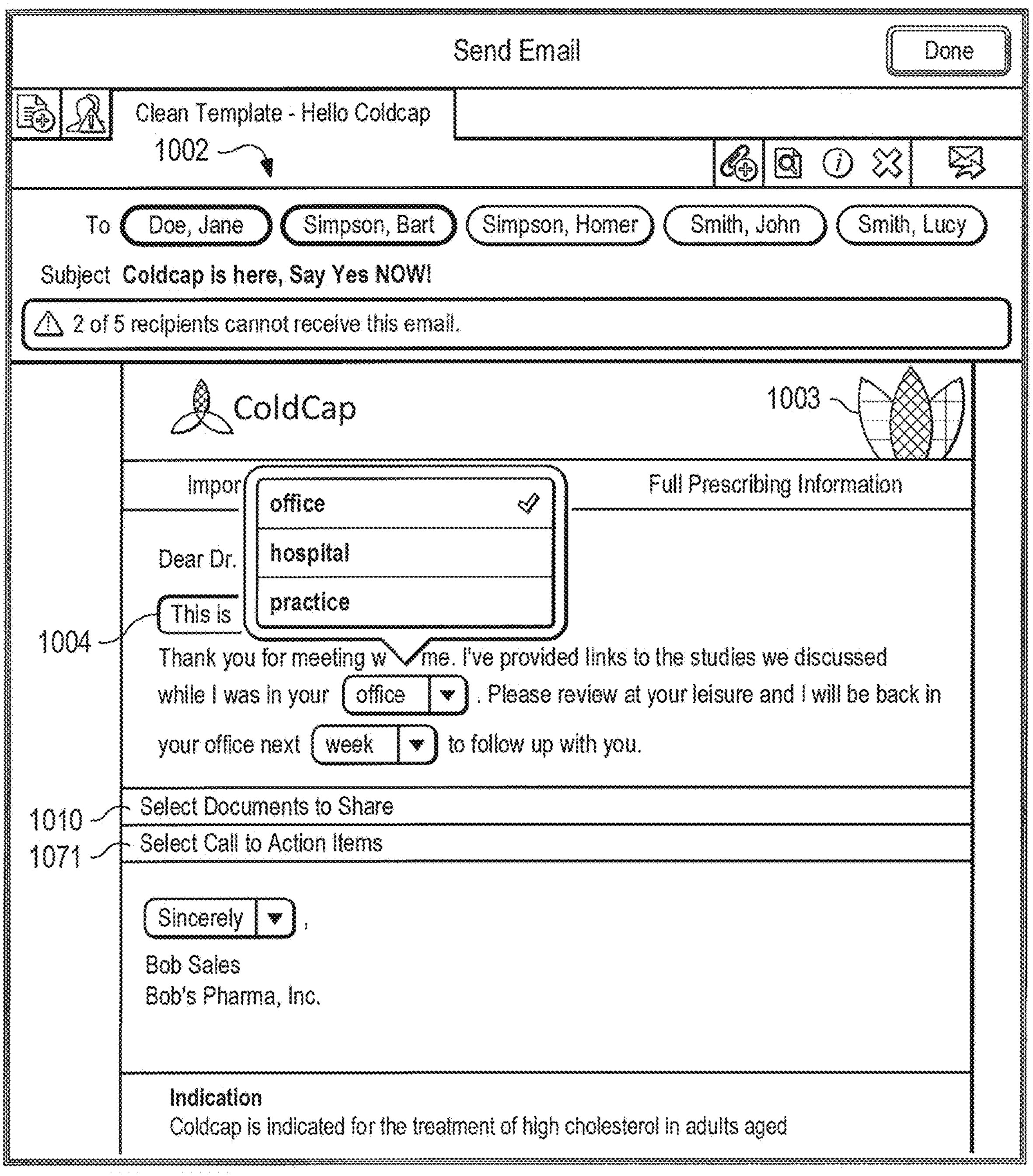
FIGS. 10*d-f* illustrate screenshots of an example approved email template with a call to action according to some embodiments of the present invention.
Figure 10E:
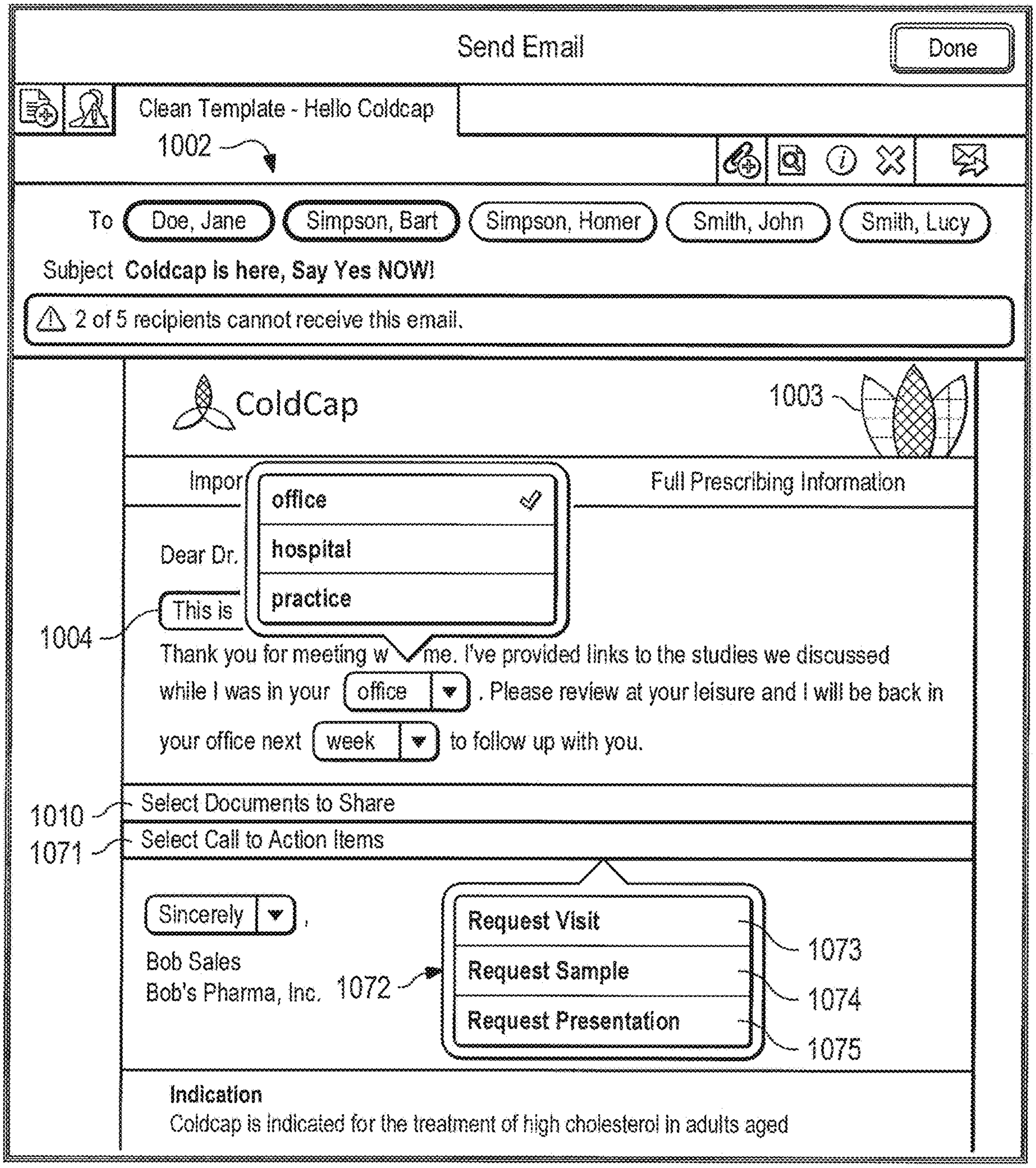
Figure 10F:
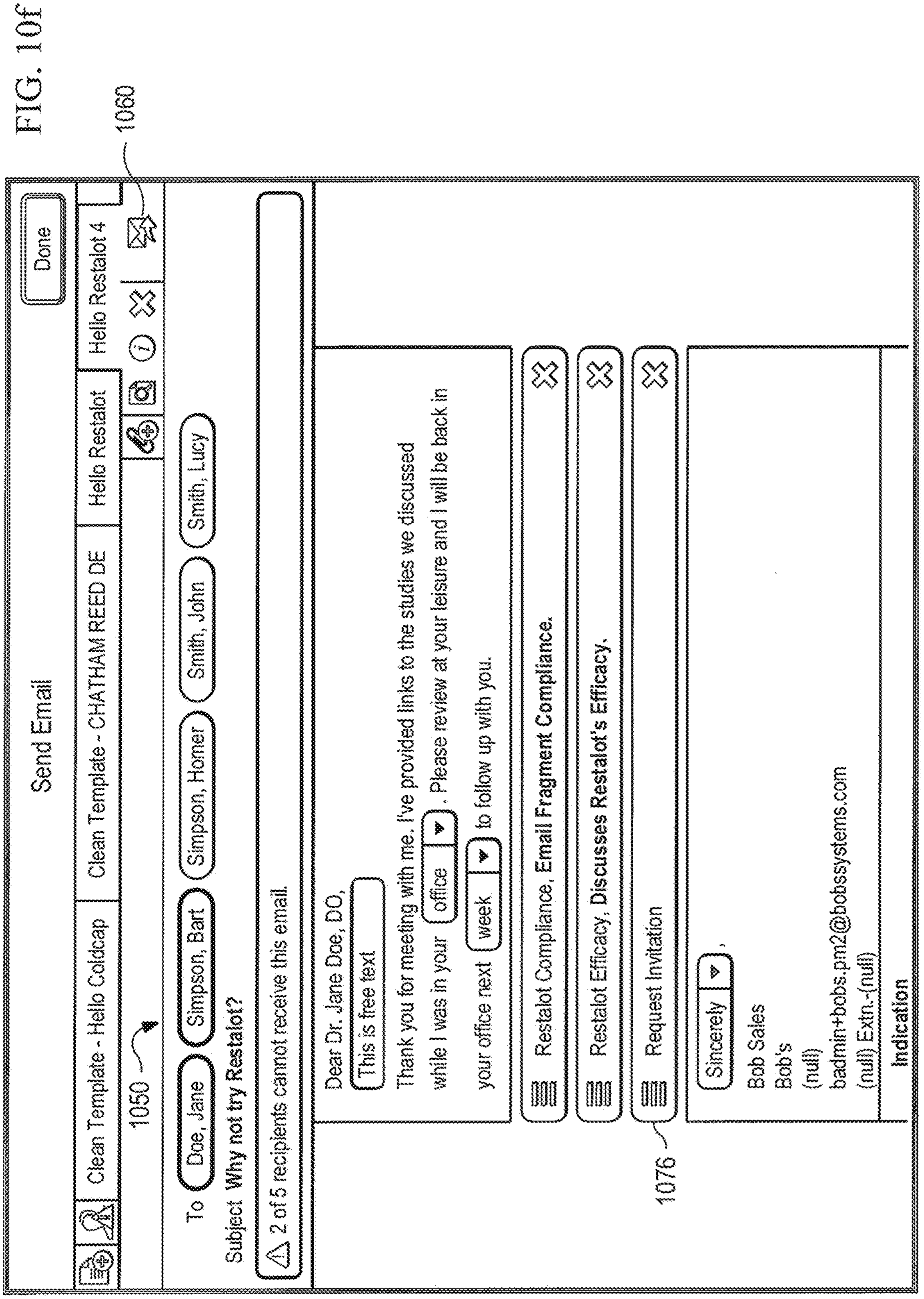

FIGS. 10*d-f* illustrate screenshots of another example approved email template. The user may select a "Select Call to Action Items" icon 1071 within the template in FIG. 10*d*, which generates a pop-up screen 1072 (see FIG. 10*e*) containing a list of call to action items that have been aligned with the customer information retrieved from the customer relationship management subsystem 104. The call to action items may include Request Visit 1073, Request Sample 1074, and Request Invitation 1075. From the pop-up screen 1072, the user may select one or more call to action items to be included within the body of the email to be sent. As the call to action items are selected, each of them may be added to the body of the email as an individual clickable area, e.g., a hyperlink or a button 1076 as illustrated in FIG. 10*f*. The email may have multiple call to action items and they may be rearranged by the user by dragging the tiles into the desired order.

In one implementation, instead of providing the pop-up screen 1072 and the list of call to action items shown in FIG. 10*e*, the multichannel processing engine 108 may determine, with the customer information retrieved from the customer relationship management subsystem 104, the best call to action item to be included in the email. For example, if the customer requested a visit before, the best call to action item to be included may be "Request Sample". The preconfigured call to action item may then be included in the template.

The communications between the mobile applications 112 or the web clients 110 and the multichannel processing engine 108 may use any communication protocols between a web client and its server, e.g., HttpPost.

In one embodiment, the content contained within the generated email may be once again checked for accuracy and validity by the system just before releasing. Once the approved email is generated in the multichannel processing engine 108 and the user selects the "Send" icon, the communication is then sent to the controlled content repository 102 for final verification of the accuracy and validity of the selected content. The controlled content repository 102 may also store audit trail data 150 which documents and retains information that may include, but is not limited to, recipient information, time stamp data, and the most current version number of any content included within the approved email. The communication is then sent back to the multichannel processing engine 108, where it may be routed through an email server 114 and then delivered to the customer's preferred inbox. The multichannel processing engine 108 may send only enough information to the email server 114 for the email server 114 to create an email, and the email server 114 may create the actual email to be sent to the customer. The email server 114 may collect and distribute the outbound email content, but it may also collect interaction information from the customer regarding clicks, views, and other statistics regarding customer usage. As shown in FIG. 1, this information may then be posted back to the multichannel processing engine 108 as CRM updates 111 and sent through the customer relationship management server 106 to be deposited in the customer relationship management subsystem 104 as information contained within the customer account profile. The email sent may also be stored in the customer relationship management subsystem 104.

Figure 11A:
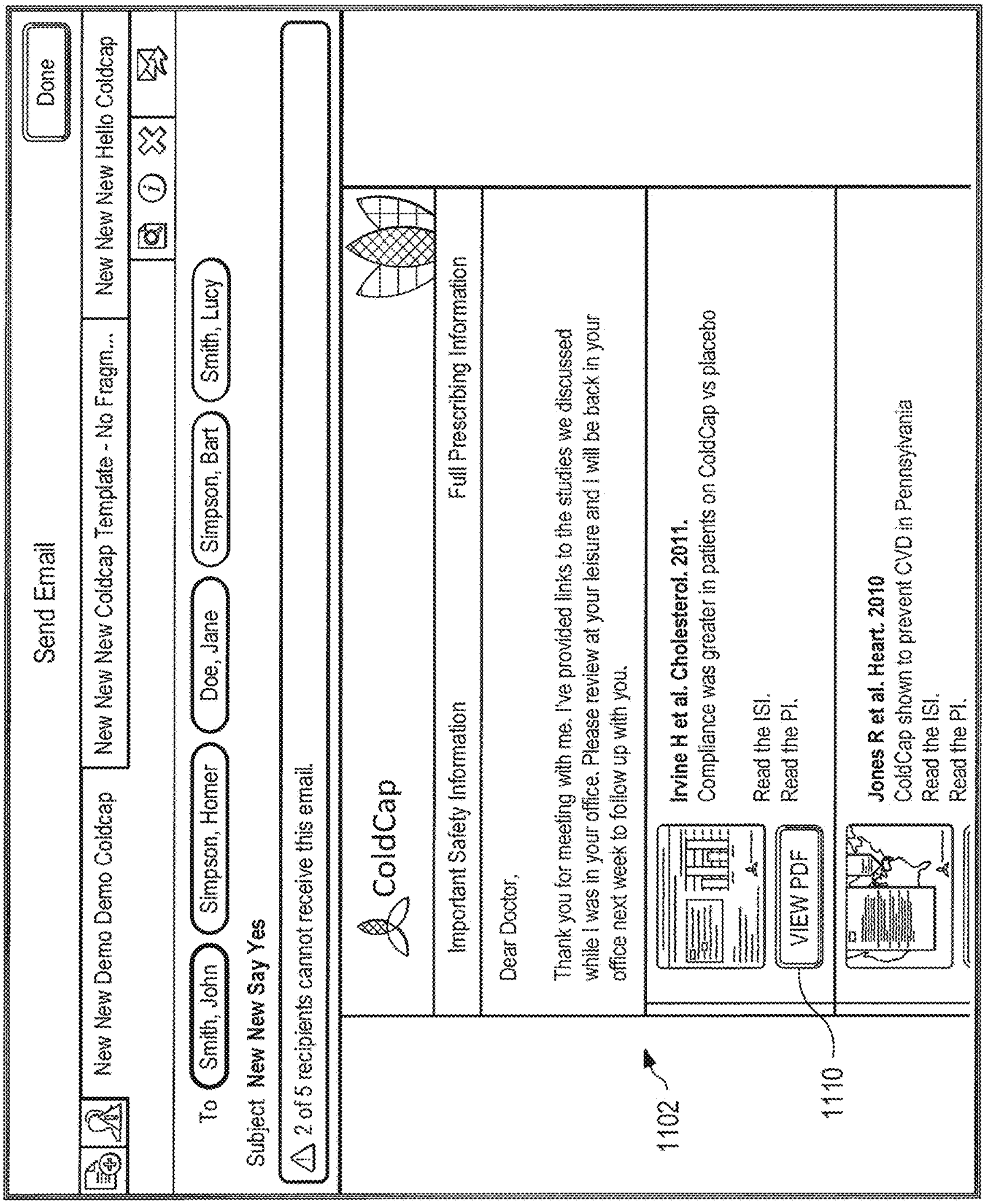
FIGS. 11*a-b* illustrate screenshots of example "Preview" screens, from which the user may view the approved email in the format in which it is viewable by the recipient according to some embodiments of the present invention.
Figure 12:
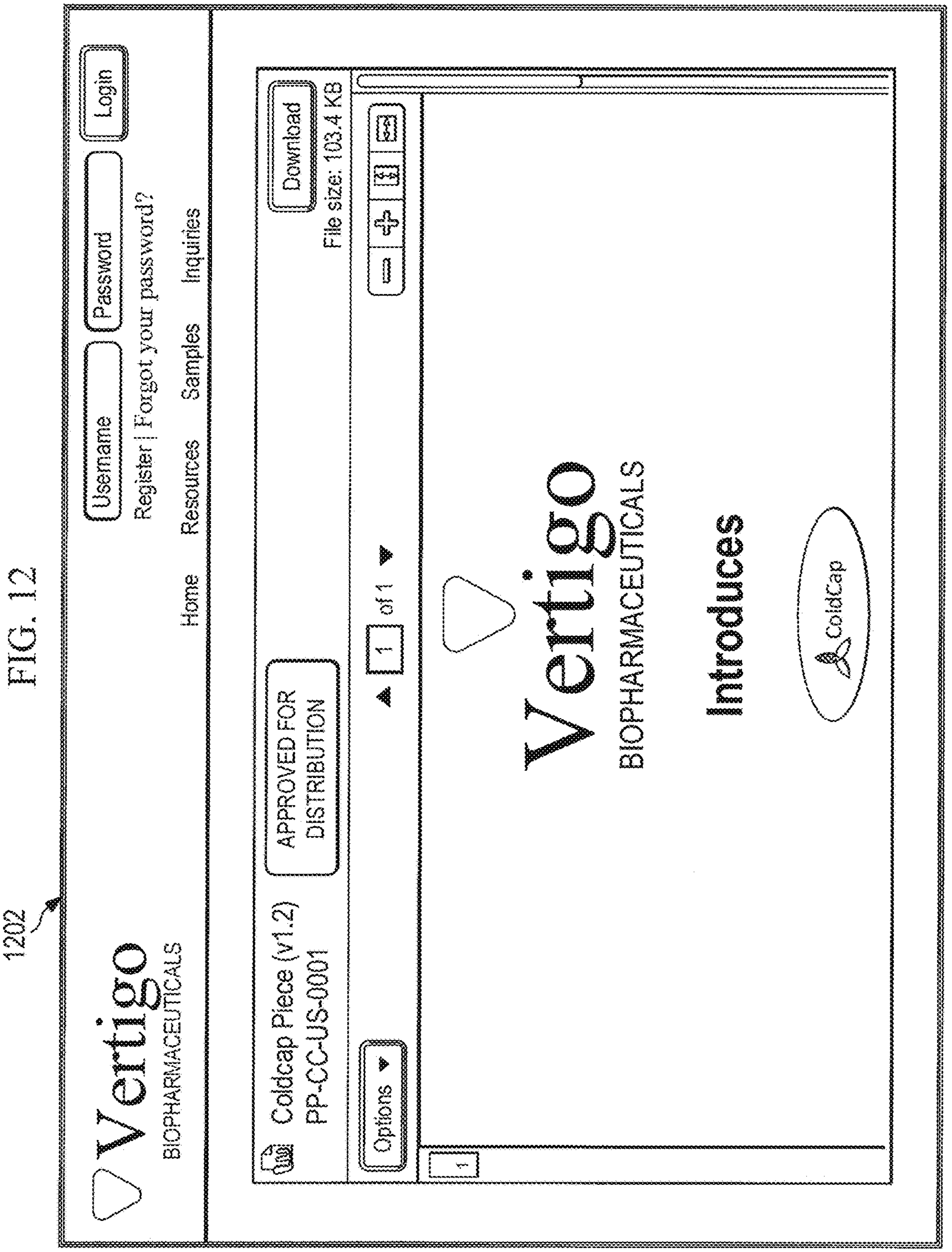
FIG. 12 illustrates a screenshot of an example customer portal through which customers may access approved content from the controlled content repository according to some embodiments of the present invention.

As shown in the approved email preview screen 1102 illustrated in FIG. 11*a*, when an approved email is opened by the customer, the customer may have immediate access to communications as they appeared in the "preview" screens or thumbnails available to the user through the web-based or mobile applications 112. This communication 1102 includes the readable text and a tiled list of approved content hyperlinks, shown in the figure. The recipient may choose to view the content by selecting the appropriate content icon. In an embodiment of the system, the recipient may select the "view pdf" hyperlink 1110 within the email, which will redirect the recipient to the customer portal screen 1202, shown in FIG. 12. Each recipient has the ability to custom-configure the specific URL to be loaded as the "landing page" for clicks from the approved emails.

This arrangement allows for the direction of customers to specific portals. Within the portal 1202, the recipient may view the full text of the content that was included as a tile within the body of the original approved email. The content is accessed directly from the controlled content repository 102 to ensure that the most up-to-date information is displayed when the customer accesses the selected content. If the content has been updated to a newer version since the user constructed the approved email, then the hyperlink included in the approved email will automatically connect the customer to the most up-to-date version of the selected content. Information regarding the content version viewed by the customer may be stored with other pertinent information about the customer experience in the audit trail within the controlled content repository 102. In one embodiment, the controlled content repository 102 may create a token for the approved content to be sent with the approved email. The token may have information about which piece of content to show to the customer, and direct the customer to the right content. In one embodiment, even when the content is updated after the email is sent, the token may direct the customer to the latest version of the content.

Figure 11B:
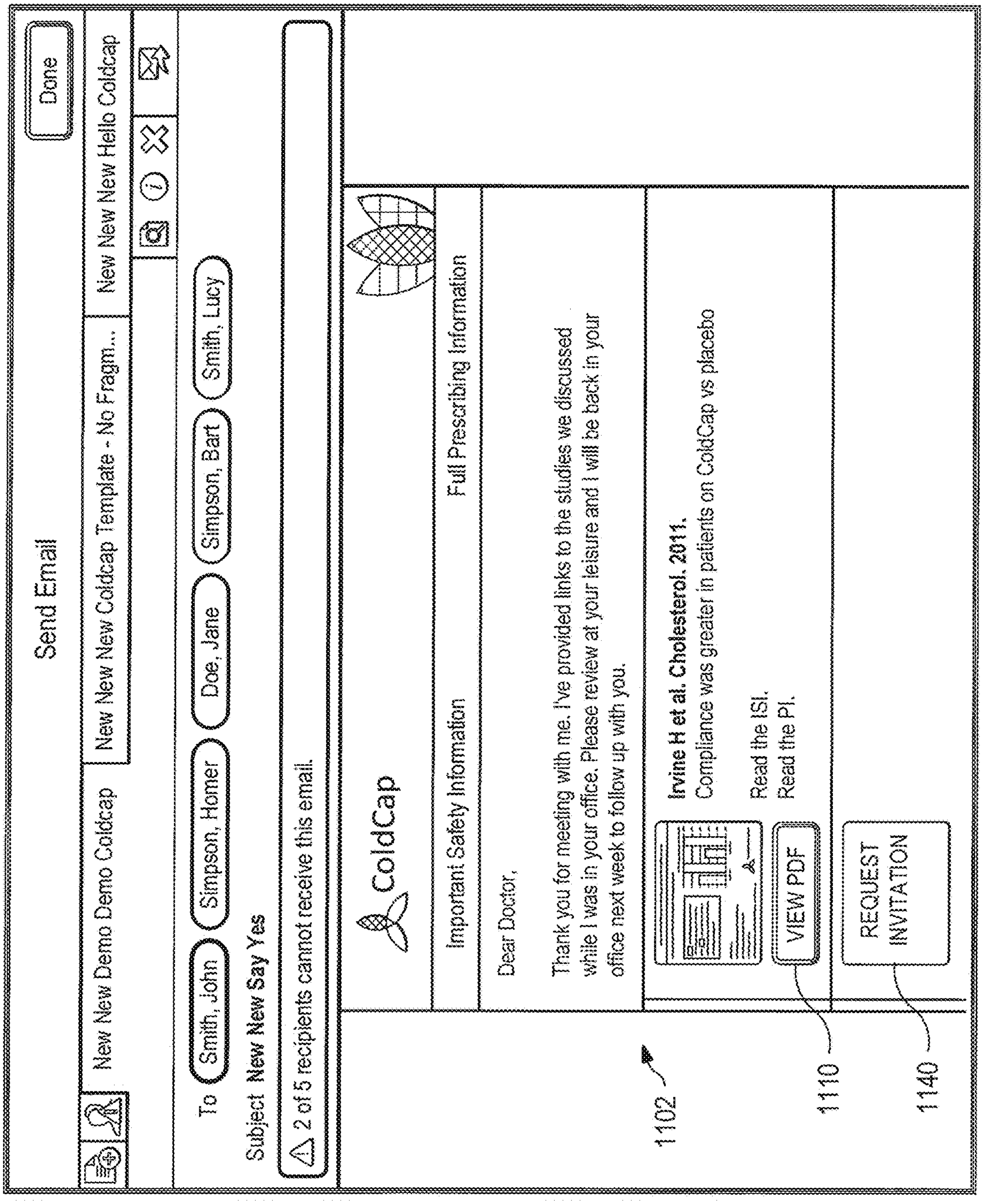

The communication 1102 may also include one or more call to action items 1140 as illustrated in FIG. 11*b*. If the user clicks on the clickable area for a call to action item, he/she may receive an email 1150 confirming receipt of the request, as shown in FIG. 11 *c*.

Figure 13A:
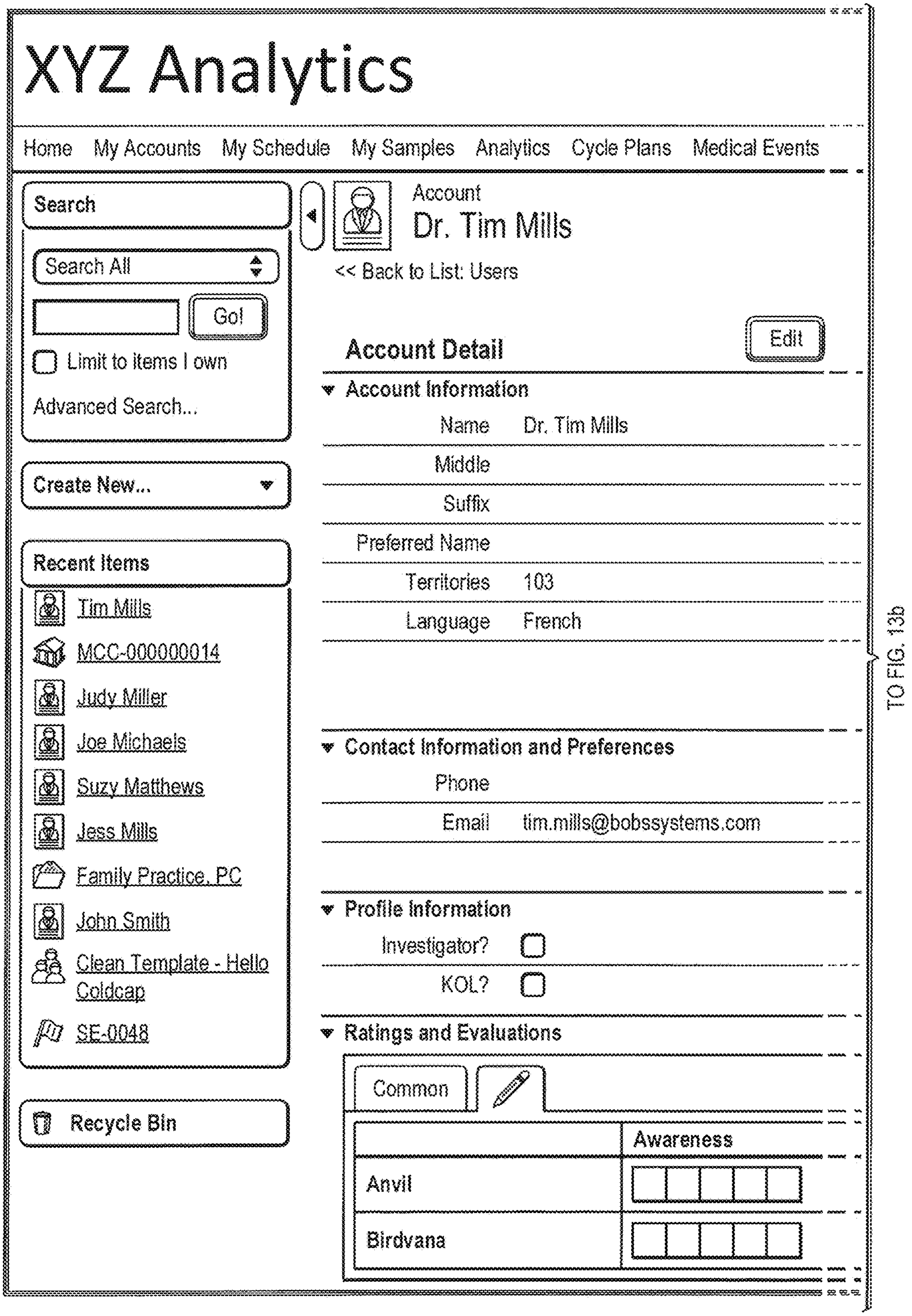

Illustrated in FIG. 13*a*-*b* is an embodiment of the system that allows the user access to information regarding specific communications. This information is stored in the customer relationship management subsystem 104 along with customer account information. The user may access this information through either mobile apps 112 or through web clients 110. The information available may include, but is not limited to, the number of times the approved email communication has been opened by the customer, the number of clicks executed, type of device used to access the communication, platform used when accessing the content, and location when the communication was viewed.

Figure 14:
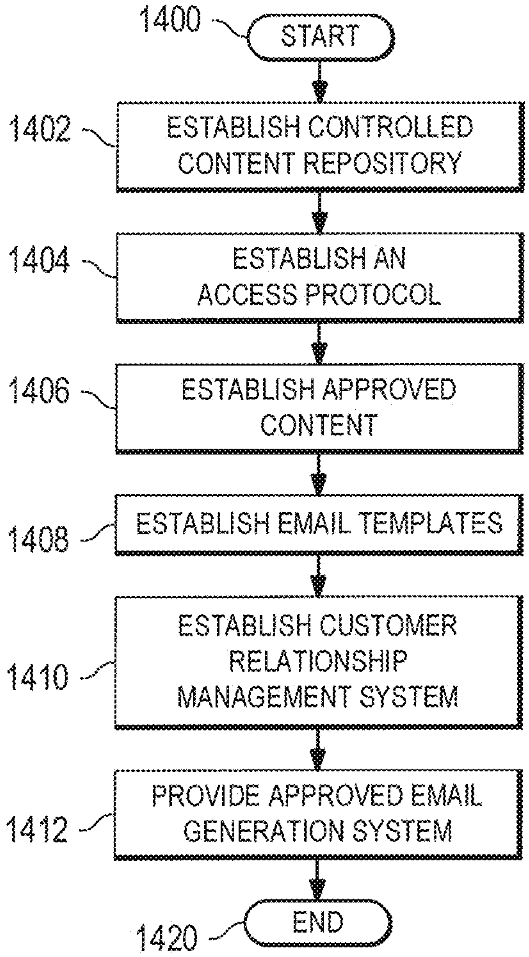
FIG. 14 is a flowchart illustrating the providing and/or provisioning of an approved email system according to some embodiments of the present invention.

FIG. 14 is a flowchart illustrating the building and/or provisioning of exemplary elements of an approved email system in accordance with the embodiments disclosed in the present application. The method starts and block 1400, after which the system builders and/or administrators establish a controlled content repository 102 at block 1402. As described herein, the controlled content repository is designed to be securely and controllably accessed such that only authorized users can build the controlled content therein. To ensure the integrity and security of the controlled content repository 102, an access protocol is established at block 1402. The access protocol may be defined by computer instructions stored in the computer readable memory or executable code storage 120. By the computer instructions stored therein, the multichannel processing engine 108 is thereby able to control access to the controlled content repository 108 in accordance with the principles described in the present application.

At block 1406, one or more users establish approved content to be stored in the controlled content repository 102 under the control of the access protocol established at block 1402 (or as that protocol is later changed or updated). At block 1408, a system designer or other admin establishes or updates email templates that approved content senders can pick and choose from in building approved email content messages. At block 1410, a customer relationship management (CRM) system is accessed such that the approved emails can be addressed to customer contacts of the enterprise or salesperson for the enterprise who is engaging in the marketing, manufacturing, clinical trials, or other activity described herein. At block 1412, the actual email generation system is provided that interfaces with the approved content, the access protocol, the email templates, and/or the customer relationship management system. This email generation system, or more specifically the multichannel processing engine 108, is accessed by senders of approved email content as described in the present application.

It should be appreciated that as previously discussed, the customer relationship management system 104/106 may be further operable to communicate with multiple sources of information to build a current and accurate collection of information regarding customer accounts. It should also be appreciated that to facilitate such communications, at least one of the multiple sources of information that might communicate with the custom relationship management system 104/106 may communicate with external servers that belong to one or more third-party partners or agencies through an Application Programming Interface ("API") whereby the customer relationship management system can flexibly receive data updates from the one or more third-party partners or agencies. The access protocol that is established may also include a set of alignment rules that determine specific pieces of approved content that are available to the selected customers from the controlled content repository.

While FIG. 14 is described in basic terms regarding its general operation as a controlled content access system, it should be appreciated that such a system is described herein with multiple specific implementations. Such specific implementations can be facilitated through front-end applications in the context of supporting research, development, and initial trial submissions as previously described. Other front-end applications as previously described include manage access and/or distribution of trial documents and reports in support of ongoing trials, materials control and/or manufacturing process controls, communications with facilities in support of facility operations, and the development and distribution of promotional materials as related to regulatory restricted products such as prescription drugs.

To facilitate the compliance with government regulation, a regulatory compliance engine can be provided to review content and the access protocols and to ensure that only approved content authored by properly authorized individuals and according to required controls can be distributed to permitted possible customers or other content recipients in accordance with government regulations.

Figure 15:
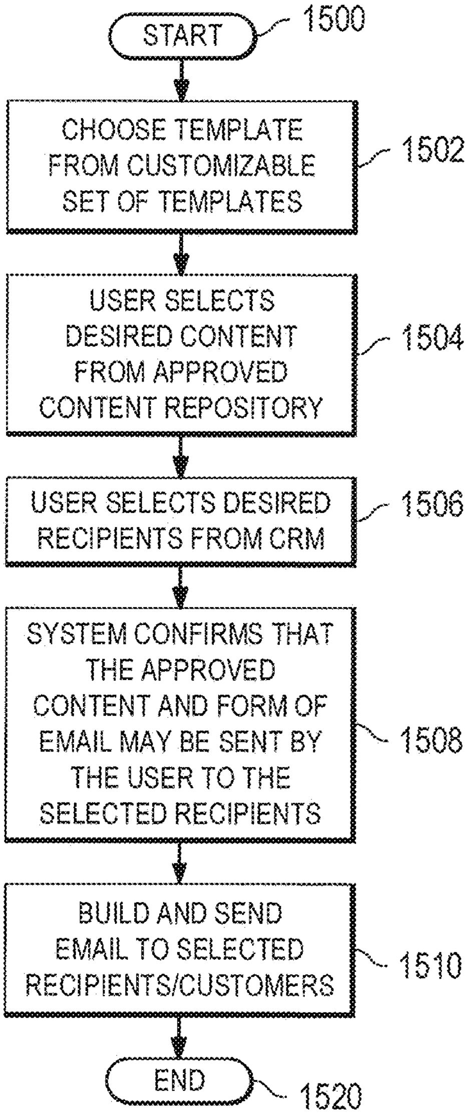
FIG. 15 is a flowchart illustrating the building and sending of approved emails according to some embodiments of the present invention.

Next with regard to FIG. 15, a method for generation of approved email content is described. In particular, FIG. 15 shows at block 1500 the start of the process, after which at block 1502 an email author or prospective sender can choose a template from a set of customizable templates. In this way the email authors or prospective senders do not have to recreate content every time an email campaign is beginning. At block 1504, the user selects the desired content from the approved content repository 102, and the user at block 1506 selects the desired recipients or customers from the CRM database 104.

Still referring to FIG. 15, the system, or more specifically the multichannel processing engine 108 confirms that the approved content and form of email may permissibly be sent by the prospective email sender to the customers or other selected recipients at 1508 based on factors including but not limited to regulatory limitations, customer preferences, demographic information, or the "opt-in" or "opt-out" status of individual customer accounts. Once that has been confirmed in accordance with the access protocol, the multichannel processing engine 108 can begin building and sending the emails in accordance with the user's selections or as modified in accordance with the access protocol, regulator engine, and or other system controls, at 1510. The content contained within the approved email may be checked for accuracy and validity by the system before release to the email server 114. If the email is created when the user is offline, the content contained in the approved emails may be checked again after the user is back online, before they are sent to the email server.

Figure 16A:
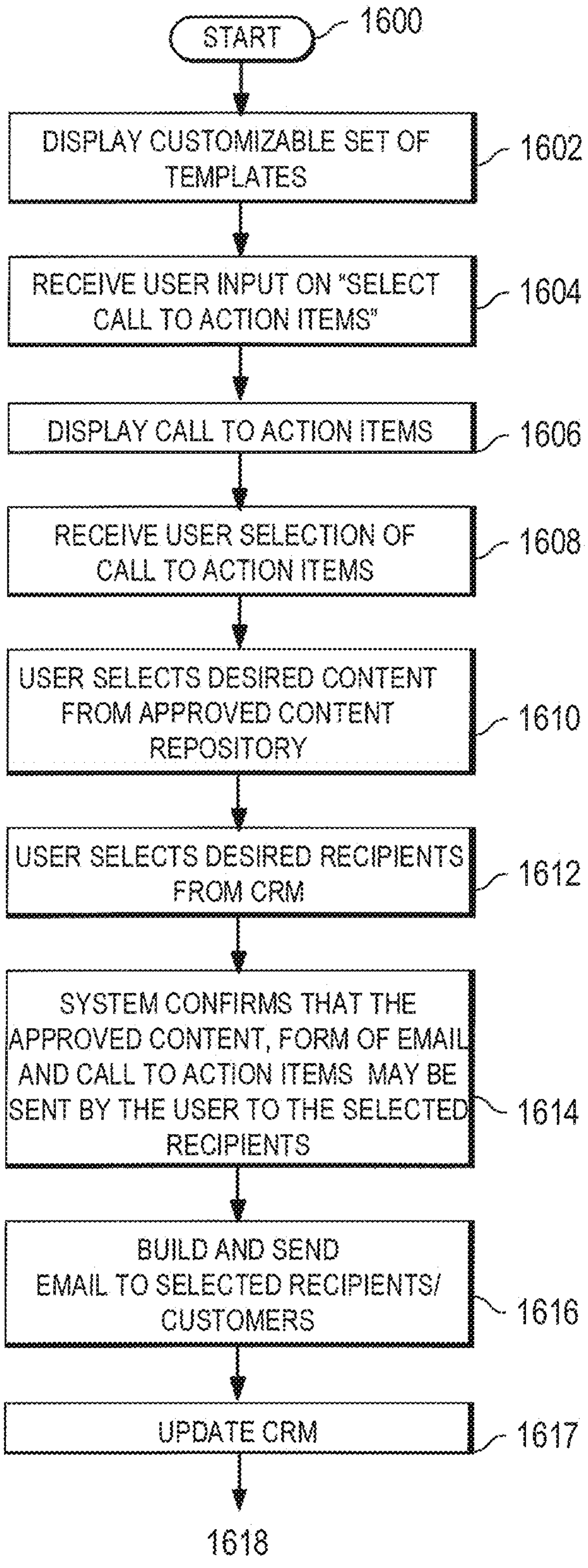
FIGS. 16*a-b* illustrate a flowchart of a method for building, sending and following up of an approved email with a call to action according to some embodiments of the present invention.
Figure 16B:
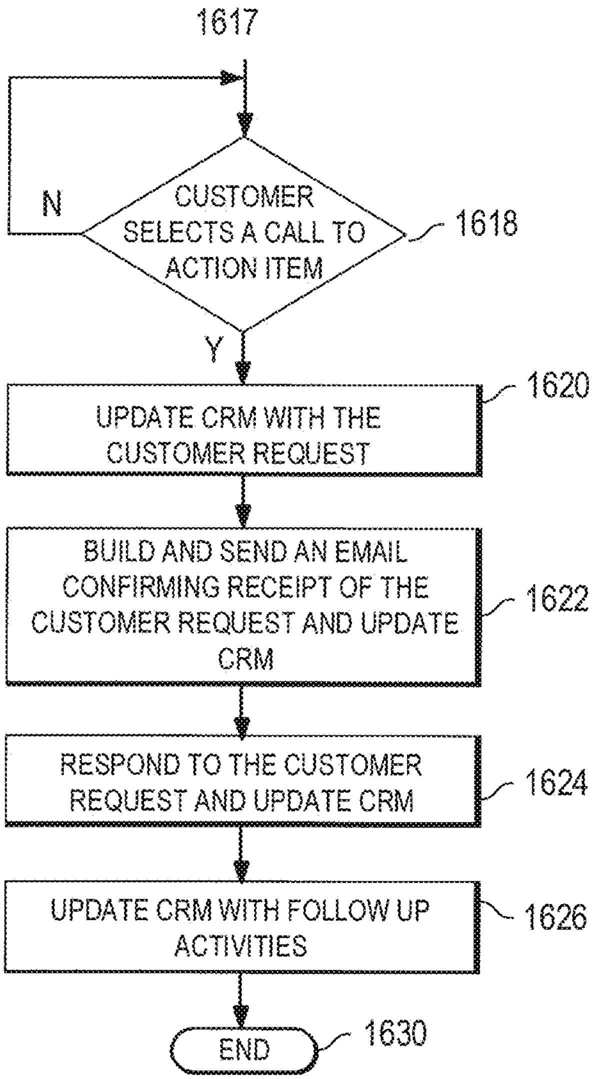

FIGS. 16*a*-*b* illustrate a flowchart of a method for building, sending and following up of an approved email with a call to action. The process may start at 1600, after which at block 1602 a set of customizable templates may be displayed for an email author or prospective sender to choose from. A chosen template may have a "Select Call to Action Items" button 1071, as shown in FIG. 10*d*.

If the user clicks on or mouses over the "Select Call to Action Items" button 1071 at 1604, a pull-down menu or pop-up window 1072 may be displayed at 1606, as shown in FIG. 10*e*.

At block 1608, the user may select one or more desired call to action items. At 1610, the user may select the desired content from the approved content repository 102. At 1612, the user may select the desired recipients or customers from the CRM database 104.

In response, the system, or more specifically the multichannel processing engine 108 may confirm that the approved content, the call to action items and the form of email may permissibly be sent by the prospective email sender to the customers or other selected recipients at 1614 based on factors including but not limited to regulatory limitations, customer preferences, demographic information, or the "opt-in" or "opt-out" status of individual customer accounts. Once that has been confirmed in accordance with the access protocol, the multichannel processing engine 108 can begin building and sending the emails in accordance with the user's selections or as modified in accordance with the access protocol, regulator engine, and or other system controls, at 1616. The content contained within the approved email may be checked for accuracy and validity by the system before release to the email server 114. If the email is created when the user is offline, the content contained in the approved emails may be checked again after the user is back online, before they are sent to the email server.

The multichannel processing engine 108 may further check the data in the CRM subsystem 104 to find out if the approved content and/or the call to action items have been sent to the recipient, and if yes, how many times. In one embodiment, the times that the approved content or the call to action items have been sent may be displayed in a pop-up window, so that the user may determine if the approved content should be sent to the recipient again.

The email is then sent to the recipient, and the recipient's account information in the CRM subsystem 104 may be updated at 1617 to indicate that the email, including the call to action, is sent.

At 1618, it may be determined if the recipient clicks on the clickable area in the email for the call to action, e.g., Request Invitation. If yes, at 1620, the recipient's account information in the CRM subsystem 104 may be updated to indicate that the recipient has responded to the call to action and has requested invitation. At 1622, the multichannel processing engine 108 may build and send the email to acknowledge receipt of the request, as shown in FIG. 13*c*, and the recipient's account information in the CRM subsystem 104 may be updated accordingly.

The invitation may be sent to the recipient at 1624 and the recipient's account information in the CRM subsystem 104 may be updated to include the sending of the invitation. In one embodiment, the invitation is sent via a second approve email with the multichannel processing engine 108.

The recipient's account information in the CRM subsystem 104 may continue to be updated with follow up activities at 1626, e.g., if the recipient has accepted the invitation, if samples have been sent, and/or if the recipient is visited by the user. Accordingly, the sender may avoid unnecessarily duplicating the efforts.

The process may end at 1630.

The flowcharts do not mean to limit the sequence of the steps. In one example, the controlled content repository 102 may determine in advance, before a template is chosen at 1502, if a piece of content can be sent to a customer and store the result. The result may be stored as a part of metadata for the content in the controlled content repository 102. During the generation of the approved email, the multichannel processing engine may check information in the controlled content repository 102, instead of the customer relationship management subsystem 104, to decide if a piece of content can be sent to a customer.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, although the embodiments are described with a customer relationship management subsystem 104, the customer information and content may be from other types of information management systems, e.g., a Closed Loop Marketing (CLM) system. In addition, the multichannel processing engine 108 is shown to communicate with only one customer relationship management subsystem 104 in the drawings, but it may communicate with more customer relationship management subsystems. For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly perform their described functions in accordance with computer-readable instructions stored on a computer-readable media that are connected thereto.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The approved content may be in any format, e.g., text, audio, video, picture, multimedia, or PDF.

Figure 17:
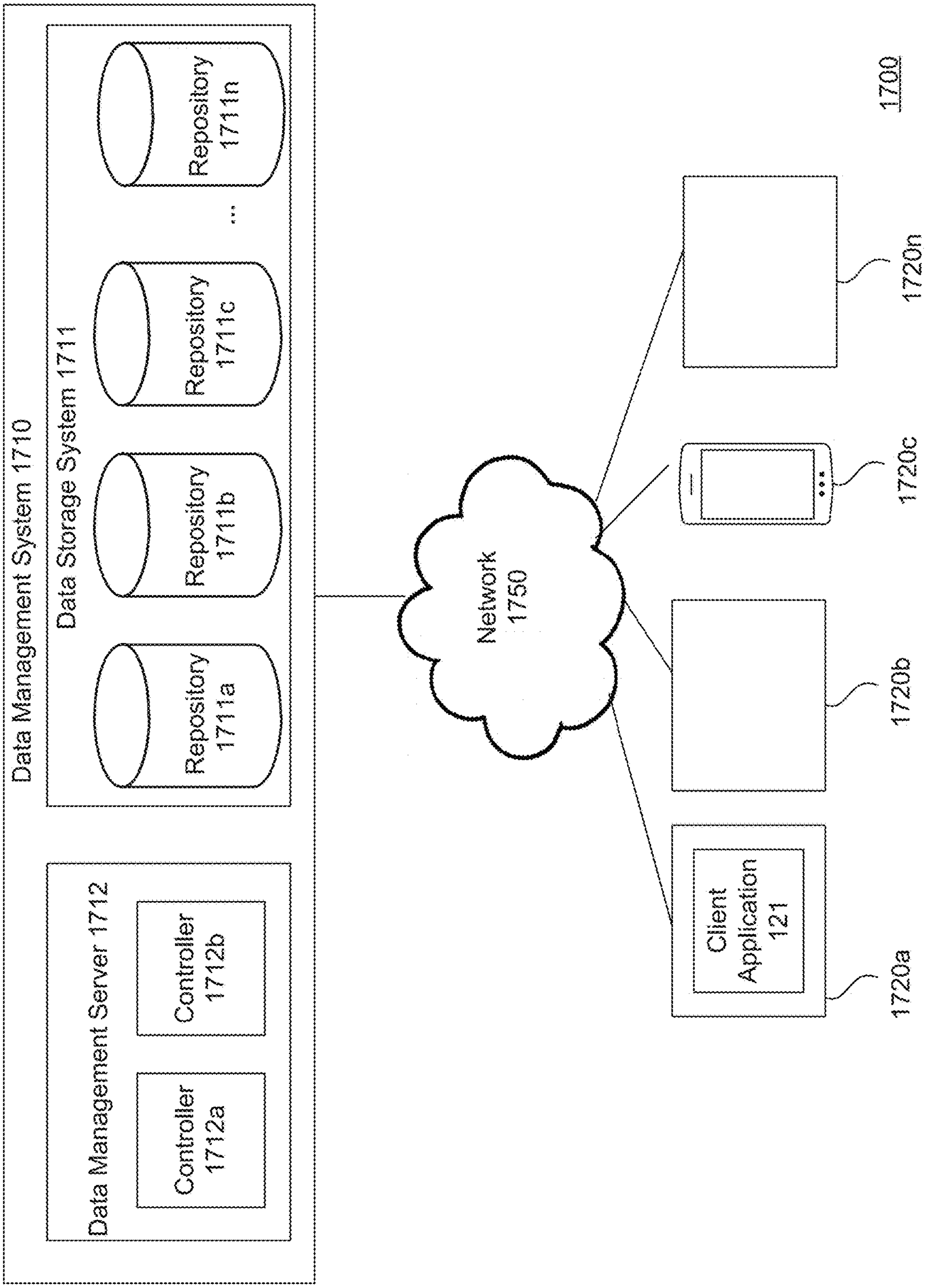
FIG. 17 illustrates an example high level block diagram of a data management architecture wherein the present invention may be implemented according to some embodiments of the present invention.

FIG. 17 illustrates an example high level block diagram of a data management architecture 1700 wherein the present invention may be implemented. As shown, the architecture 1700 may include a data management system 1710, and a plurality of user computing devices 1720*a*, 1720*b*, . . . 1720*n*, coupled to each other via a network 1750. The data management system 1710 may include a data storage system

1711 and a data management server 1712. The data storage system 1711 may have two or more repositories, e.g., 1711*a*, 1711*b*, 1711*c*, . . . and 1711*n*. The network 1750 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 1720*a*-1720*n* may be any machine or system that is used by a user to access the data management system 1710 via the network 1750, and may be any commercially available computing devices including laptop computers, desktop computers, mobile phones, smart phones, tablet computers, netbooks, and personal digital assistants (PDAs). A client application 121 may run from a user computing device, e.g., 1720*a*, and access data in the data management system 1710 via the network 1750.

The data storage system 1711 may store data that client applications (e.g., 121) in user computing devices 1720*a*-1720*n* may access and may be any commercially available storage devices. Each content repository (e.g., 1711*a*, 1711*b* or 1711*n*) may store a specific category of data, and allow users to interact with its data in a specific business context. It should be appreciated that content repositories may be separate logic sections in a same storage device.

The data management server 1712 is typically a remote computer system accessible over a remote or local network, such as the network 1750. The data management server 1712 may store a data management controller 1712*a* and a data collection controller 1712*b* for controlling management and collection of the data, including the method to be discussed with FIG. 23. The data management server 1712 could be any commercially available computing devices. Although only one server is shown, it should be appreciated and the data management system 1710 may have a plurality of servers and the controllers 1712*a* and 1712*b* may be in separate servers. A client application (e.g., 121) process may be active on one or more user computing devices 1720*a*-1720*n*. The corresponding server process (e.g., 1712*a* and 1712*b*) may be active on the data management server 1712. The client application process and the corresponding server process may communicate with each other over the network 1750, thus providing distributed functionality and allowing multiple client applications to take advantage of the information-gathering capabilities of the data management system 1710.

In one implementation, the architecture 1700 may be used for collecting and managing data, e.g., trial data. In some embodiments, a trial as described in this disclosure may refer to a clinical trial. A first repository (e.g., 1711*a*) may be used by a first sponsor (e.g., a pharmaceutical company) to store a first study design received from a first user computing device (e.g., 1720*a*). The first study design may define the infrastructure and lifecycle of the study, and may comprise rules (e.g., for queries, derived values, notifications and displaying events, forms and items), a casebook (i.e., a doctor's binder), event groups, events (e.g., subject visits), forms which comprise segregate sections and fields, item groups and items. In one example, a study design may define a particular study, i.e., each subject may have ten visits, and each visit may have three forms. There may be a workflow associated with each visit, e.g., what needs to be done at each visit. In some embodiments, a subject may comprise or refer to one or more patients.

In one implementation, the first study design may be stored as definition objects in the first repository 1711*a*, specifying what is required to happen on each site during the study. The first repository 1711*a* may also store electronic records of the first study. In one implementation, the electronic records may be EDC data. Trial source data (e.g., associated with a subject) may be captured at the user computing devices, and the aggregated and obfuscated data may be stored as EDC data in the first repository 1711*a*. The data management system 1710 may have an interface for receiving EDC data collected in trials and a reporting tool for analysis of the EDC data.

The second repository 1711*b* may be used by a first site (e.g., a hospital) of the first study to store trial source data from a second user computing device (e.g., 1720*b*), and a third repository (e.g., 1711*c*) may be used by a second site of the first study to store trial source data from a third user computing device (e.g., 1720*c*). The trial source data (e.g., three blood pressure values of a subject taken during one visit) in the second repository 1711*b* may be converted to EDC data (e.g., the average of the three blood pressure values) automatically, and then stored in the first repository 1711*a* as EDC data. Similarly, the trial source data in the third repository 1711*c* may be converted to EDC data automatically, and then stored in the first repository 1711*a* as EDC data. In one implementation, the trial source data may be converted to the EDC data at the client application 121, and the EDC data is transmitted to the data management server 1712. In one implementation, the trial source data may be transmitted to the repository 1711*b* or 1711*c* via the data management server 1712, and converted to the EDC data at the data management server 1712. The EDC data is then stored in the repository 1711*a*. Data in the second repository 1711*b* and the third repository 1711*c* may be synchronized with that in the first repository 1711*a* regularly or from time to time when new data entries are received from user computing devices. The first study design may be transmitted to the second repository 1711*b* and the third repository 1711*c*. The second repository and the third repository may be synchronized with the first repository for updates to the first study design.

In one implementation, the data management system 1710 may be a multi-tenant system where various elements of hardware and software may be shared by one or more customers. For instance, a server may simultaneously process requests from a plurality of customers (e.g., sponsors, sites, etc.), and the data storage system 1711 may store content for a plurality of customers (e.g., sponsors, sites, etc.). In a multi-tenant system, a user is typically associated with a particular customer. In one example, a user could be an employee of one of a number of pharmaceutical companies or trial sites which are tenants, or customers, of the data management system 1710.

In one embodiment, the data management system 1710 may run on a cloud computing platform. Users can access content on the cloud independently by using a virtual machine image, or purchasing access to a service maintained by a cloud database provider.

In one embodiment, the data management system 1710 may be provided as Software as a Service ("SaaS") to allow users to access the data management system 1710 with a thin client.

Figure 18:
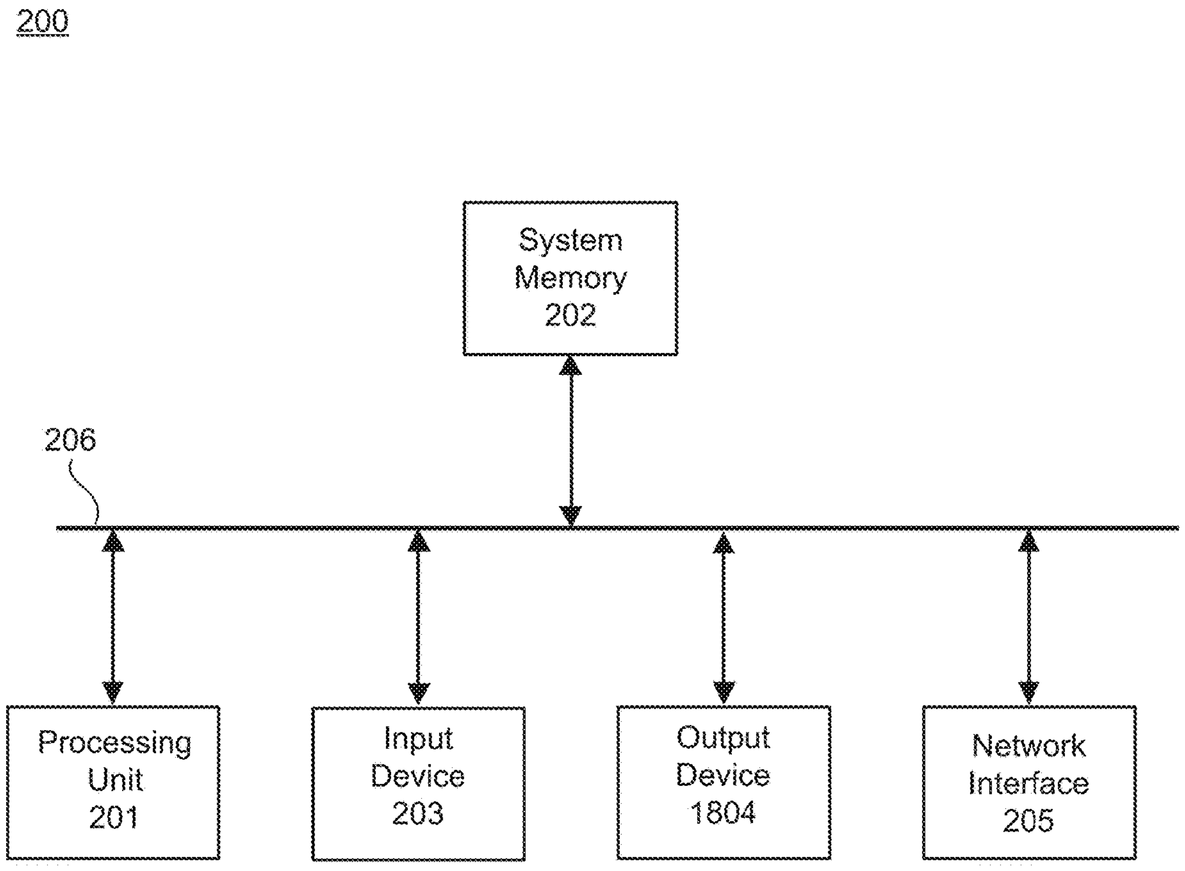
FIG. 18 illustrates an example block diagram of a computing device according to some embodiments of the present invention.

FIG. 18 illustrates an example block diagram of a computing device 200 which can be used as the user computing devices 1720*a*-1720*n*, and the data management server 1712 in FIG. 17. The computing device 200 is only one example of a suitable computing environment and is not intended to suggest any limitation as to scope of use or functionality. The computing device 200 may include a processing unit 201, a system memory 202, an input device 203, an output device 1804, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 1804 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 1750) and/or buses. The network interface 205 may be configured to allow the computing device 200 to transmit and receive data in a network, for example, the network 1750. The network interface 205 may include one or more network interface cards (NICs).

Figure 19:
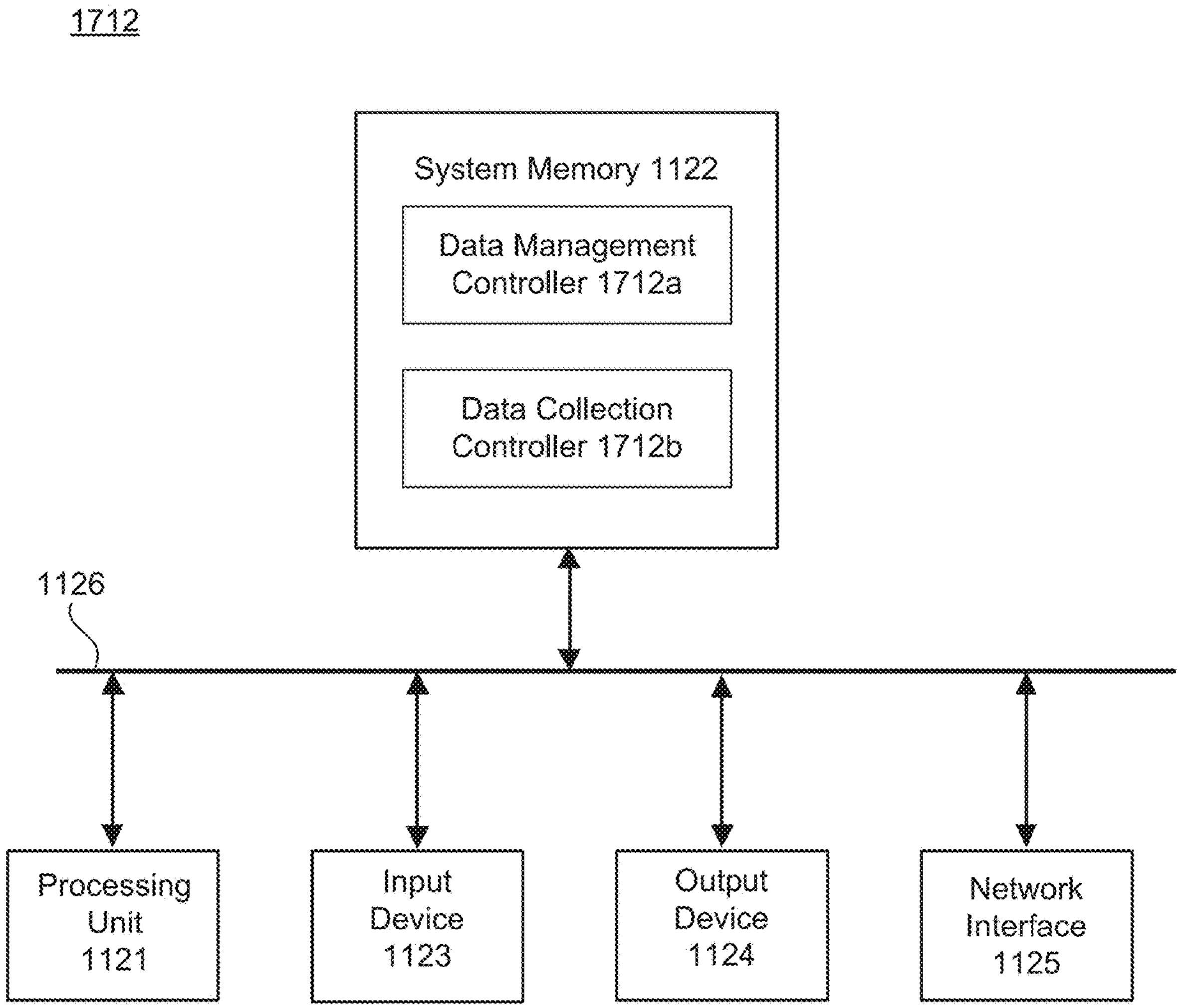
FIG. 19 illustrates an example high level block diagram of the data management server according to some embodiments of the present invention.

FIG. 19 illustrates an example high level block diagram of the data management server 1712 according to one embodiment of the present invention. The data management server 1712 may be implemented by the computing device 200, and may have a processing unit 1121, a system memory 1122, an input device 1123, an output device 1124, and a network interface 1125, coupled to each other via a system bus 1126. The system memory 1122 may store a data management controller 1712*a* and/or a data collection controller 1712*b*.

In one implementation, the data management controller 1712*a* may be a Java application. A sponsor user may design a study (e.g., a clinical study) via the data management controller 1712*a* and store the study design as definition objects in a repository (e.g., 1711*a*). A study design may have multiple elements, including a casebook, groups, events (e.g., subject visits), and forms which include sections, item groups, items, and fields to be filled out.

In one example, a trial is designed to evaluate subject response to a blood pressure medication. Participants on the medication may visit a trial site three times a week for consecutive six weeks. A workflow may be designed for each visit, and may include forms to be filled out, and measurements to be taken. In one example, a participant's blood pressure may be measured three times during each visit, stored in the data storage system (e.g., the repository 1711*b*) as trial source data, and synchronized with other repositories in the data storage system 1711 (e.g., the repository 1711*a* for the sponsor). In one implementation, only aggregated and obfuscated data, without subject defining information, are sent to the sponsor repository 1711*a* and stored there as the EDC data.

A study design may have its own lifecycle. Once a sponsor completes a study design, a workflow may be executed to publish the study design to the participating trial sites (e.g., by storing the study design in trial site repositories 1711*b* and 1711*c*) and the trial may enter its execution stage. If the study design is amended during the execution stage, the updates may be sent to the participating trial sites (e.g., by synchronizing the updates down to the trial site repositories 1711*b* and 1711*c*) for them to follow.

FIGS. 20*a* to 20*e* illustrate example user interfaces for creating or editing a study design according to one embodiment of the present invention. As shown, in response to a user input, the data management controller 1712*a* may present a user interface 400 in FIG. 20*a* for creating a new study, study group or organization; a user interface 2010 in FIG. 20*b* for creating an event group, event or form; a user interface 2020 in FIG. 20*c* for creating an object; a user interface 430 in FIG. 20*d* for creating an item group; and a user interface 440 shown in FIG. 20*e* for creating a codelist.

The study design may be stored in the data management system 1710 (e.g., the repository 1711*a*) as objects. A few examples of the objects are described below:

1. FORM_DEF

FORM_DEF is the design object for all Forms.

| Field | Type | Description |
|---|---|---|
| id | System | Unique identifier for the record |
| name | System - Text 128 | Name for the record |
| status | System - Picklist | Active vs. Inactive |
| description | Text 255 | Description of the Form. |
| help_content | N/A | Stored in translation table. Hover text help text for the item. |
| prev_version | Object(form_def) | Self-Reference record when a version of the record is created. Creates duplicate and duplicate points to the original |
| form_status | Picklist | Defines whether the item is published or in progress or under review - Full list of picklist values contained in table Data Types table. |
| scheduled | boolean | Boolean on whether the form is scheduled or unscheduled. |
| change_reason | Text 255 | Reason for change, if a change is made. |
| OID | Text 100 | ODM Id for loading in via ODM standards |
| pagelayout_xml | N/A | Defines that there will be a corresponding XML that defines the layout of the Form. |
| label | N/A | Stored in translation table |
| study | Object (study_v) | Reference to the study that is the context of the design. |

2. FORM_DEF_ITEMGROUP_DEF

FORM_DEF_ITEMGROUP_DEF is the design Intersection object between Form and Item Group. It enables the system to understand what Sections should appear on a Form that is part of a visit.

| Field | Type | Description |
|---|---|---|
| id | System | Unique identifier for the record |
| name | System - Autonumber | System generated autonumber |
| status | System - Picklist | Active vs. Inactive |

-continued

| Field | Type | Description |
|---|---|---|
| parent | Parent Object (Form__Def) | Parent object of intersection record. |
| child | Parent Object (ItemGroup__Def) | Second parent object of intersection record. |
| repeat__max | Number | Number of times a repeating question can be captured. |
| order__num | Number | Order number to display the Forms when recording an Event |
| change__reason | Text 255 | Reason for change, if a change is made. Trigger logic on object to prevent a change if the status__vdc is published and this field isn't populated on a change. |
| OID | Text 100 | ODM Id for loading in via ODM standards |
| mandatory | Boolean | Defines if the record is mandatory. |
| label | N/A | Stored in translation table |
| study | Object (study__v) | Reference to the study that is the context of the design. |
| casebook__def | Object (casebook__def) | Reference to the version of the Casebook__Def. |

3. EVENT_DEF

EVENT_DEF is the design object for events (visits). A visit will require that multiple forms be filled out.

| Field | Type | Description |
|---|---|---|
| id | System | Unique identifier for the record |
| name | System - Text 128 | Name for the record |
| status | System - Picklist | Active vs. Inactive |
| description | Text 255 | Description of the Event |
| event__status | picklist | Defines whether the item is published or in progress or under review - Full list of picklist values contained in table Data Types table. |
| help__content | N/A | Stored in translation table. Hover text help text for the item. |
| event__type | picklist | Type of event - Baseline, Visit 1, etc. |
| repeat__max | number | Number of times that an event can be repeated. Can be used for unscheduled events and putting a cap on the number of these. |
| prev__version | Object(event__def) | Self-Reference record when a version of the record is created. Creates duplicate and duplicate points to the original |

-continued

| Field | Type | Description |
|---|---|---|
| scheduled | boolean | Boolean on whether the event is scheduled or unscheduled. |
| change__reason | Text 255 | Reason for change, if a change is made. Trigger logic on object to prevent a change if the status__vdc is published and this field isn't populated on a change. |
| OID | Text 100 | ODM Id for loading in via ODM standards |
| label | N/A | Stored in translation table |
| study | Object (study__v) | Reference to the study that is the context of the design. |

4. EVENT_DEF_FORM_DEF

It is the Design Intersection object between Event and Form, and enables the system to understand what Forms should appear on a visit.

| Field | Type | Description |
|---|---|---|
| id | System | Unique identifier for the record |
| name | System - Autonumber | System generated autonumber |
| status | System - Picklist | Active vs. Inactive |
| parent | Parent Object (Event__Def) | Parent object of intersection record. |
| child | Parent Object (Form__Def) | Second parent object of intersection record. |
| change__reason | Text 255 | Reason for change, if a change is made. Trigger logic on object to prevent a change if the status__vdc is published and this field isn't populated on a change. |
| label | N/A | Stored in translation table |
| OID | Text 100 | ODM Id for loading in via ODM standards |
| mandatory | Boolean | Defines if the record is mandatory. |
| order__num | Number | Order number to display the Forms when recording an Event |
| repeat__max | Number | The limit that the form can be repeated for this event. Null if there is no max. |
| study | Object (study__v) | Reference to the study that is the context of the design. |
| casebook__def | Object (casebook__def) | Reference to the version of the Casebook__Def. |

5. CASEBOOK_DEF

It is the design object for casebook, which is a set of visits that are expected to be used to collect information for a specific subject.

| Field | Type | Description |
|---|---|---|
| id | System | Unique identifier for the record |
| name | System - Text 128 | Name for the record |
| status | System - Picklist | Active vs. Inactive |
| description | Text 255 | Description of the Event |
| casebook__status | picklist | Defines whether the item is published or in progress or under review - Full list of picklist values contained in table Data Types table. |
| help__content | N/A | Stored in translation table. Hover text help text for the item. |
| casebook__type | picklist | Type of casebook |
| prev__version | Object(casebook__def) | Self-Reference record when a version of the record is created. Creates duplicate and duplicate points to the original |

-continued

| Field | Type | Description |
|---|---|---|
| change__reason | Text 255 | Reason for change, if a change is made. Trigger logic on object to prevent a change if the status__vdc is published and this field isn't populated on a change. |
| OID | Text 100 | ODM Id for loading in via ODM standards |
| label | N/A | Stored in translation table |
| study | Object (study__v) | Reference to the study that is the context of the design. |

6. ITEM_[STUDYID]

It is the execution object. Stores the data that is captured. A separate ITEM Table will be created per Study.

| Field | Type | Description |
|---|---|---|
| id | System | Unique identifier for the record |
| name | System - Text 128 | Name for the record. Copied from Item__Def. |
| status | System - Picklist | Active vs. Inactive |
| itemgoup | Parent Object (Itemgroup) | Parent record |
| item__def | Object (Item__def) | Relationship to the design record |
| value | Text 1500 | Captured value |
| value__translated | Text 1500 | Translated value of the value |
| codelist__items__def | Object(codelist__items__def) | Reference to the design record for a selected codelist item. |
| codelist__code | Text 100 | Codelist code that was selected |
| codelist__label | Text 255 | Codelist label (display) that was selected |
| unit__ref | Text 100 | Units Reference - Base Unit for translated value |
| unit__value | Text 100 | Units Value - Unit that was selected |
| rev__sdv | Boolean | Review for SDV |
| rev__sdr | Boolean | Review for SDR |
| rev__dmr | Boolean | Review for DMR |
| rev__sign | Boolean | Review for Signature |
| rev__frozen | Boolean | Review for Frozen |
| rev__locked | Boolean | Review for Locked |
| change__reason | Text 255 | Reason for change, if a change is made. Trigger logic on object to prevent a change if the status__vdc is published and this field isn't populated on a change. |
| study | Object (Study__v) | Relationship to Study record. Copied down for performance and query execution. |
| subject | Object (Subject) | Relationship to Subject record. Copied down for performance and query execution. |
| site | Object (Site__v) | Relationship to Site record. Copied down for performance and query execution |
| casebook | Object (CaseBook__vdc) | Relationship to the Casebook record. Copied down for performance and query execution. |
| item__status | Picklist | Current status of the Item - completed, in progress, reviewed, verified |

7. ItemGroup

It is the execution object, and stores that a question was answered in a particular section (ItemGroup) and the section has a status.

| Field | Type | Description |
|---|---|---|
| id | System | Unique identifier for the record |
| name | System - Text 128 | Name of the record. Copied from ItemGroup__Def. |
| status | System - Picklist | Active vs. Inactive |
| itemgroup__status | picklist | Current status of the ItemGroup - completed, in progress, reviewed, verified |
| form | Parent Object (Form) | Parent record |
| itemgroup__seq | Number | Sequence of the Item Group in the case that it repeated |
| itemgroup__def | Object (Itemgroup__def) | Relationship to the design record |
| repeat__key | Text | This is a unique identifier for a repeating item group within a form (generally a table). This is related to both itemgroup__seq__vdc and external ID. |
| rev__sdv | Boolean | Review for SDV. System maintained field that is the aggregate of all of the Items in the Item Group. |
| rev__sdr | Boolean | Review for SDR. System maintained field that is the aggregate of all of the Items in the Item Group. |
| rev__dmr | Boolean | Review for DMR. System maintained field that is the aggregate of all of the Items in the Item Group. |

-continued

| Field | Type | Description |
|---|---|---|
| rev_sign | Boolean | Review for Signature. System maintained field that is the aggregate of all of the Items in the Item Group. |
| rev_frozen | Boolean | Review for Frozen. System maintained field that is the aggregate of all of the Items in the Item Group. |
| rev_locked | Boolean | Review for Locked. System maintained field that is the aggregate of all of the Items in the Item Group. |
| study | Object (Study_v) | Relationship to Study record. Copied down for performance and query execution. |
| subject | Object (Subject) | Relationship to Subject record. Copied down for performance and query execution. |
| site | Object (Site_v) | Relationship to Site record. Copied down for performance and query execution |
| casebook | Object (CaseBook_vdc) | Relationship to the Casebook record. Copied down for performance and query execution. |
| change_reason | Text 255 | Reason for change, if a change is made. Trigger logic on object to prevent a change if the status_vdc is published and this field isn't populated on a change. |

The objects may be used and transferred across all parts in the architecture 1700 shown in FIG. 17, including a sponsor system (e.g., the data management controller 1712*a* and the repository 1711*a*), the sites (e.g., the data collection controller 1712*b* and the repository 1711*b* or 1711*c*), and the user computing devices 1720*a*, 1720*b* to 1720*n*. As will be discussed below with reference to FIG. 23, the user interfaces in the architecture 1700 may be generated based on the objects, and data processing and mapping in the architecture 1700 may be based on correlation of the objects as well.

An example of an item VV-000061 is shown below:

VV-000061 Active
Created by: John Smith
Created date: January 1, 20xx
Last Modified by: John Smith
Last Modified Date: March 1, 20xx
Casebook: SCR-0001
Event: VV-000011
Form: VV-000021
Item Definition: 901-Initials
Item Status: Blank
Item Group: VV-000023
Review for CFR
Review for DMR
Review for Frozen
Review for MMR
Review for SDR
Review for SDV
Review for Signature
Subject: SCR-0001
Unit Value:
Value: NMJ
Value Translated
Site: 201
Study: Vofen
Study Country: Vofen
Union: VV-000011
Review for locked
Value Normalized
Item Group Definition: Creation Criteria
Form Definition: Demographics
Event Definition: Screening Visit The definitions may be correlated and stored in the data storage system 1711 as structured data. One example is shown as follows:

| Name | Event | Form Definition | Event Definition | Item Definition |
|---|---|---|---|---|
| VV-000001 | VV-000001 | Demographics | Screening Visit | 902-Date of Birth |
| VV-000002 | VV-000001 | Demographics | Screening Visit | 901-Initials |
| VV-000005 | VV-000001 | Exclusion Criteria | Screening Visit | 004-Pregnant |
| VV-000009 | VV-000001 | Inclusion Criteria | Screening Visit | 007-ECG |
| VV-000021 | VV-000002 | Adverse Events | Common Log Forms | AESTDTC |

Figure 21:
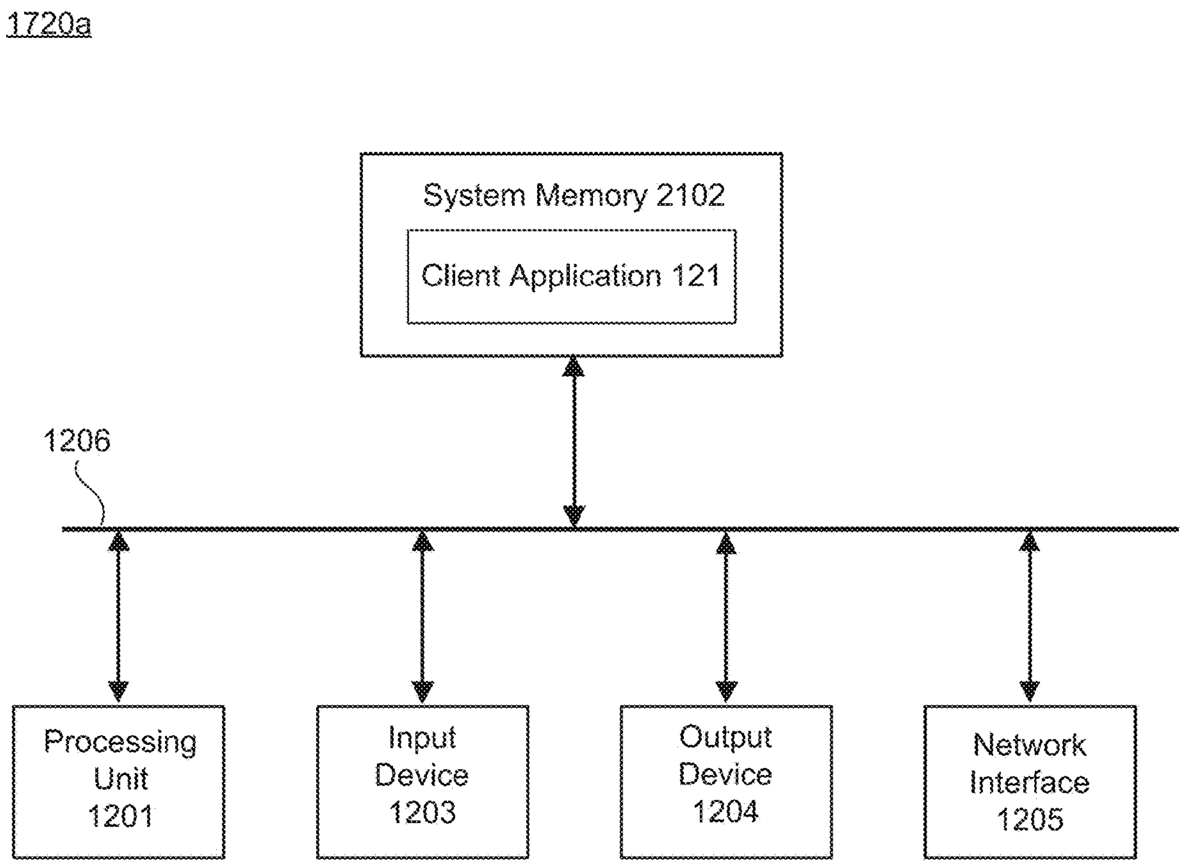
FIG. 21 illustrates an example high level block diagram of a user computing device according to some embodiments of the present invention.

FIG. 21 illustrates an example high level block diagram of a user computing device (e.g., 1720*a*) wherein the present invention may be implemented. The user computing device 1720*a* may be implemented by the computing device 200 described above, and may have a processing unit 1201, a system memory 2102, an input device 1203, an output device 1204, and a network interface 1205, coupled to each other via a system bus 1206. The system memory 2102 may store the client application 121.

The client application 121 may be an application installed on a computing device, or a web application. Users at a trial site may enter subject trial information via the client application 121, and the trial source data may be stored in a repository (e.g., 1711*b*).

FIGS. 22*a* to 22*d* illustrate example user interfaces for collecting subject trial information according to one embodiment of the present invention. During the execution stage of a trial, when a trial site user logs into the data management system 1710, a user interface 600 may be generated based on one or more objects of the definition of the first trial and trial source data previously stored in the data storage system 1711. The user interface 600 may have an area 601 for displaying trials the site user is working on, and an area 2202 for displaying trial tasks he/she needs to take actions on, e.g., overdue forms and queries they need to respond to.

Figure 22A:
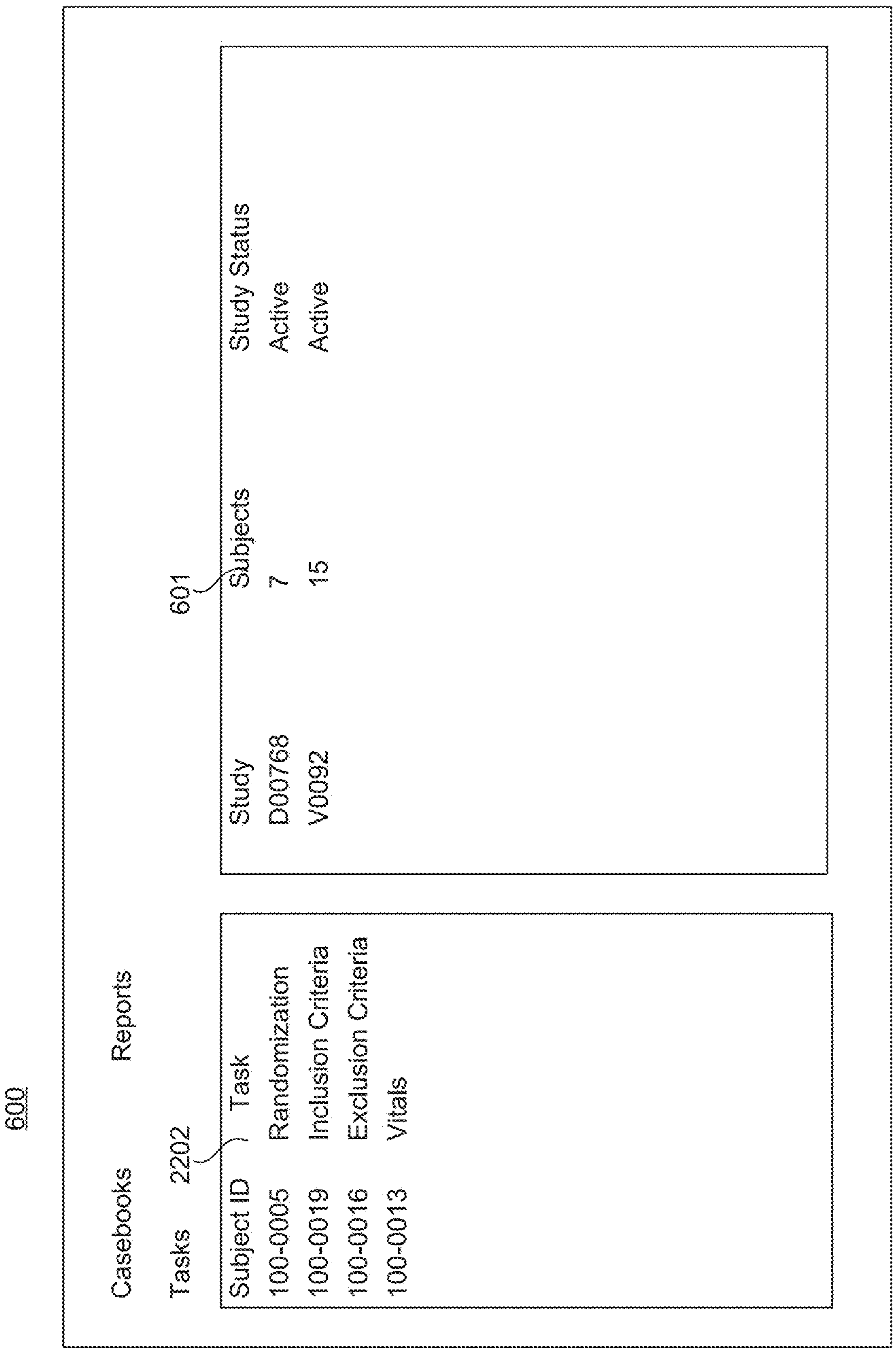
FIGS. 22*a-d* illustrate example user interfaces for collecting subject trial source data according to some embodiments of the present invention.
Figure 22B:
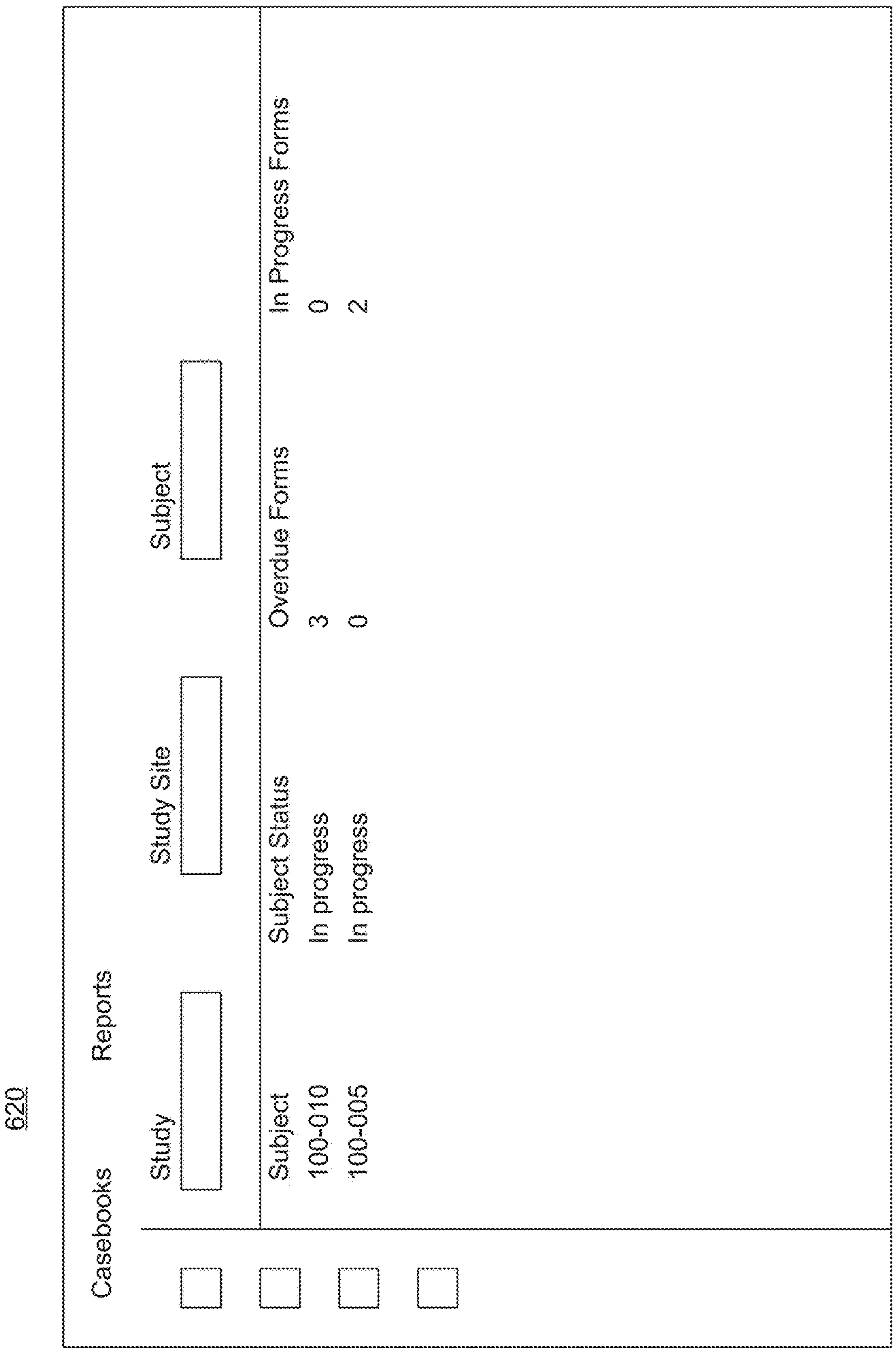

When the site user selects a trial from the area 601, a user interface 620 shown in FIG. 22*b* may be displayed, which may have a list of the subjects of the trial, and their status, including overdue forms and in progress forms.

Figure 22C:
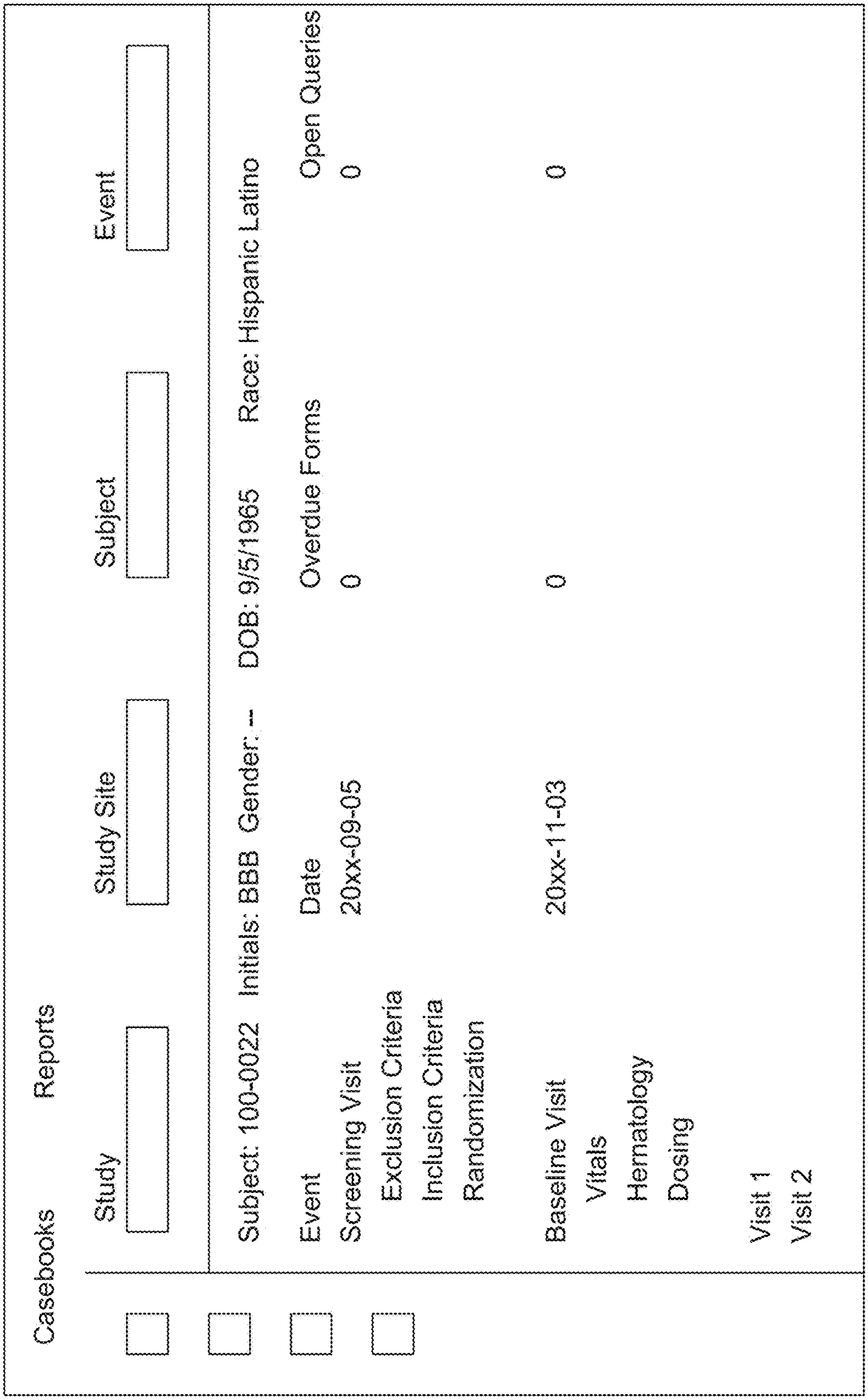

When the site user selects a subject, a user interface 640 shown in FIG. 22*c* may be displayed, which may have some biographic information the subject provided (e.g., date of birth, gender and race), a list of all his/her visits, and forms that have been filled out. The subjects may come in on a regular basis, and receive their medication. It may take a measurement on how they are performing as part of the trial. The data will be aggregated up to determine if the product is effective and safe.

Figure 22D:
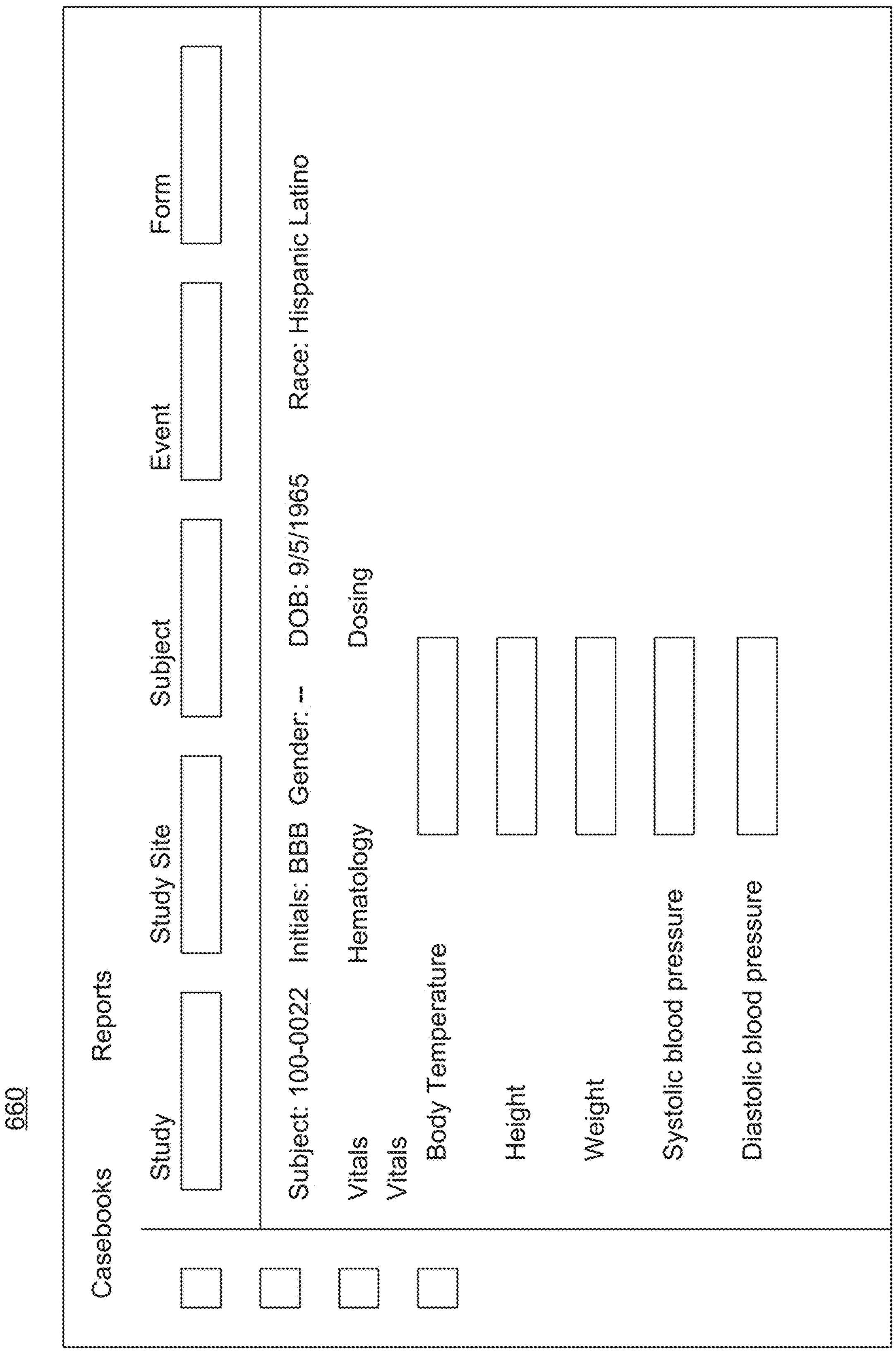

When the site user starts or selects a visit, a trial form user interface 660 shown in FIG. 22*d* may be displayed. The trial site user may enter data on the trial form user interface 660. For example, based upon the information just captured, the trial site user may put into the vital forms 98.6° F. for temperature, 72 for height, and 200 for weight. When there is Internet access, the data may be sent to the repository 1711*b*, and a little icon may show up to indicate that the data is stored in real time. In one embodiment, the trial source data may be checked for obvious mistakes, e.g., data in a wrong field, and data out of reasonable range. The data validation may be done at the client application 121. Once the site user submits the form, the information becomes locked. Alternatively, the data validation may be done at the data collection controller 1712*b*.

The trial site user may navigate through the user interfaces, and go to any point in the hierarchy and any subject in the study. The site user may fill out the information, and go to the next subject, without having to change the context and the event in the form that he/she is filling out.

The user interfaces 600, 620, 640 and 660 may be generated based on one or more objects in the definition of the first trial. In one implementation, the user interfaces may be generated by the data management controller 1712*a*, and sent to the trial sites and user computing devices. In one implementation, the user interfaces may be generated by the data collection controller 1712*b* based on the objects in the definition of the first trial from the data management controller 1712*a*, and sent to the user computing devices. In one implementation, the user interfaces may be generated by the user computing device, e.g., 1720*b*, based on the objects in the definition of the first trial from the data management controller 1712*a* or the data collection controller 1712*b*.

Figure 23:
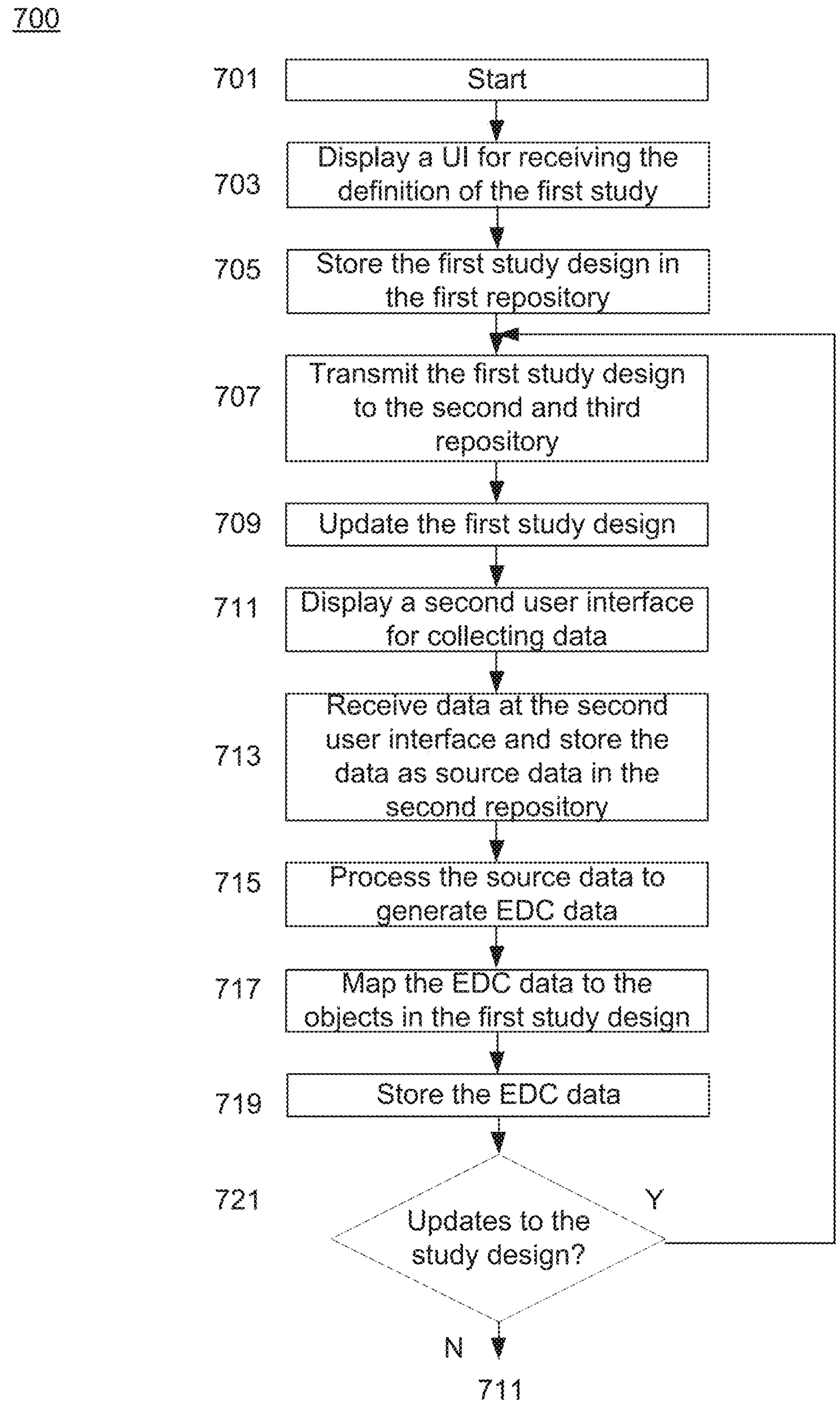
FIG. 23 illustrates an example flowchart of a method for collecting data according to some embodiments of the present invention.

FIG. 23 illustrates a flowchart of a method for collecting data according to one embodiment of the present invention.

The process may start at 701.

Figure 20A:
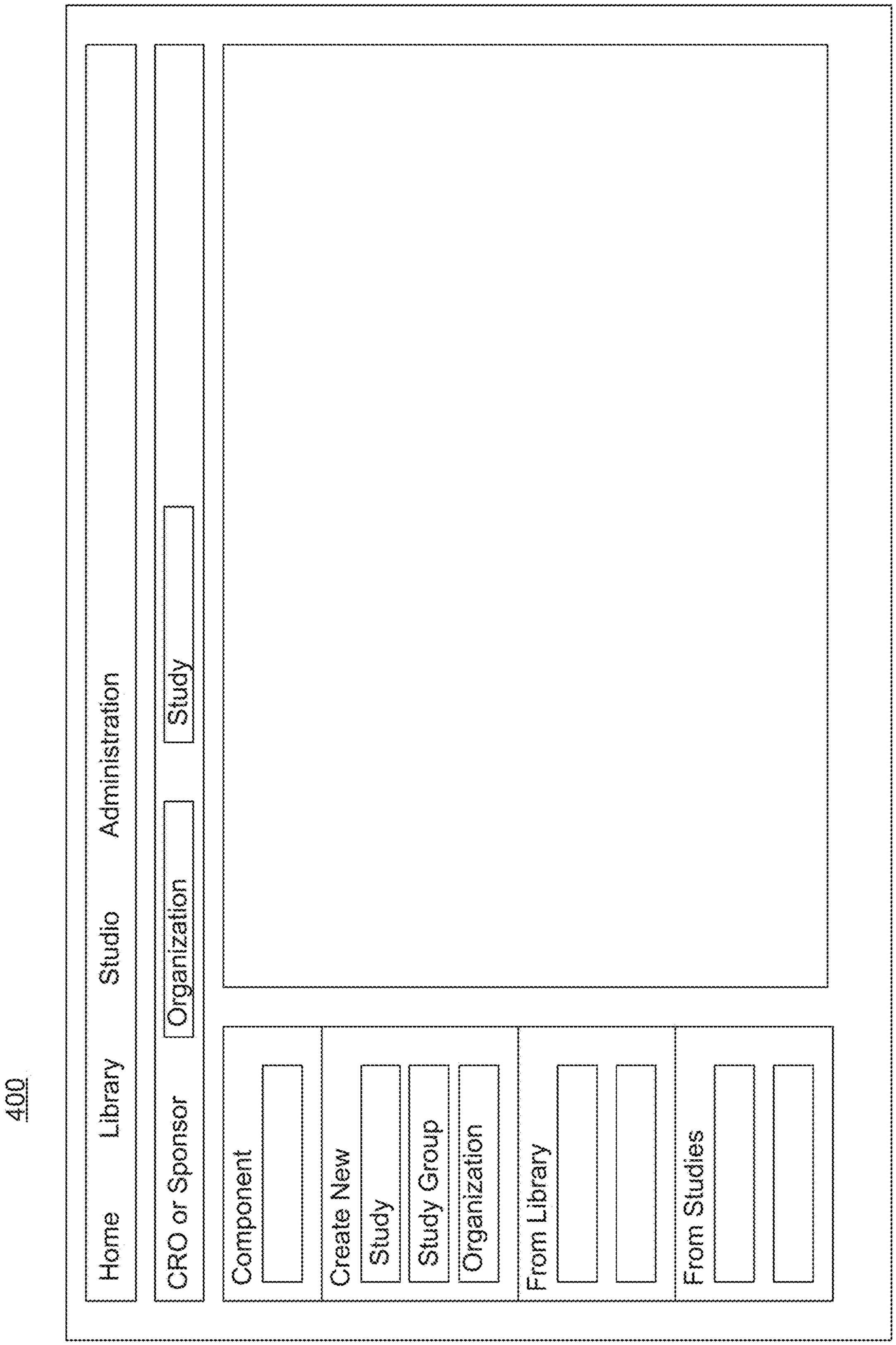
FIGS. 20*a-e* illustrate example user interfaces for creating or editing a study design according to some embodiments of the present invention.
Figure 20B:
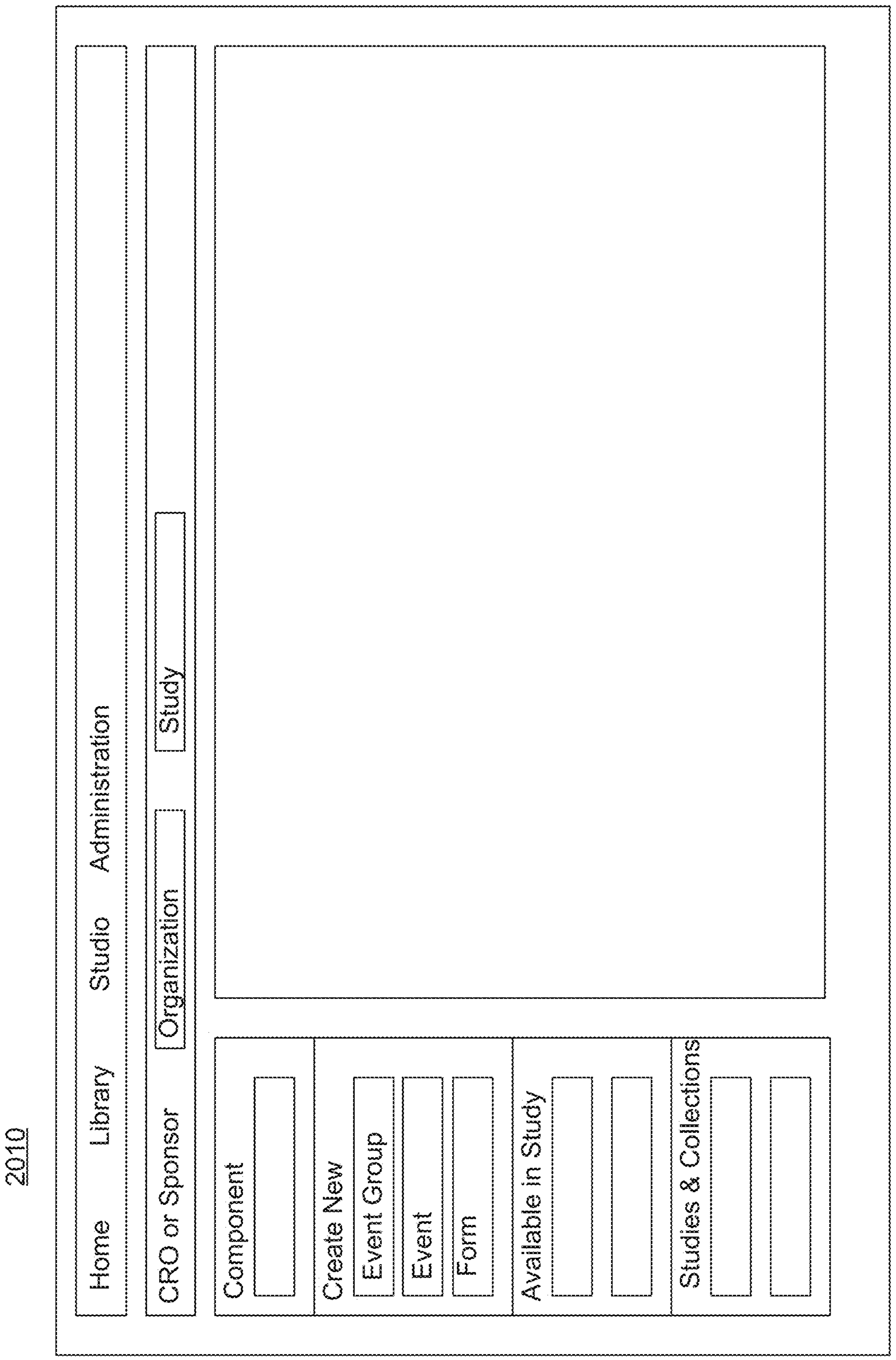
Figure 20C:
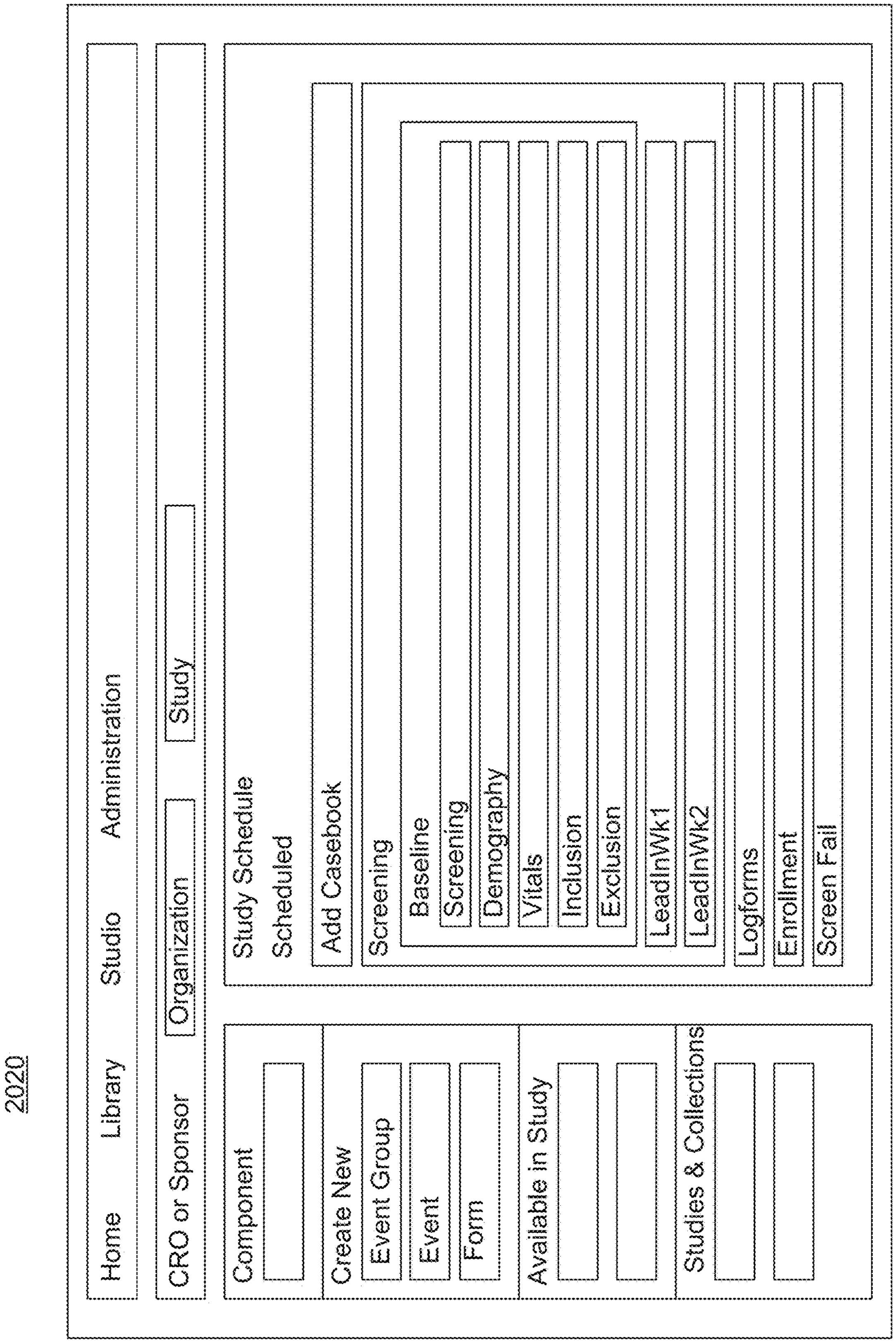
Figure 20D:
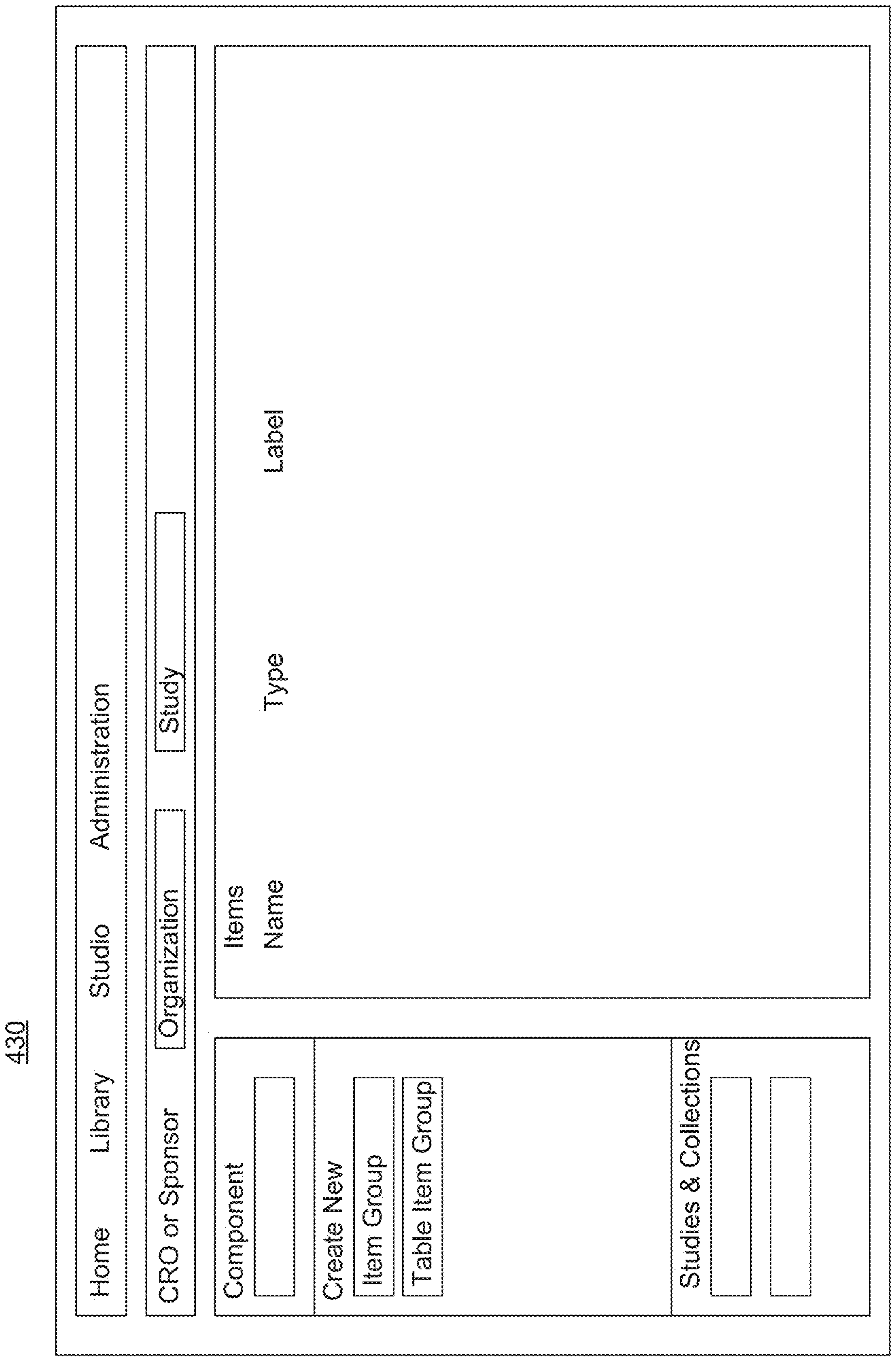
Figure 20E:
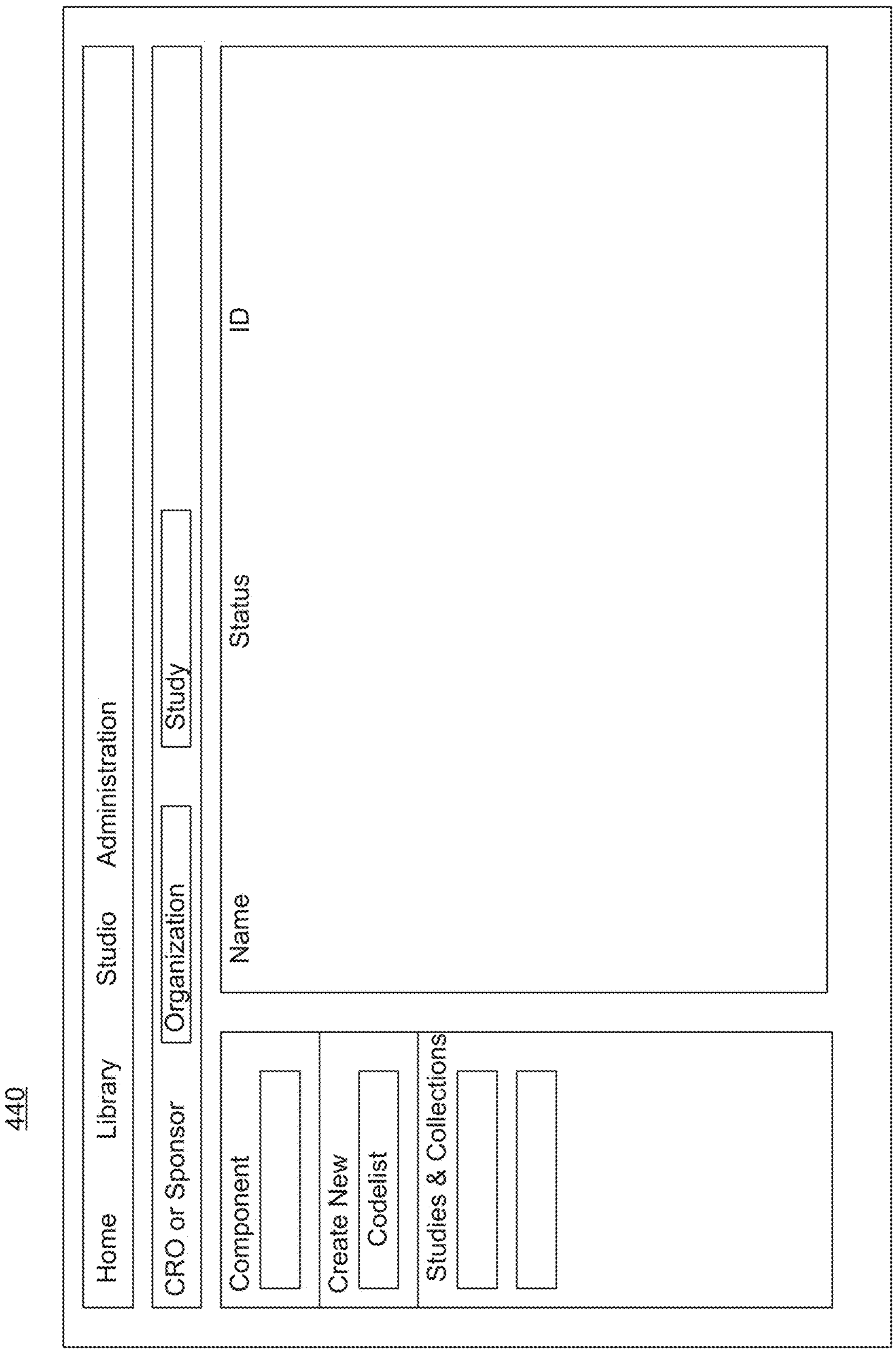

At 703, a user interface, e.g., the user interface 400 shown in FIG. 20*a*, may be generated for accepting definition of a first study design from a sponsor user. In one implementation, the data management controller 1712*a* may enable display of the user interface 400 on a sponsor user computing device (e.g., 1720*a*) for accepting definition of the first study design.

At 705, the first study design may be received at the data management controller 1712*a* from the user computing device 1720*a* and stored in the data management system 1710, e.g., the repository 1711*a* for the sponsor. The first study design may define one or more forms for each visit, and each form may include information such as a subject's demographic information (e.g., name, Date of Birth, race and gender) and trial source data to be collected. The first study design may also define events and the sequence of the events, which may include screening events, enrollment, medical history, repeating frequency of visits depending on the protocol, and workflow of each visit (e.g., administering medication and taking one or more measurements on a predetermined schedule). Each form may have a number of boxes for receiving data. The definitions, elements or items (e.g., Date of Birth) may be used across the sponsor system, all trial site systems and user computing devices, and flow back and forth in the architecture 1700 shown in FIG. 17. In one example, the study is to monitor blood pressure response to a medication, and may require a number of visits according to a predetermined schedule and a blood pressure value for each visit. As discussed above, the first study design may be stored in the data management system 1710 (e.g., the repository 1711*a*) as various objects, including FORM_DEF, FORM_DEF_ITEMGROUP_DEF, EVENT_DEF, EVENT_DEF_FORM_DEF, CASEBOOK_DEF, ITEM_[STUDYID] and ITEMGROUP.

At 707, the first study design may be published and transmitted to sites involved. In one implementation, the study design may be stored in, e.g., the repository 1711*b* for a first participating site and the repository 1711*c* for a second participating site. In one example, the repository 1711*b* and the repository 1711*c* may be authenticated before the first design study can be transmitted to it.

In one implementation, trial forms, e.g., the trial form shown in FIG. 22*d*, may be generated at the data management controller 1712*a* based on objects in definition of the first study design and sent to the trial site repositories (e.g., 1711*b* and 1711*c*).

At 709, the first study design may be updated or expanded, e.g., by the data collection controller 1712*b* in the first trial site system. For example, the first study definition from the sponsor's data management controller 1712*a* may require a blood pressure value, and the object may be, e.g., 901-Initial. The definition may be updated at the data collection controller 1712*b* to use the average of three blood pressure values during one visit as the blood pressure value required by the first study definition, and the objects may be 901-Initial-1, 901-Initial-2, 901-Initial-3 and 901-Initial-Calculated. Different versions of definitions may be mapped and correlated.

At 711, a trial site user may log in, and user interfaces 600, 620, 640 and 660 may be displayed while he/she is navigating through the webpages to select the study, subject, event and form. In one implementation, the user interfaces 600, 620, 640 and 660 may be generated by the data collection controller 1712*b* in the first trial site system based on the updated objects (e.g., 901-Initial-1, 901-Initial-2, and 901-Initial-3) and data in the data storage system 1711, and sent to the user computing device 1720*b*. In one implementation, the user interfaces 600, 620, 640 and 660 may be generated by the user computing device 1720*b* based on the objects in the first study definition from the data management controller 1712*a* (e.g., 901-Initial) or updated objects from the data collection controller 1712*b* (e.g., 901-Initial-1, 901-Initial-2, and 901-Initial-3), and data from the data storage system 1711.

At 713, data may be entered on a user interface, e.g., the user interface 660 shown in FIG. 22*d*, on the user computing device 1720*b*, and stored in the repository 1711*b* as trial source data via the data collection controller 1712*b*. Data may also be entered to the user computing device 1720*c*, and stored in the repository 1711*c* as trial source data via the data collection controller 1712*b*. In one example, during execution of the study on a site, a subject's blood pressure may be taken three times during a visit and stored in the repository 1711*b* as trial source data, e.g., 901-Initial-1, 901-Initial-2, and 901-Initial-3.

At 715, the trial source data may be processed to get the EDC data. In one example, the three blood pressure values may be averaged up and obfuscated to get the EDC data. The trial source data from the user computing device 1720*b* (e.g., 110/70, 106/69, and 111/74) and corresponding to the updated objects from the data collection controller 1712*b* (e.g., 901-Initial-1, 901-Initial-2, and 901-Initial-3) may be processed to get 901-Initial-Calculated (e.g., 109/71), which may then be processed into the EDC data (e.g., through obfuscation. The EDC data may include the object 901-Initial-Calculated and its value. In one implementation, the trial source data may be sent to the data collection controller 1712*b* and converted to the EDC data there. Alternatively, the trial source data may be processed on the user computing device 1720*b*, and the EDC data is then transmitted to the data management controller 1712*a*.

At 717, the EDC data may be mapped to the objects in the first study design, e.g., the 901-Initial-Calculated may be mapped to the object 901-Initial in the definition of the first study design based on their definitions.

At 719, the EDC data may be stored in the repository 1711*a* mapped to objects in the definition of the first study design.

At 721, it may be determined if there are any updates to the first study design. If yes, the process may return to 707 for transmitting updates to the first study design. Otherwise, the process may return to 711 to capture the data.

In one implementation, JSON formatted structure may be used for the data mapping to allow the data to flow back and forth across various parts in the architecture 1700.

In some embodiments, a method is provided for providing approved content from a controlled content repository. The method comprises: establishing an access protocol for a controlled content repository, wherein approved content is stored in the controlled content repository and is accessible according to the access protocol, wherein the access protocol is used for determining if the approved content in the controlled content repository can be used to generate a first electronic user interface associated with a first computing device, and wherein the approved content comprises or is generated based on first data associated with a first object and second data associated with a second object; receiving, from a second computing device, the first data associated with the first object and the second data associated with the second object; providing the approved content in the controlled content repository to the first computing device after a determination that the approved content in the controlled content repository is authorized to be made available to the first computing device in accordance with the access protocol, wherein the first electronic user interface associated with the first computing device is generated based on the first data associated with a first object and the second data associated with the second object; receiving, from the first computing device, first source data and second source data; aligning or correlating the first source data with the first data associated with the first object; and aligning or correlating the second source data with the second data associated with the second object. In some embodiments, the first or second computing device may refer to any computing device, system, or apparatus described herein.

In some embodiments, the first data associated with the first object comprises at least one of a first definition or a first workflow associated with the first object.

In some embodiments, the first source data and the second source data are stored in a source repository separate from the controlled content repository. In some embodiments, the controlled content repository may refer to any repository, memory, data storage, etc., described herein.

In some embodiments, the first data associated with the first object and the second data associated with the second object are stored in the source repository. In some embodiments, the source repository may refer to any repository, memory, data storage, etc., described herein.

In some embodiments, the first source data is associated with at least one of a first subject or a second subject.

In some embodiments, the method further comprises aggregating the first source data associated with the at least one of the first subject or the second subject.

In some embodiments, the method further comprises obfuscating the first source data associated with the at least one of the first subject or the second subject to remove subject identification information associated with the at least one of the first subject or the second subject.

In some embodiments, the method further comprises initiating storage of electronic data capture (EDC) data comprising the aggregated and obfuscated first source data associated with the at least one of the first subject or the second subject.

In some embodiments, the method further comprises mapping or correlating, using a customized EDC system, the EDC data to the first object and the second object.

In some embodiments, the first source data is associated with a first event.

In some embodiments, a second electronic user interface associated with the second computing device is used for generating a definition for the first event and a workflow for the first event.

In some embodiments, the first electronic user interface enables navigation between the first event and a first subject associated with the first source data.

In some embodiments, the first event comprises or is part of a first clinical trial.

In some embodiments, the method further comprises enabling the first computing device to access an updated definition of the first object prior to the first event.

In some embodiments, the method further comprises extending the first object to generate a third object, wherein the third object is correlated to the first object, wherein the first electronic user interface associated with the first computing device is generated further based on the third object.

In some embodiments, the method further comprises validating the first source data and the second source data.

In some embodiments, a system is provided for providing approved content from a controlled content repository. The method comprises: a controlled content repository for storing approved content, wherein the controlled content repository is accessible according to an access protocol, wherein the access protocol comprises at least one set of access rules, wherein the access protocol enables determining if the approved content within the controlled content repository can be made available to a first computing device via an electronic user interface, wherein the approved content comprises or is generated based on first data associated with a first object and second data associated with a second object; and a controlling computing device, in communication with the controlled content repository, providing the approved content within the controlled content repository to a first computing device after a determination that the approved content within the controlled content repository is authorized to be made available to the first computing device in accordance with the access protocol, wherein the electronic user interface is generated based on first data associated with a first object and second data associated with a second object, wherein the electronic user interface is used for initiating receipt of source data associated with a first subject, and wherein the source data is mapped, correlated, or aligned to the first data associated with the first object and the second data associated with the second object.

In some embodiments, the system further comprises a specialized electronic data capture (EDC) system for obfuscating the source data, and mapping, correlating, or aligning the source data to the first data associated with the first object and the second data associated with the second object.

In some embodiments, another method is provided for providing content from a controlled content repository. The method comprises: establishing an access protocol for a controlled content repository, wherein content is stored in the controlled content repository and is accessible according to the access protocol, wherein the access protocol is used for determining if the content in the controlled content repository can be used to generate a first electronic user interface associated with a first computing device, and wherein the content comprises or is generated based on first data associated with a first object and second data associated with a second object; receiving, from a second computing device, the first data associated with the first object and the second data associated with the second object; providing the content in the controlled content repository to the first computing device after a determination that the content in the controlled content repository is authorized to be made available to the first computing device in accordance with the access protocol, wherein the first electronic user interface associated with the first computing device is generated based on the first data associated with a first object and the second data associated with the second object; and receiving, from the first computing device, source data, wherein the source data is mapped, aligned, or correlated to the first data associated with the first object and the second data associated with the second object.

In some embodiments, the mapping, aligning, or correlating is performed by an EDC component having access to one or more mapping, alignment, or correlation rules, respectively, in the controlled content repository.

Figure 24:
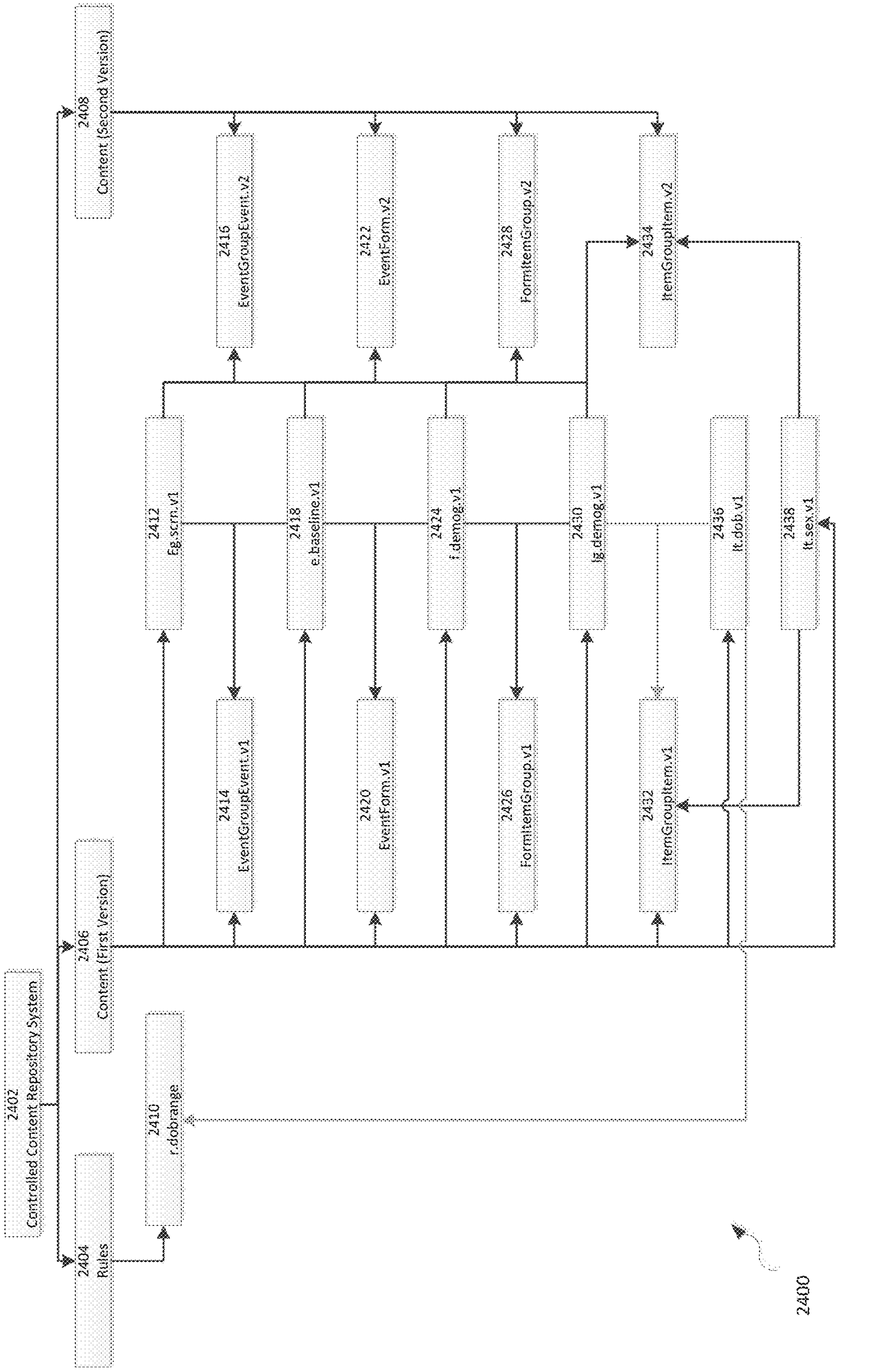
FIG. 24 illustrates a network system environment that includes a controlled content repository system comprising multiple content versions according to some embodiments of the present invention.

FIG. 24 illustrates a network system environment 2400 that includes a controlled content repository system 2402 comprising multiple content versions according to some embodiments of the present invention. The controlled content repository system 2402 may refer to any computing device described in this disclosure. The controlled content repository system 2402 may include rules 2404, first version of content 2406, and second version of content 2408, each of which may be stored in the same or different computer readable media such as memory, hard drives, or other storage spaces, which may be located in the cloud.

The first version of content 2406 may include references (or links, connections, single-directional or multi-directional pointers, etc.) aligned to or pointing to multiple objects. Alignment between an object and a version of content may include a pointer from the object to the version of content and/or a pointer from the version of content to the object. The objects referenced by the first version of content 2406 may include an event group object 2414, an event object 2420, an item group object 2426, and an item object 2432. Each of the objects may be related to one or more other objects. Other objects 2412, 2418, 2424, 243, 2436, and 2438 are also shown in FIG. 24. As an example, any object connected (e.g., directly connected) to any other object shown in FIG. 24 is related to that other object. In some embodiments, the relationships among various objects may be defined using a customized data structure such as a customized table, linked list, doubly linked list, queue, heap, tree, B-tree, binary search tree, graph, undirected graph, weighted graph, etc.

The second version of content 2408 may also include references aligned to or pointing to multiple objects. These objects may include an event group object 2416, an event object 2422, an item group object 2428, and an item object 2434. Some of these objects may be the same as those referenced by the first version of content 2406, while other objects may be different from those referenced by the first version of content 2406. As an example, both objects 2414 and 2416 are directly linked to object 2412. Therefore, in some embodiments, both objects 2414 and 2416 may be the same object even though they are represented as different objects in FIG. 24. In other embodiments, both objects 2414 and 2416 are different objects that are related to the same object 2412. As another example, the second version of content 2408 may include a reference to an item group object 2434 that includes references to objects 2430 and 2438, but does not include a reference to object 2436, which is referenced by the item group object 2432 referenced by the first version content 2406. Therefore, in some embodiments, both objects 2434 and 2432 are different objects. Although not shown, additionally or alternatively, the second version of content 2408 may include specific references to modifications of objects that are referenced by the first version of content 2406 along with any objects that not referenced by previous versions of content. Objects may be reused as references across multiple versions of content.

In some embodiments, the various objects described herein may be included in a form (e.g., an electronic form) associated with a visit. In other embodiments, the various content versions may be versions of a form that includes the various objects described herein. Content may refer to an instantiated study design, which may be associated with a trial as described in this disclosure. In some embodiments, an event may refer to a visit associated with a trial. An event group (or event container) may refer to a set of related events. An item may refer to a field on or a prompt associated with a form. An item group (or item container) may refer to a set of related items.

In some embodiments, the rules 2404 may be rules, parameters, access protocols, etc., associated with accessing, storing, or modifying specific versions of content 2406 and/or 2408 or specific objects, such as a date of birth-related object 2436. The rules 2404 include one or more subsets such as rule subset 2410. The rules may be associated with creating a new object, modifying alignment of references connected to an object, creating a version of content, linking and/or delinking objects, etc. In some embodiments, the rules 2404 may include a set of access protocols that determine whether a computing device is permitted or approved to access any objects or associated data, content or associated data, measured data, data analysis, settings of the controlled content repository system 2402, etc.

When creating the second version of content 2408, objects from the first version of content 2406 are not copied over or migrated to the second version of content 2408. Additionally, in some embodiments, an object, once published for referencing by a version of content, may not be modified because previous versions of content may continue to reference that object. Therefore, new objects or modifications of objects are created and referenced by new versions of content. In some alternate embodiments, objects may be modifiable and both previously created (i.e., created before modification of the objects) and newly created (i.e., created after modification of the objects) may reference both the modified and unmodified objects. Any modification to an object as described herein may refer to modification in definition or parameters of that object. In some embodiments, a user may be provided with a delta analyzer or viewer to view and analyze differences between versions of content, objects, references to objects, etc., which may be useful for creating future objects or future versions of content.

In some embodiments, a user may use a software tool to create a new object or version of content. If the user attempts to input or establish a definition identical to a previously created or published object or a version of content with objects identical to a previously created version of content, the software tool may prevent the user from creating the new object or version of content to prevent proliferation of identical objects or versions of content. In some embodiments, data validation rules and data quality requirements may need to be satisfied before creating a new object or version of content. Once an object is created, the object may comprise lineage associated with related objects such as those based on which the object is created. Such objects may be referred to as parent objects. In some embodiments, a new version of content may comprise data associated with design amendments that indicate differences between the new version of content and previous versions of the content. In some embodiments, any data structures described herein to store an object and/or content may be modified to accommodate data associated with object lineage, design amendments, etc. Such data structures include a customized table, linked list, doubly linked list, queue, heap, tree, B-tree, binary search tree, graph, undirected graph, weighted graph, etc.

In some embodiments, a lineage associated with an object may be stored with or associated with an object in the controlled content repository system 2402. A lineage associated with an object may include object definitions or parameters associated with related objects in a previous version of content (e.g., created before creation of the present object), differences between the present object and related objects in a previous version of content, software tools that were used to create the present object and related objects in a previous version of content, data structures and/or storage devices used for storing the present object and other related objects in a previous version of content, etc. In some embodiments, an object may be associated with a standard (e.g. a standard set of parameters or definitions). Tracing the lineage of the objects enables analysis of deviations from the standard. Therefore, the present invention enables synchronization of content and/or objects over a period of time such that changes to the content and/or objects over the period of time are easy to access, analyze, and build upon.

In some embodiments, an object may be stored in a customized or specialized data structure. The data structure may be located or searched by any computing system based on identification information. For example, the identification information may include unique identification information associated with the controlled content repository system 2402 (e.g., the system where the data structure is created and/or stored) concatenated with unique identification information associated with the object. The identification information of the object enables tracking or linking back to a related object (e.g., a parent object) associated with the object. A parent object may refer to a previous version of the object associated with a previous version of content. Example data structures include a customized table, linked list, doubly linked list, queue, heap, tree, B-tree, binary search tree, graph, undirected graph, weighted graph, etc.

The controlled content repository 2402 system may store both design data and measured data. Design data may refer to forms for use in trials, and may refer to content and/or objects as described herein. Measured data may refer to physical data collected from subjects of trials based on prompts encountered on the forms. One or more rules and/or relationship parameters may be used to relate the design data to the measured data, or vice versa. The controlled content repository system 2402 may be used to store design data and/or measured data associated with a single entity or multiple entities. As used herein, an entity may refer to a user, a customer, a tenant, etc., all of which can be used interchangeably.

Figure 25:
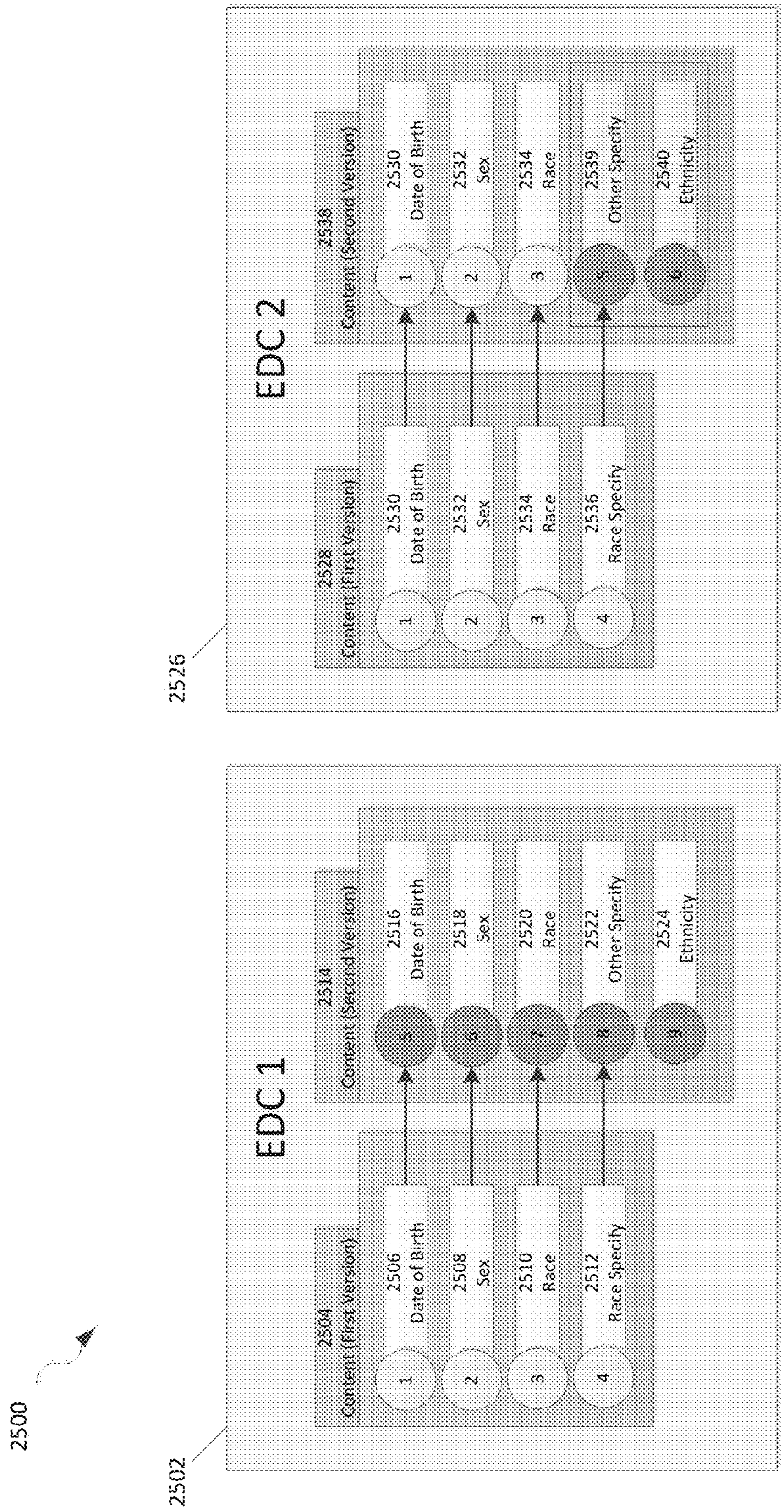
FIG. 25 illustrates two different electronic data capture (EDC) techniques according to some embodiments of the present invention.

FIG. 25 illustrates two different electronic data capture (EDC) techniques according to some embodiments of the present invention. In EDC 1, a first version of content 2504 includes objects 2506, 2508, 2510, and 2512. When creating the second version of content 2514, the objects 2506, 2508, 2510, and 2512 are copied over such that the second version of content 2514 includes new objects 2516, 2518, 2520, 2522, and 2524. In EDC 2, a first version of content 2528 includes references to objects 2530, 2532, 2534, and 2536. When creating the second version of content 2538, references to the objects 2530, 2532, and 2534, which were previously linked or aligned to the first version of content 2528, are additionally linked or aligned to the second version of content 2538. The links may be at least one of from the objects to the version of content, or from the version of content to the objects. Notably, the second version of content 2538 is not linked to the object 2536. Instead, references to new objects 2539 and 2540, or an object group comprising objects 2539 and 2540, are linked to the second version of content 2538. In some embodiments, the object 2536 may be linked to new objects 2539 and 2540, or an object group comprising objects 2539 and 2540. Additionally or alternatively, new objects 2539 and 2540, or an object group comprising objects 2539 and 2540 may include object lineage information, which may include data associated with object 2536 because new objects 2539 and 2540 were derived from and/or are related to object 2536. When creating the second version of content 2538, a controlled content repository system that controls and/or stores the various versions of content does not have to enter a downtime mode (e.g., no power mode, low power mode, etc.) in order to create the second version of content 2538. In some embodiments, objects may additionally be de-linked from content versions.

The present invention enables efficient testing and validating of the content, and/or the objects referenced by or associated with the content such that information associated with the testing and validation of the content and/or objects is readily available or associated with the content and/or objects. In some embodiments, the testing and validation information may also be stored in the controlled content repository system described herein. Additionally, the present invention enables objects and/or forms to be tested and validated such that results of the testing and validation are available for future objects related to the tested and validated objects and/or future versions of the tested and validated forms.

Figure 26:
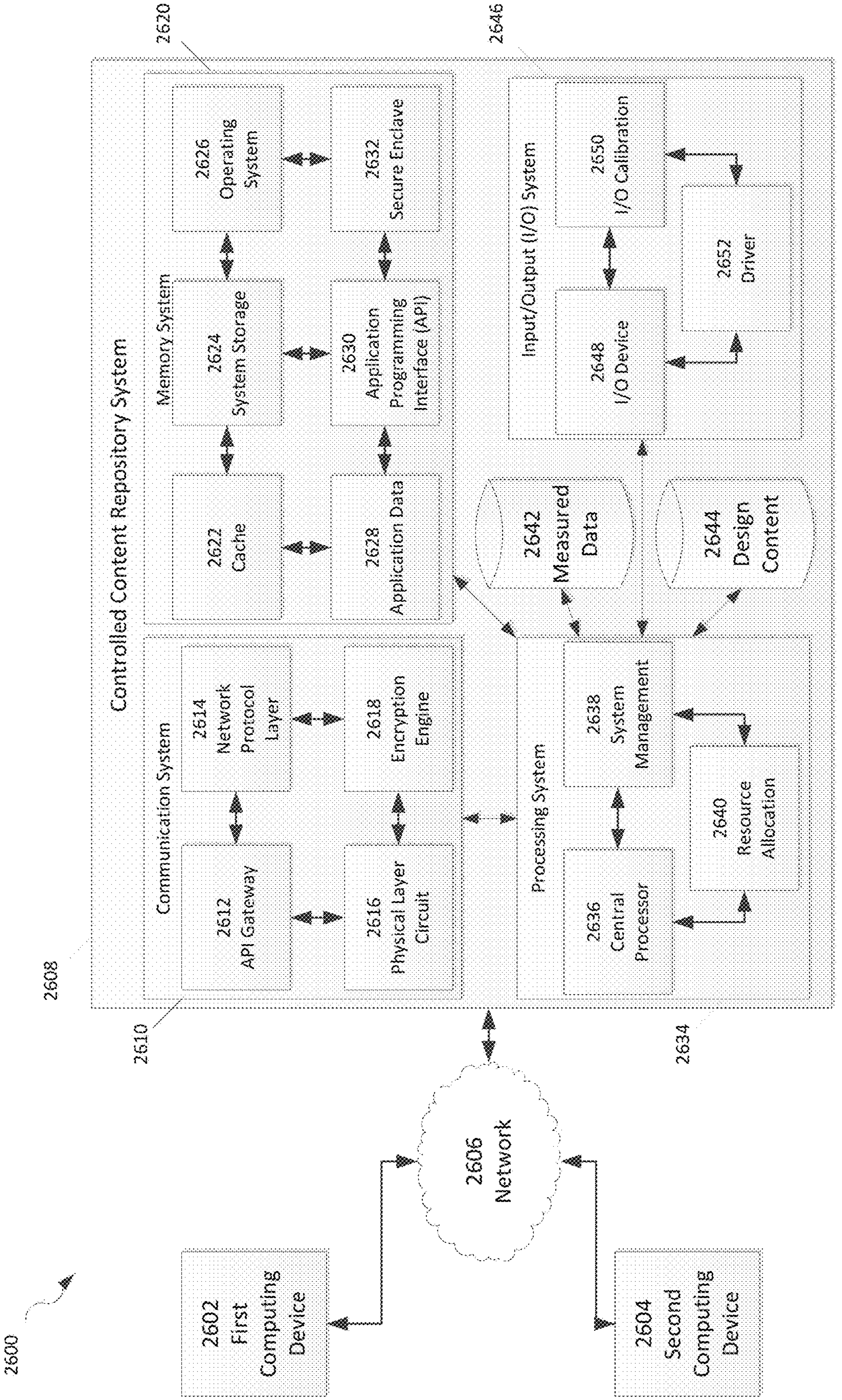
FIG. 26 illustrates a network system environment that includes a controlled content repository system according to some embodiments of the present invention.

FIG. 26 illustrates a network system environment 2600 that includes a controlled content repository system 2608 according to some embodiments of the present invention. In some embodiments, the various systems and/or units described in this figure are hardware. In other embodiments, the various systems and/or units described in this figure are software. In still other embodiments, the various systems and/or units described in this figure are a combination of hardware and/or software. The network system environment 2600 includes a controlled content repository system 2608, a first computing device 2602, and a second computing device 2604. The three systems are shown as being disparately located from each other. In some embodiments, any of the systems may be comprised in or comprise any of the other systems. In some embodiments, the first computing device 2602 may be any portable or non-portable computing device such as a desktop or laptop computer, tablet, mobile phone, wearable device, etc., located at a clinic where a trial is conducted. In some embodiments, the second computing device 2604 may be any portable or non-portable computing device such as a desktop or laptop computer, tablet, mobile phone, wearable device, etc., associated with an entity (e.g., a pharmaceutical entity) associated with or commissioning the trial.

The controlled content repository system 2608 may include a processing system 2634, a memory system 2620, an input/output (I/O) system 2646, and a communication system 2610. The inclusion of each system in the controlled content repository system 2608 is optional. Each of the processing system 2634, the memory system 2620, the input/output (I/O) system 2646, and the communication system 2610 may include one or more units for performing any operation, technique, method, process, etc., described herein. Further, each system and/or unit of the controlled content repository system 2608 may be operatively and/or otherwise communicatively coupled with each other so as to perform any operation, technique, method, process, etc., described herein. The controlled content repository system 2608 including any of its systems and/or units may include general hardware, specifically-purposed hardware, and/or software. The controlled content repository system 2608 may include one or more co-located or disparately located computing systems for storing the various systems illustrated as being included in the controlled content repository system 2608.

The processing system 2634 may control one or more of the memory system 2620, the input/output (I/O) system 2646, and the communication system 2610, as well as any included units, elements, components, devices, and/or functions performed by the memory system 2620, the input/output (I/O) system 2646, and the communication system 2610. Any actions described herein as being performed by a processor or signal processor may be taken as being performed by the processing system 2634 alone and/or by the processing system 2634 in conjunction with one or more additional processing systems, processors, units, elements, components, devices, and/or the like. Additionally, while one processing system 2634 may be shown, multiple processing systems may be present and/or otherwise included in the controlled content repository system 2608 or elsewhere in the overall network system environment 2600. Thus, while instructions may be described as being executed by the processing system 2634 (and/or various units of the processing system 2634), the instructions may be executed simultaneously, serially, and/or otherwise by one or multiple processing systems on one or more devices.

In some embodiments, the processing system 2634 may be implemented as one or more computer or central processing unit (CPU) chips and/or graphical processing unit (GPU) chips and may include a hardware device capable of executing computer instructions. The processing system 2634 may execute instructions, codes, computer programs, and/or scripts. The instructions, codes, computer programs, and/or scripts may be received from and/or stored in the memory system 2620, the I/O system 2646, the communication system 2610, units and/or elements of the aforementioned units, other devices and/or computing environments, and/or the like.

In some embodiments, the processing system 2634 may include, among other elements, units such as a central processor 2636 which may be a central processing unit (CPU) 2636, a system management unit 2638 and a resource allocation unit 2640. Each of the units of the processing system 2634 may be communicatively and/or otherwise operably coupled with each other. The central processor 2636 refers to electronic circuitry that carries out instructions of a computer program, including logical, control, arithmetic, and input/output (I/O) instructions. The system management unit 2638 refers to hardware and/or software that coordinates operations of the processing system 2634 with operations of the communication system 2610, the memory system 2620, and the I/O system 2646.

The resource allocation unit 2640 may facilitate the determination, monitoring, analysis, and/or allocation of computing resources throughout the controlled content repository system 2608 and/or other computing environments. As such, computing resources of the controlled content repository system 2608 utilized by the processing system 2634, the memory system 2620, the input/output (I/O) system 2646, and the communication system 2610 (and/or any unit of the aforementioned systems) such as processing power, data storage space, network bandwidth, and/or the like may be in high demand at various times during operation. Accordingly, the resource allocation unit 2640 may be configured to manage the allocation of various computing resources as they are required by particular systems and/or units of the controlled content repository system 2608 and/or other computing environments. In some embodiments, the resource allocation unit 2640 may include sensors and/or other specially-purposed hardware for monitoring performance of each system of the controlled content repository system 2608, as well as hardware for responding to the computing resource needs of each unit. In some embodiments, the resource allocation unit 2640 may utilize computing resources of a second computing environment separate and distinct from the controlled content repository system 2608 to facilitate a desired operation such as creating a new object, modifying references connected to an object, creating a version of content, etc. The resource allocation unit 2640 may retrieve, transmit, control, allocate, and/or otherwise distribute determined amount(s) of computing resources to each system and/or unit of the controlled content repository system 2608. In some embodiments, the allocation of computing resources of the resource allocation unit 2640 may include the resource allocation unit 2640 flipping a switch, adjusting processing power, adjusting memory size, partitioning a memory element, transmitting data, controlling one or more input and/or output devices, modifying various communication protocols, and/or the like.

In some embodiments, the memory system 2620 may be utilized for storing, recalling, receiving, transmitting, and/or accessing object-related data and/or content-related data and/or measured data during operation of the controlled content repository system 2608. For example, the memory system 2620 may be utilized for storing recalling, and/or updating object-related data and/or content-related data and/or measured data and/or the like. The memory system 2620 may include various types of data storage media such as solid state storage media, hard disk storage media, virtual storage media, and/or the like. The memory system 2620 may include dedicated hardware elements such as hard drives and/or servers, as well as software elements such as cloud-based storage drives. For example, the memory system 2620 may include various units such as an operating system unit 2626, an application data unit 2628, an application programming interface (API) unit 2630, a system storage unit 2624, a secure enclave 2632, and/or a cache storage unit 2622. In some embodiments, any of these units may be customized with code for performing the various operations described herein.

The memory system 2620 and/or any of its units described herein may include random access memory (RAM), read only memory (ROM), and/or various forms of secondary storage. RAM may be used to store volatile data and/or to store instructions that may be executed by the processing system 2634. For example, the data stored may be a command, a current operating state of the controlled content repository system 2608, an intended operating state of the controlled content repository system 2608, and/or the like. As a further example, data stored in the memory system 2620 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory system 2620 may include one or more databases for storing any data such as object-related data and/or content-related data and/or measured data and/or the like. Additionally or alternatively, one or more secondary databases located remotely from the controlled content repository system 2608 may be utilized and/or accessed by the memory system 2620.

The operating system unit 2626 may facilitate deployment, storage, access, execution, and/or utilization of an operating system utilized by the controlled content repository system 2608 and/or any other computing environment described herein. In some embodiments, the operating system unit 2626 may include various hardware and/or software elements that serve as a structural framework for the processing system 2634 to execute various operations described herein. The operating system unit 2626 may further store various pieces of information and/or data associated with operation of the operating system and/or the controlled content repository system 2608 as a whole, such as a status of computing resources (e.g., processing power, memory availability, resource utilization, and/or the like), runtime information, modules to direct execution of operations described herein, user permissions, security credentials, and/or the like.

The application data unit 2628 may facilitate deployment, storage, access, execution, and/or utilization of an application utilized by the controlled content repository system 2608 and/or any other computing environment described herein. For example, an application may be associated with creating a new object, creating a new version of content, associating or aligning a version of content with various objects, analyzing the measured data with respect to objects associated with a version of content, setting an access protocol for providing data to computing devices from the controlled content repository system 2608, etc. As such, the application data unit 2628 may store any information and/or data associated with the application. A user may use information included in the application data unit 2628 to execute various operations described herein. The application data unit 2628 may further store various pieces of data associated with operation of the application and/or the controlled content repository system 2608 as a whole, such as a status of computing resources (e.g., processing power, memory availability, resource utilization, and/or the like), runtime information, user interfaces, modules to direct execution of operations described herein, user permissions, security credentials, access protocols, and/or the like.

The application programming interface (API) unit 2630 may facilitate deployment, storage, access, execution, and/or utilization of information associated with APIs of the controlled content repository system 2608 and/or any other computing environment described herein. For example, the controlled content repository system 2630 may include one or more APIs for various devices, applications, units, elements to communicate with each other and/or utilize the same data. Accordingly, the API unit 2630 may include API databases comprising information (e.g., associated with object-related data and/or content-related data and/or measured data and/or the like) that may be accessed and/or utilized by applications, units, elements, and/or operating systems of devices and/or computing environments. In some embodiments, each API database may be associated with a customized physical circuit included in the memory system 2620 and/or the API unit 2630. Additionally, each API database may be public and/or private, and so authentication credentials associated with one or more access protocols may be required to access information in an API database.

The system storage unit 2624 may facilitate deployment, storage, access, and/or utilization of object-related data and/or content-related data and/or measured data and/or the like by the controlled content repository system 2608 and/or any other computing environment described herein. In some embodiments, the system storage unit 2624 may communicate with the system management unit 2638 to receive and/or transmit object-related data and/or content-related data and/or measured data and/or the like.

The secure enclave 2632 may facilitate secure storage of data. In some embodiments, the secure enclave 2632 may include a partitioned portion of storage media included in the memory system 2620 that is protected by various security measures, which may also be part of the access protocols. For example, the secure enclave 2632 may be hardware secured. In other embodiments, the secure enclave 2632 may include one or more firewalls, encryption mechanisms, and/or other security-based protocols. Authentication credentials of a user or system may be required prior to providing access to data stored within the secure enclave 2632. Data stored in the secure enclave 2632 may include any object-related data and/or content-related data and/or measured data and/or the like.

The cache unit 2622 may facilitate short-term deployment, storage, access, analysis, and/or utilization of data. For example, the cache unit 2622 may be utilized for storing any object-related data and/or content-related data and/or measured data and/or the like. In some embodiments, the cache unit 2622 may serve as a short-term storage location for data so that the data stored in the cache unit 2622 may be accessed quickly. In some embodiments, the cache unit 2622 may include RAM and/or other storage media types for quick recall of stored data. The cache unit 2622 may include a partitioned portion of storage media included in the memory system 2620.

The I/O system 2646 may include hardware and/or software elements for the controlled content repository system

2608 to receive, transmit, and/or present data (object-related data and/or content-related data and/or measured data and/or the like) useful for performing various operations described herein. For example, elements of the I/O system 2646 may be used to receive user input from a user via a user device, generate graphical representations of data, present user interfaces and display data to users on the user interface, and/or the like. The user interfaces may be configured and adjusted for a display device. In this manner, the controlled content repository system 2608 may use the I/O system 2646 to interface with a human (or nonhuman) user. As described herein, the I/O system 2646 may include units such as an I/O device 2648, an I/O calibration unit 2650, and/or a software driver 2652. The software driver 2652 may comprise a display driver such as a graphic driver. In some embodiments, the software driver 2652 may comprise a specialized or customized non-generic driver for specifically performing any particular operation described in this disclosure.

The I/O device 2648 may facilitate the receipt, transmission, processing, presentation, display, input, and/or output of data as a result of executed operations described herein. In some embodiments, the I/O device 2648 may include a plurality of I/O devices. In some embodiments, the I/O device 2648 may include one or more elements of a user device, a computing system, a server, a remote or local terminal, and/or a similar device. As such, the I/O device 2648 may include a variety of elements for a user to interface with the controlled content repository system 2608. For example, the I/O device 2648 may include a keyboard, a touchscreen, a button, a sensor, a biometric scanner, a laser, a microphone, a camera, a barcode scanner, a cash register, a point-of-sale terminal, and/or another element for receiving and/or collecting input from a user. Additionally and/or alternatively, the I/O device 2648 may include a display, a screen, a sensor, a vibration mechanism, a light emitting diode (LED), a speaker, a scanner, and/or another element for presenting and/or otherwise outputting data to a user or to another system. In some embodiments, the I/O device 2648 may communicate with one or more elements of the processing system 2634 and/or the memory system 2620 to execute operations described herein.

The I/O calibration unit 2650 may facilitate the calibration of the I/O device 2648. For example, the I/O calibration unit 2650 may detect and/or determine one or more settings of the I/O device 2648, and then adjust and/or modify settings so that the I/O device 2648 may operate more efficiently. For example, the I/O calibration unit 2650 may calibrate display of data on the I/O device 2648 based on display and system settings of the I/O device 2648.

In some embodiments, the I/O calibration unit 2650 may utilize a driver 2652 (or multiple drivers) to calibrate the I/O device 2648. For example, the driver 2652 may include software that is to be installed by the I/O calibration unit 2650 so that an element of the controlled content repository system 2608 (or an element of the computing environment 2600) may recognize and/or integrate with the I/O device 2648 for the various operations described herein.

The communication system 2610 may facilitate establishment, maintenance, monitoring, and/or termination of communications between the controlled content repository system 2608 and other computing environments, third party server systems, and/or the like. In some embodiments, the communication system 2610 may also be referred to as a signal interface. The communication system 2610 may facilitate communication between various systems and/or units of the controlled content repository system 2608. In some embodiments, the communication system 2610 may include a network protocol layer 2614, an API gateway 2612, an encryption engine 2618, and/or a physical layer circuit 2616. The communication system 2610 may include hardware and/or software elements.

The network protocol layer 2614 may facilitate establishment, maintenance, and/or termination of a communication connection for the controlled content repository system 2608 by way of a network. For example, the network protocol layer 2614 may detect and/or define a communication protocol required by a particular network and/or network type. Communication protocols utilized by the network protocol layer 2614 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for the controlled content repository system 2608 may include transforming and/or translating data from being compatible with a first communication protocol (e.g., associated with a first system such as system 2602 or 2604) to being compatible with a second communication protocol (e.g., associated with a second system such as system 2604 or 2602, respectively). In some embodiments, the network protocol layer 2614 may determine and/or monitor an amount of data traffic to consequently determine which particular network protocol is to be used for establishing a secure communication connection, transmitting data, and/or performing operations as described herein.

The API gateway 2612 may facilitate other devices and/or computing environments to access the API unit 2630 of the memory system 2620 of the controlled content repository system 2608. For example, a user computing device may access the API unit 2630 of the controlled content repository system 2608 via the API gateway 2612. In some embodiments, the API gateway 2612 may be required to validate user credentials and/or system credentials, according to one or more access protocols, prior to providing access to the API unit 2630 to a user and/or a system. The API gateway 2612 may include instructions for the controlled content repository system 2608 to communicate with another device and/or between elements of the controlled content repository system 2608.

The encryption engine 2618 may facilitate translation, encryption, encoding, decryption, and/or decoding of data received, transmitted, and/or stored by the controlled content repository system 2608. Using the encryption engine, each transmission of data may be encrypted, encoded, and/or translated for security reasons according to any access protocols, and any received data may be encrypted, encoded, and/or translated prior to its processing and/or storage. In some embodiments, the encryption engine 2618 may generate an encryption/decryption key, and/or the like, which may be transmitted along with any data content.

The physical layer circuit 2616 may include a variety of communication hardware and/or software specifically purposed for the controlled content repository system 2608. In some embodiments, the physical layer circuit 2616 may include one or more radio transceivers, chips, analog front end (AFE) units, antennas, processing units, memory, other logic, and/or other components to implement communication protocols (wired or wireless) and related functionality for facilitating communication to or from the controlled content repository system 2608. Additionally and/or alternatively, the physical layer circuit 2616 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

In some embodiments, the processing system 2634 may be connected to data storage 2642 comprising measured data and/or data storage 2644 comprising design content (e.g., any content-related data). The data storages 2642 and 2644 may be any type of data storage described herein for storing specialized non-generic data structures, including data structures that can concatenate disparate data associated with objects, measured data, content, the controlled repository system 2608, etc. Any features associated with this description may be combined with any feature described in this disclosure. In some embodiments, the data storages 2642 and 2644 may additionally be protected by an access protocol such that the access protocol determines whether computing devices can access data comprised in the data storages 2642 and 2644. Example data structures include a customized table, linked list, doubly linked list, queue, heap, tree, B-tree, binary search tree, graph, undirected graph, weighted graph, etc.

In some embodiments, a method is provided for providing versions of content from a controlled content repository system. The method comprises: establishing, using one or more computing device processors, an access protocol for a controlled content repository system, wherein content is stored in the controlled content repository system and is accessible according to the access protocol, wherein the content comprises a first version of the content, wherein the access protocol is used for determining if the first version of the content in the controlled content repository system can be made available to a first computing device, and wherein the first version of the content comprises a first reference aligned from the first version of the content to a first object stored in the controlled content repository system, and a second reference aligned from the first version of the content to a second object stored in the controlled content repository system; generating, using the one or more computing device processors, a second version of the content, wherein generating the second version of the content comprises: aligning, using the one or more computing device processors, a second reference from the second version of the content to the first object, and aligning, using the one or more computing device processors, a third reference from the second version of the content to a third object stored in the controlled content repository system; and providing, using the one or more computing device processors, the second version of the content in the controlled content repository system to a second computing device after a determination that the content in the controlled content repository system is authorized to be made available to the second computing device in accordance with the access protocol, wherein the second version of the content is created without migrating objects from the first version of the content to the second version of the content.

In some embodiments, the first object, the second object, or the third object comprises at least one of an event group, an event, an item group, or an item. In some embodiments, the first object, the second object, or the third object comprises a relationship object. In some embodiments, the content comprises an instantiated study design. In some embodiments, the instantiated study design is associated with a trial.

In some embodiments, the first object comprises an unmodifiable object. In some embodiments, the first object becomes unmodifiable when the first object is published for association with the first version of the content. In some embodiments, the first object comprises a modifiable object.

In some embodiments, the method further comprises providing a delta analyzer for enabling view of at least one difference between the first version of the content and the second version of the content. In some embodiments, the second version of the content is created without the controlled content repository system entering a downtime mode.

In some embodiments, the first object is stored in a customized data structure. In some embodiments, the customized data structure comprises identification information concatenated based on first identification information associated with the controlled content repository system and second identification information associated with the first object.

In some embodiments, the first object comprises a lineage of the first object. In some embodiments, the method further comprises tracking and storing the lineage of the first object. In some embodiments, the method further comprises analyzing, based on the lineage of the first object, how a standard associated with the first object deviated over time.

In some embodiments, the content comprises study design content. In some embodiments, the content further comprises clinical data content. In some embodiments, the method further comprises establishing at least one relationship parameter between the study design content and the clinical data content. In some embodiments, the method further comprises aligning the clinical data content to the study design content.

In some embodiments, the method further comprises applying rules associated with the first version of the content to the second version of the content. In some embodiments, the rules comprise validation rules.

In some embodiments, the method further comprises preventing creation of a fourth object in response to determining the fourth object substantially matches at least one of the first object, the second object, or the third object. In some embodiments, the first object is a first version of the first object, and the second object is a second version of the first object. In some embodiments, the first object is associated with first rules, and wherein the second object is associated with second rules different from the first rules.

In some embodiments, a controlled content repository system is provided for providing versions of content. The controlled content repository system comprises: a communication system comprising a network protocol layer and a physical layer circuit, the communication system for transmitting or receiving data from computing devices; a memory system comprising an operating system and an application programming interface (API), the memory comprising code for performing one or more operations; and a processing system comprising a central processing unit (CPU), the processing system for performing the one or more operations comprising: establishing an access protocol for the controlled content repository system, wherein content is accessible according to the access protocol, wherein the content comprises a first version of the content, wherein the access protocol is used for determining if the first version of the content in the controlled content repository system can be made available to a first computing device, and wherein the first version of the content comprises a first reference aligned from the first version of the content to a first object stored in the controlled content repository system, and a second reference aligned from the first version of the content to a second object stored in the controlled content repository system; generating a second version of the content, wherein generating the second version of the content comprises: generating a second reference aligned from the second version of the content to the first object, and generating a third reference aligned from the second version of the content to a third object stored in the controlled content repository system; and providing the second version of the content in the controlled content repository system to a second computing device after a determination that the content in the controlled content repository system is authorized to be made available to the second computing device in accordance with the access protocol, wherein the second version of the content is created without copying objects from the first version of the content to the second version of the content.

In some embodiments, another method is provided for providing versions of content from a controlled content repository system. The method comprises: establishing, using one or more computing device processors, an access protocol for a controlled content repository system, wherein content is stored in the controlled content repository system and is accessible according to the access protocol, wherein the content comprises a first version of the content, wherein the access protocol is used for determining if the first version of the content in the controlled content repository system can be made available to a first computing device, and wherein the first version of the content comprises a first reference aligned from the first version of the content to a first object stored in the controlled content repository system, and a second reference aligned from the first version of the content to a second object stored in the controlled content repository system; generating, using the one or more computing device processors, a second version of the content, wherein generating the second version of the content comprises: aligning, using the one or more computing device processors, a second reference from the second version of the content to the first object, and aligning, using the one or more computing device processors, a third reference from the second version of the content to a delta associated with the first object stored in the controlled content repository system; and providing, using the one or more computing device processors, the second version of the content in the controlled content repository system to a second computing device after a determination that the content in the controlled content repository system is authorized to be made available to the second computing device in accordance with the access protocol. In some embodiments, a non-transitory computer readable medium is provided that stores code for performing any of the operations described in this disclosure.

This application is a continuation-in-part of U.S. application Ser. No. 14/611,012, filed on Jan. 30, 2015, which is a continuation-in-part of U.S. application Ser. No. 14/271,134, filed on May 6, 2014, which claims priority to U.S. Provisional Patent Application Nos. 61/820,029, filed May 6, 2013, and 61/828,034, filed May 28, 2013, all of which are hereby incorporated by reference herein for all purposes.

This application incorporates by reference U.S. application Ser. No. 14/558,432, filed on Dec. 2, 2014, which is a continuation-in-part of U.S. application Ser. No. 14/271,134, filed on May 6, 2014, which claims priority to U.S. Provisional Patent Application Nos. 61/820,029, filed May 6, 2013, and 61/828,034, filed May 28, 2013, all of which are hereby incorporated by reference herein for all purposes.

This application incorporates by reference U.S. application Ser. No. 14/613,293, filed on Feb. 3, 2015, which is a continuation-in-part of U.S. application Ser. No. 14/271,134, filed on May 6, 2014, which claims priority to U.S. Provisional Patent Application Nos. 61/820,029, filed May 6, 2013, and 61/828,034, filed May 28, 2013, all of which are hereby incorporated by reference herein for all purposes.

This application incorporates by reference U.S. application Ser. No. 14/699,553, filed on Apr. 29, 2015, which is a continuation of U.S. application Ser. No. 14/271,134, filed on May 6, 2014, which claims priority to U.S. Provisional Patent Application Nos. 61/820,029, filed May 6, 2013, and 61/828,034, filed May 28, 2013, all of which are hereby incorporated by reference herein for all purposes.

This application is a continuation-in-part of U.S. application Ser. No. 15/629,587, filed on Jun. 21, 2017, which claims priority to U.S. Provisional Patent Application No. 62/407,399, filed on Oct. 12, 2016, which is hereby incorporated by reference herein for all purposes.

This application is a continuation-in-part of U.S. application Ser. No. 14/819,371, filed on Aug. 5, 2015, which is a continuation-in-part of U.S. application Ser. No. 14/702,307, filed on May 1, 2015, both of which are hereby incorporated by reference herein for all purposes.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A method for providing approved content from a controlled content repository, the method comprising:

establishing an access protocol for a controlled content repository, wherein approved content is stored in the controlled content repository and is accessible according to the access protocol, wherein the access protocol is used for determining if the approved content in the controlled content repository can be provided to a first computing device generating a first electronic user interface, and wherein the approved content comprises or is generated based on first data associated with a first object and second data associated with a second object;

receiving, from a second computing device, the first data associated with the first object and the second data associated with the second object;

providing the approved content in the controlled content repository to the first computing device after determining that the approved content in the controlled content repository is authorized to be made available to the first computing device in accordance with the access protocol, wherein the first electronic user interface associated with the first computing device is generated based on the first data associated with the first object and the second data associated with the second object;

receiving, from the first computing device, first source data and second source data;

aligning or correlating the first source data with the first data associated with the first object; and aligning or correlating the second source data with the second data associated with the second object.

2. The method of claim 1, further comprising accessing a first update associated with the first data associated with the first object and a second update associated with the second data associated with the second object prior to at least one of: providing the approved content in the controlled content repository to the first computing device, or the first electronic user interface associated with the first computing device being generated based on the first data associated with the first object and the second data associated with the second object.

3. The method of claim 1, further comprising updating the first data associated with the first object and updating the second data associated with the second object prior to at least one of: providing the approved content in the controlled content repository to the first computing device, or the first electronic user interface associated with the first computing device being generated based on the first data associated with the first object and the second data associated with the second object.

4. The method of claim 1, wherein the first data associated with the first object comprises a first definition associated with the first object.

5. The method of claim 4, wherein the first object comprises or is associated with a first clinical trial.

6. The method of claim 4, wherein the first definition associated with the first object defines at least one of a first event, a workflow for the first event, or a form for the first event, wherein the first event comprises a visit of a first subject, wherein the first subject is associated with at least one of the first source data or the second source data.

7. The method of claim 6, further comprising enabling generation, on the second computing device or a third computing device, of a second user interface for creating or editing at least one of the first event, the workflow for the first event, or the form for the first event.

8. The method of claim 6, further comprising enabling user navigation, on the first computing device or the second computing device, between at least one of the first event, the workflow for the first event, or the form for the first event, and a first subject associated with at least one of the first source data or the second source data.

9. The method of claim 1, wherein the first source data and the second source data, or obfuscated versions of the first source data and the second source data, are stored in the controlled content repository.

10. The method of claim 1, wherein the first source data and the second source data are received via the first electronic user interface associated with the first computing device.

11. The method of claim 1, wherein the first data associated with the first object and the second data associated with the second object are stored in the controlled content repository.

12. The method of claim 1, further comprising validating the first source data and the second source data, and rectifying at least one error discovered in at least one of the first source or the second source data.

13. The method of claim 1, wherein the first computing device is associated with a clinical trial site system.

14. The method of claim 1, wherein the second computing device is associated with a clinical trial sponsor system.

15. The method of claim 14, wherein the clinical trial sponsor system further comprises an electronic data capture (EDC) system, the EDC system storing aggregated and obfuscated versions of the first source data and the second source data.

16. The method of claim 14, wherein the clinical trial sponsor system comprises or is comprised in at least one of a medical data management controller or a medical data collection controller.

17. A system for providing approved content from a controlled content repository, comprising:

a controlled content repository for storing approved content, wherein the controlled content repository is accessible according to an access protocol, wherein the access protocol comprises at least one set of access rules, wherein the access protocol enables determining if the approved content in the controlled content repository can be made available to a first computing device via an electronic user interface, and wherein the approved content comprises or is generated based on first data associated with a first object and second data associated with a second object; and a controlling computing device, in communication with the controlled content repository, providing the approved content in the controlled content repository to the first computing device after determining that the approved content in the controlled content repository is authorized to be made available to the first computing device in accordance with the access protocol, wherein the electronic user interface is generated based on the first data associated with the first object and the second data associated with the second object, wherein the electronic user interface is used for initiating receipt or transmission of source data associated with a first subject, and wherein the source data is mapped, correlated, or aligned to the first data associated with the first object and the second data associated with the second object.

18. The system of claim 17, wherein the controlling computing device updates the first data associated with the first object and updates the second data associated with the second object prior to at least one of: providing the approved content in the controlled content repository to the first computing device, or the electronic user interface associated with the first computing device being generated based on the first data associated with the first object and the second data associated with the second object.

19. The system of claim 17, further comprising an electronic data capture system for modifying the source data, and mapping, correlating, or aligning the modified source data to the first data associated with the first object and the second data associated with the second object.

* * * * *